US008165091B2

(12) United States Patent
Nix

(10) Patent No.: US 8,165,091 B2
(45) Date of Patent: *Apr. 24, 2012

(54) EFFICIENT HANDOVER OF MEDIA COMMUNICATIONS IN HETEROGENEOUS IP NETWORKS USING LAN PROFILES AND NETWORK HANDOVER RULES

(76) Inventor: John A. Nix, Evanston, IL (US)

( * ) Notice: Subject to any disclaimer, the term of this patent is extended or adjusted under 35 U.S.C. 154(b) by 886 days.

This patent is subject to a terminal disclaimer.

(21) Appl. No.: 12/163,472

(22) Filed: Jun. 27, 2008

(65) Prior Publication Data

US 2009/0323632 A1 Dec. 31, 2009

(51) Int. Cl.
*H04W 4/00* (2009.01)
*H04J 3/16* (2006.01)
*H04J 3/22* (2006.01)

(52) U.S. Cl. ...................................... 370/331
(58) Field of Classification Search .................. 370/331, 370/338, 465–467
See application file for complete search history.

(56) References Cited

U.S. PATENT DOCUMENTS

| | | | | |
|---|---|---|---|---|
| 6,493,751 | B1* | 12/2002 | Tate et al. | 709/221 |
| 6,768,726 | B2* | 7/2004 | Dorenbosch et al. | 370/331 |
| 7,616,604 | B2* | 11/2009 | Abdelhamid et al. | 370/329 |
| 2002/0154638 | A1* | 10/2002 | Shahrier et al. | 370/400 |
| 2004/0203785 | A1* | 10/2004 | Sundquist et al. | 455/436 |
| 2005/0128979 | A1* | 6/2005 | Wu et al. | 370/331 |
| 2006/0111112 | A1* | 5/2006 | Maveddat | 455/439 |
| 2006/0245574 | A1* | 11/2006 | Phelps et al. | 379/229 |
| 2007/0070948 | A1* | 3/2007 | Kezys et al. | 370/331 |
| 2008/0229088 | A1* | 9/2008 | Barth et al. | 713/1 |

(Continued)

FOREIGN PATENT DOCUMENTS

EP 1 811 741 7/2007

OTHER PUBLICATIONS

Motorola, Technical White Paper: Long Term Evolution: A Technical Overview, 2007.

(Continued)

*Primary Examiner* — Chi Pham
*Assistant Examiner* — Farah Faroul
(74) *Attorney, Agent, or Firm* — Smith Risley; Steven P. Wigmore

(57) ABSTRACT

Methods and systems are provided for efficient handover of a media session between heterogeneous Internet Protocol (IP) networks. A mobile device with Internet access can operate a software program to communicate with a corresponding node. The corresponding node may access the Internet through either a Network Address Translation (NAT) router or a firewall. The mobile device establishes a media session with a corresponding node via the transmission of a first media stream and receipt of a second media stream, and a media control channel can optionally be implemented. The mobile device can acquire Internet access through a second IP address, and packets routed between the second IP address and the Internet may traverse a NAT router. The mobile device can evaluate the type of NAT at the second IP address from a stored Local Area Network (LAN) profile. A software routine can determine that handover of the media session from the first IP address to the second IP address is preferred. A software routine can determine efficient handover procedures according to Network handover rules. The mobile device may begin transmitting a third media stream to the corresponding node and the corresponding node can transmit a fourth media stream to the second IP address. A media control channel is optionally supported.

87 Claims, 18 Drawing Sheets

U.S. PATENT DOCUMENTS

2008/0244148 A1* 10/2008 Nix, Jr. et al. ............. 710/313
2008/0259943 A1* 10/2008 Miyajima et al. ............. 370/401
2009/0285175 A1 11/2009 Nix
2011/0103349 A1* 5/2011 Choi et al. ............. 370/331

OTHER PUBLICATIONS

Hesham Soliman (Ed.), Mobile IPv6 Support for Dual Stack Hosts and Routers (DSMIPv6), Internet Engineering Task Force—MIP6 Working Group, Nov. 2007, pp. 1-29.

D. Johnson et al., Mobility Support in IPv6, Internet Engineering Task Force—Request for Comments: 3775, Jun. 2004, pp. 1-112.

C. Perkins et al., Mobile IPv4 Challenge/Response Extensions (Revised), Internet Engineering Task Force—Request for Comments: 4721, Jan. 2007, pp. 1-26.

Latvakoski et al., Vertical Handover During a VoIP Call in Hybrid Mobile Ad Hoc Networks, IEEE Wireless Telecommunications Symposium, Apr. 24-26, 2008, pp. 38-45.

Florian Evers and Jochen Seitz, Reach: A Roaming-Enabled Architecture for Multi-Layer Capturing, IEEE Communications Society WCNC 2008 Proceedings, 2008, 2699-2704.

Pasi Eronen, TCP Wake-Up: Reducing Keep-Alive Traffic in Mobile IPv4 and IPsec NAT Traversal, Nokia Research Center NRC-TR-2008-002, Jan. 31, 2008, pp. 1-10.

EventHelix, IMS Conference Call Flow Diagrams, http://www.eventhelix.com/ims/conference/ims-conference-callprocessor.pdf, May 18, 2008.

J. Rosenberg, Interactive Connectivity Establishment (ICE): A Protocol for Network Address Translator (NAT) Traversal for Offer/Answer Protocols, Internet Engineering Task Force—Mmusic Working Group, Oct. 29, 2007, pp. 1-110.

J. Rosenberg et al, Session Traversal Utilities for (NAT) (STUN), Internet Engineering Task Force—Behave Working Group, Jul. 28, 2008, pp. 1-56.

H. Schulzrinne and E. Wedlund, Application-Layer Mobility Using SIP, ACM SIGMOBILE Mobile Computing and Communications Review, Jul. 2000, pp. 47-57.

V. Gupta, IEEE 802.21 Overview of Standard for Media Independent Handover Services, IEEE 802 Plenary, San Diego, Tuesday, Jul. 18, 2006, pp. 1-65.

Wikipedia, Network Address Translation, http://en.wikipedia.org/w/index.php title=Network_addresstranslation&oldid=233597215, Aug. 22, 2008, pp. 1-6.

W. Jiang and H. Schulzrinne, Comparisons of FEC and Codec Robustness on VOIP Quality and Bandwidth Efficiency, submitted to World Scientific on Jun. 5, 2002, pp. 1-12.

Guest Blogger, WiFi/WiMAX Heterogeneous Seamless Handover, Intel Research, http://blogs.intel.com/research/2008102/wifi_wimax_handover.php, Feb. 2008.

D. Wing, Symmetric RTP / RTP Control Protocol (RTCP), Internet Engineering Task Force—Request for Comments: 4961, Jul. 2007, pp. 1-6.

Y. Rekhter et al, Address Allocation for Private Internets, Internet Engineering Task Force—Request for Comments: 1918, Feb. 1996, pp. 1-9.

J. Rosenberg et al, SIP: Session Initiation Protocol, Internet Engineering Task Force—Request for Comments: 3261, Jun. 2002, pp. 1-264.

J. Rosenberg et al, STUN—Simple Traversal of User Datagram Protocol (UDP) Through Network Address Translators (NATs), Internet Engineering Task Force—Request for Comments: 3489, Mar. 2003, pp. 1-44.

H. Schulzrinne et al, RTP: A Transport Protocol for Real-Time Applications, Internet Engineering Task Force—Request for Comments: 3550, Jul. 2003, pp. 1-104.

C. Perkins, IP Mobility Support for IPv4, Internet Engineering Task Force—Request for Comments: 3344, Aug. 2002, pp. 1-99.

H. Izumikawa et al, SIP-based Bicasting for Seamless Handover between Heterogeneous Networks, Internet Engineering Task Force—Sipping Working Group Draft, Feb. 2008, pp. 1-23.

Nilanjan Banerjee, Seamless SIP-Based Mobility for Multimedia Applications, IEEE Network, Mar./Apr. 2006, pp. 6-13.

Jin-Woo Jung et al, Performance Evaluation of Two Layered Mobility Management Using Mobile IP and Session Initiation Protocol, IEEE Global Telecommunications Conference—2003, Dec. 1-5, 2003 pp. 1190-1194.

Taekyoung Kwon, Network Address Translation (NAT), Seoul National University Movement Research Lab—Computer Game Course (4190.420), Fall 2006, pp. 1-60.

Rong-Hong Jan and Wen-Yueh Chiu, An Approach for Seamless Handoff Among Mobile WLAN/GPRS Integrated Networks, Computer Communications 29, Apr. 2005, pp. 32-41.

H. Tschofenig and G. Bajko, Mobile IP Interactive Connectivity Establishment (M-ICE), Internet Engineering Task Force—MIP6 Draft, Feb. 2008, pp. 1-25.

S. Salsano et al, A Solution for Vertical Handover of Multimedia Sessions Using SIP, Internet Engineering Task Force—Sipping Working Group Draft, Aug. 27, 2007, pp. 1-24.

S. Niccolini et at, Requirements for Vertical Handover of Multimedia Sessions Using SIP, Internet Engineering Task Force—Sipping Working Group Draft, Aug. 27, 2007, pp. 1-15.

Ling-Jyh Chen et al, Universal Seamless Handoff Architecture in Wireless Overlay Networks, UCLA Computer Science Department Technical Report CSD-TR No. 040012, 2004, pp. 1-4.

Rajiv Chakravorty et al, Performance Issues with Vertical Handovers—Experiences from GPRS Cellular and WLAN Hotspots Integration, Proceedings of the Second IEEE Annual Conference on Pervasive Computing and Communications, Mar. 14-17, 2004, pp. 155-164.

A. Dutta et al, Dynamic Buffering Control Scheme for Mobile Handoff, IEEE 17th International Symposium on Personal, Indoor and Mobile Radio Communications, Sep. 2006, pp. 1-11.

F. Chahbour et al, Fast Handoff for Hierarchical Mobile SIP Networks, Proceedings of World Academy of Science, Engineering and Technology, vol. 5 Apr. 2005, pp. 34-37.

P. Srisuresh et al, State of Peer-to-Peer (P2P) Communication Across Network Address Translators (NATs), Internet Engineering Task Force—Request for Comments: 5128, Mar. 2008, pp. 1-32.

Unpublished U.S. Appl. No. 12/120,940, filed May 15, 2008 in the name of John Nix, entitled "Efficient Handover of Media Communications in Heterogeneous IP Networks,".

* cited by examiner

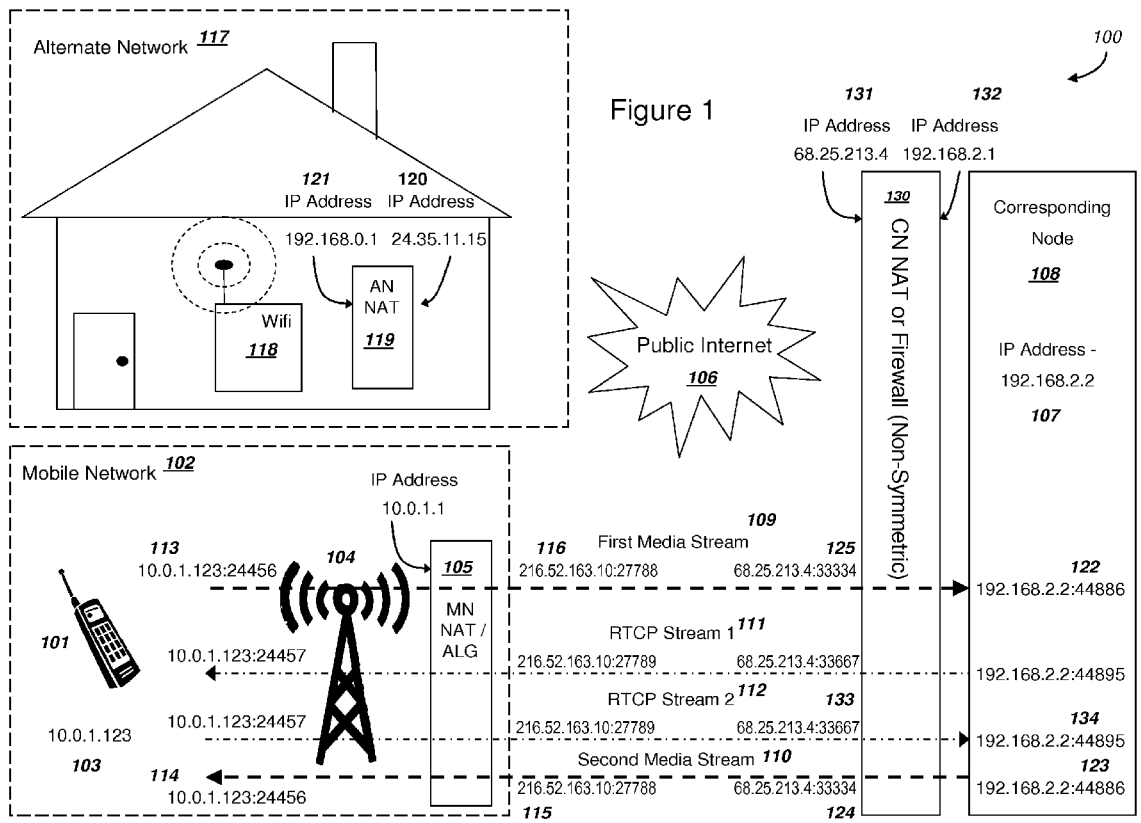

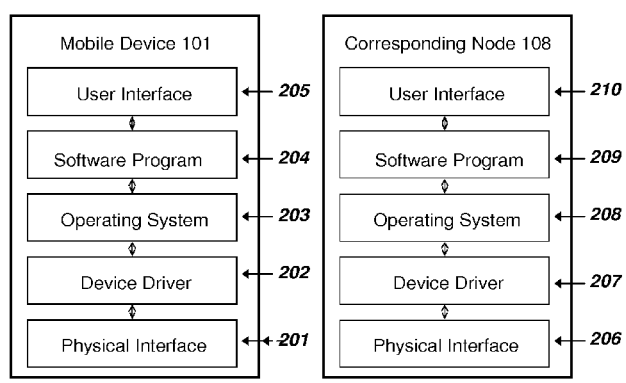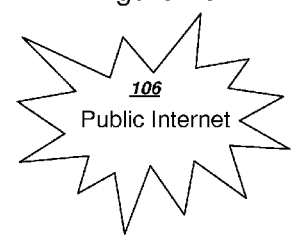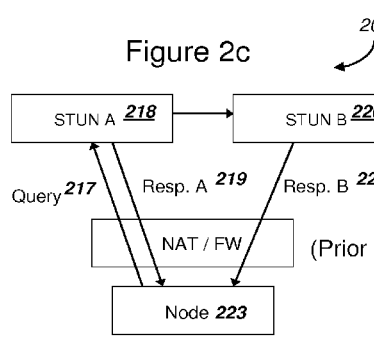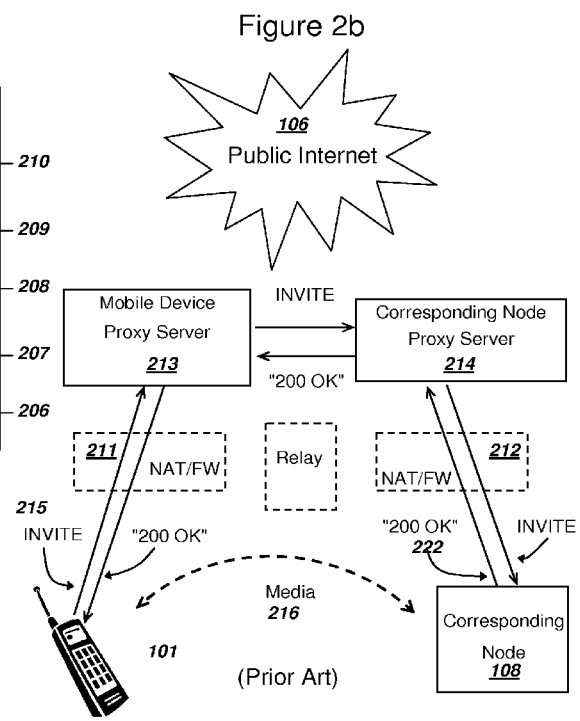
Figure 2a (Prior Art)
Figure 2b (Prior Art)
Figure 2c (Prior Art)

Figure 2d

Network Handover Rules, according to AN/CN NAT or Firewall type    225

CN NAT or Firewall Type

|  |  | Public (Null) | Full Cone | Partial Cone | PR Cone | Symmetric |
|---|---|---|---|---|---|---|
| AN NAT or Firewall Type | Public (Null) | A | A | B | B | C |
|  | Full Cone | A | A | B | B | C |
|  | Partial Cone | A | A | B | B | C |
|  | PR Cone | A | A | B | B | Relay |
|  | Symmetric | A | A | D | Relay | Relay |

Figure 2e

LAN Profile    224

| Location | Type | Identity Token | Media | UDP Timeout (s) | IP Version | UDP Ports Blocked | TCP Ports Open |
|---|---|---|---|---|---|---|---|
| Home Wifi | Full Cone | "Home" | UDP | 60 | IPv4 | None | All |
| Neighbor Wifi | PR Cone | "Bob&Sue" | UDP | 45 | IPv4 | >5000 | 80, 443 |
| Office Wifi | Symmetric | Go2Call_21 | TCP |  | IPv6 | All | All |
| Coffe Shop Wifi | Public (Null) | 'Starbucks_0123 | UDP | 90 | IPv4 | None | 5060 |
| AT&T Wimax O'Hare | Symmetric | ATT_CHI_ORD | UDP | 120 | IPv6 | None | 80, 443 |

Figure 2g

Network Handover Rules

226

CN NAT or Firewall Type

| Public (Null) | Full Cone | Partial Cone | PR Cone | Symmetric |
|---|---|---|---|---|
| X | X | Y | Relay A | Relay B |

Network Handover Rules

227

CN NAT or Firewall Type

| AN NAT or Firewall Type | Public (Null) | Non-Symmetric | Symmetric |
|---|---|---|---|
| Public (Null) | Z | Q | W |
| Non-Symmetric | Q | Q | Relay |
| Symmetric | T | Relay | Relay |

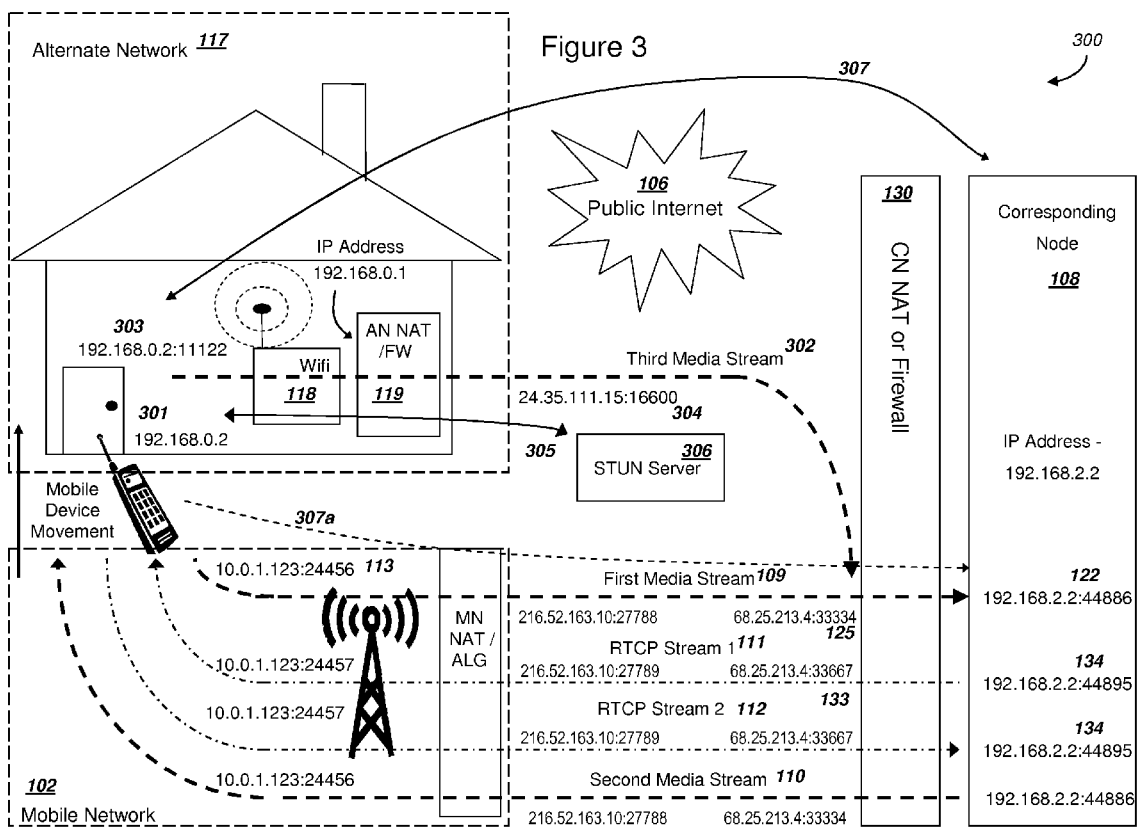

Figure 8

| Stream # | | At Mobile Device | | At MD NAT and CN NAT (external interfaces) | | At Corresponding Node | |
|---|---|---|---|---|---|---|---|
| | | Source | Destination | Source | Destination | Source | Destination |
| 1 | media | 10.0.1.123:24456 | 68.25.213.4:33334 | 216.52.163.10:27788 | 68.25.213.4:33334 | 216.52.163.10:27788 | 192.168.2.2:44886 |
| | RTCP | 68.25.213.4:33667 | 10.0.1.123:24457 | 68.25.213.4:33667 | 216.52.163.10:27789 | 192.168.2.2:44895 | 216.52.163.10:27789 |
| 2 | media | 68.25.213.4:33334 | 10.0.1.123:24456 | 68.25.213.4:33334 | 216.52.163.10:27788 | 192.168.2.2:44886 | 216.52.163.10:27788 |
| | RTCP | 10.0.1.123:24457 | 68.25.213.4:33667 | 216.52.163.10:27789 | 68.25.213.4:33667 | 216.52.163.10:27789 | 192.168.2.2:44895 |
| 3 | media | 192.168.0.2:11122 | 68.25.213.4:33334 | 24.35.111.15:16600 | 68.25.213.4:33334 | 24.35.111.15:16600 | 192.168.2.2:44886 |
| | RTCP | 68.25.213.4:33667 | 192.168.0.2:11123 | 68.25.213.4:33667 | 24.35.111.15:16606 | 192.168.2.2:44895 | 24.35.111.15:16606 |
| 4 | media | 68.25.213.4:33334 | 192.168.0.2:11122 | 68.25.213.4:33334 | 24.35.111.15:16600 | 192.168.2.2:44886 | 24.35.111.15:16600 |
| | RTCP | 192.168.0.2:11123 | 68.25.213.4:33667 | 24.35.111.15:16606 | 68.25.213.4:33667 | 24.35.111.15:16606 | 192.168.2.2:44895 |

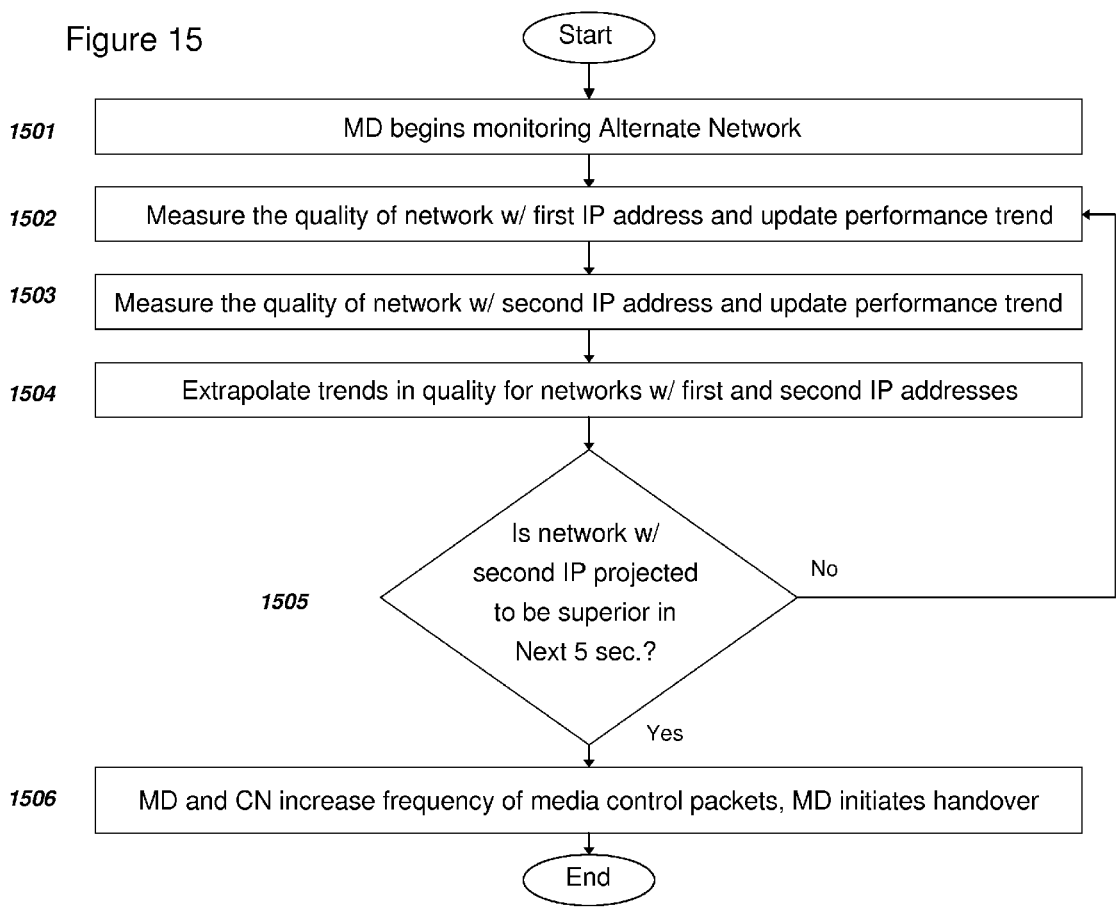

EFFICIENT HANDOVER OF MEDIA COMMUNICATIONS IN HETEROGENEOUS IP NETWORKS USING LAN PROFILES AND NETWORK HANDOVER RULES

CROSS-REFERENCE TO RELATED APPLICATIONS

The subject matter of this application is related to the subject matter of U.S. patent application Ser. No. 12/120,940, filed May 15, 2008 in the name of John Nix, entitled "Efficient Handover of Media Communications in Heterogeneous IP Networks," which is hereby incorporated herein by reference.

BACKGROUND

1. Technical Field

The present methods and systems relate to media communications such as voice or video over packet-switched networks and, more particularly, to efficient methods and systems for handover of active media sessions when mobile devices move between heterogeneous Internet Protocol (IP) networks.

2. Description of Related Art

The use of public packet-switched networks for voice and video communications is expected to continue to rapidly grow. "Internet telephony" is one example of packet-switched telephony. In packet-switched telephony, a packet-switched network such as the Internet serves as a transportation medium for packets carrying data for voice, video, or other media such as music. Voice-over-Internet-Protocol (VoIP) is one example of a collection of standards and protocols used to support voice or video communications over packet-switched networks such as the Internet. Others have been developed as well, including proprietary protocols such as Skype®. A common Internet telephony scheme involves a computer or other device that is capable of connecting to the Internet, transmitting voice or video to a second device such as a gateway, another mobile device, or another computer.

A long-term, planned evolution of existing mobile networks worldwide is to migrate the underlying mobile network protocols and systems from a traditional circuit-switched architecture for voice services to a packet switched architecture that is based on IP standards. Prominent examples include the 3GPP (3rd Generation Partnership Project) consortium's announced "Long-Term Evolution" (LTE) standards as well as the Institute of Electrical and Electronic Engineers' (IEEE) mobile WiMax standards (802.16 or 802.20) and subsequent versions. Although these standards continue to evolve, a common expected feature is that the underlying networks will remain packet switched and based on IP standards such as IPv4 and IPv6.

With these next-generation networks, voice, video, or other media is transmitted over the IP network with access to the public Internet provided by the mobile operator or wireless Internet Service Provider (ISP). Media sessions such as voice calls can be managed by protocols such as the Session Initiation Protocol (SIP) or Extensible Messaging and Presence Protocol (XMPP), and these protocols generally operate at the application layer of the Open Systems Interconnection (OSI) stack. The IP Multimedia Subsystem (IMS) as specified by 3GPP is another example of next-generation mobile-network technology that implements voice calls and media sessions via application-layer software.

Numerous benefits may be realized through the use of packet-switched telephony based on IP standards for mobile networks. First, mobile operators would like to provide access data services such as web-browsing, e-mail, or video through the mobile device, and these services are frequently provided through standard Internet protocols such as Hypertext Transfer Protocol (HTTP) for web browsing, Simple Mail Transfer Protocol (SMTP) for e-mail, or Real-Time Streaming Protocol (RTSP) for video. Thus, mobile network operators may efficiently support many data services through the deployment of an IP network and by assigning IP addresses to mobile devices. With an efficient IP network, the traditional circuit-switched network becomes redundant, and the mobile operator can lower costs and simplify operations by managing a single IP network instead of both an IP network and a circuit-switched network.

Further, voice services worldwide are migrating to IP networks, and the International Telecommunications Union (ITU) projected that nearly 50% of all international phone calls were carried by VoIP in 2007. As the corresponding endpoints for telephone calls or media sessions are increasingly located on IP networks, the most efficient method for connecting calls should be to keep the call control and media on the Internet when possible, as opposed to (i) transferring calls to a circuit-switched network such as the traditional Public Switched Telephone Network (PSTN) and then (ii) transferring the call back to the Internet in order to reach another endpoint that is also connected to the Internet. Also, keeping the VoIP telephone calls from mobile devices natively on the Internet can reduce costs, since traditional per-minute charges for connecting phone calls with the legacy PSTN can be bypassed.

Although the implementation of an underlying IP network for all mobile services provides the significant benefits noted above, several important new challenges are created. An important class of problems relates to handover of active media sessions such as voice calls when the mobile device moves through the mobile network or between different networks. A significant focus of the various wireless Wide Area Network (WAN) standards such as 802.11e and 802.20 pertains to keeping an IP address bound to the mobile device or Media Access Control (MAC) address, even if the mobile device changes base stations due to movement such as driving in a car.

Traditional VoIP protocols such as SIP, Extensible Messaging and Presence Protocol (XMPP), H.323, Media Gateway Control Protocol (MCGP), or Inter-Asterisk Exchange (IAX2), as well as current implementations of proprietary protocols such as Skype®, were originally designed when almost all devices with IP addresses could reasonably be expected to keep the same IP address for the duration of a media session. Further, active sessions in many applications that implement transmission control protocol (TCP) were also not designed for the IP address to change during the session, such as Secure Shell (SSH) or File Transfer Protocol (FTP). Consequently, mobile operators and users may prefer for the IP address of the mobile device to not change during active sessions, and next generation mobile networks using protocols such as WiMax and LTE are generally designed to minimize the change of IP addresses assigned to a given device.

For voice services, changing the IP address during an active call can result in noticeable gaps or delay in the audio for both sides, especially when the IP address is changed as the subscriber moves between completely different networks, such as from a macro-cellular WiMax network to a WiFi (802.11) network in a building. Such a change in IP addresses for the mobile device could be a likely scenario when the subscriber walks into an office building from the street, for example, where a superior connection to the Internet is provided through a local WiFi connection instead of a wide area WiMax connection.

What is needed in the art are techniques for seamless handover of an active telephone call when the preferred IP address of the mobile device changes, such that potential gaps or distortion of audio are minimized, in order to efficiently maintain "peer-to-peer" communication with a corresponding node. What is also needed in the art is the avoidance of a disconnected call upon an IP address change, which would require the user to place a second call to continue the conversation. When the Internet connectivity for the example WiFi network is provided by an ISP that is a different entity from the mobile operator, the two subnets of the public Internet are commonly referred to as "heterogeneous" networks in that they may be separately-managed subnets of the public Internet.

Under the above-referenced scenario of handing over an active media session such as a voice call when a mobile device acquires a new, preferred IP address for communication, a need in the art exists to solve the significant class of problems introduced by various types of Network Address Translation (NAT) routers with port translation and/or firewalls that may operated between a mobile device and a corresponding node (such as a gateway, a packet-based telephone, a personal computer, another mobile device, some other endpoint, etc.). A need exists in the art to solve the problems for handover created by port translation, firewalls which may block either inbound or outbound packets, and application layer gateways (ALGs) that may either alter packets or block packets. The handover of an active call between heterogeneous networks is also referred to as "vertical handover". For example, an ALG, managed by the mobile operator and located between the mobile network and the public Internet, may both (i) compress IP headers and also (ii) perform NAT routing functions.

The corresponding node may also be behind (i.e. be situated on the other side of the public Internet from) a NAT router or firewall, or possibly multiple levels of NAT routers and firewalls. Many NAT routers translate ports in addition to translating IP addresses, thereby allowing multiple hosts within an internal network to share a single public IP address. In order to reduce the potential gaps or delays in the audio during transfer of an existing media session to a new IP address, a need exists to handover an active media session by properly addressing the complexities of intermediate devices that either (i) alter the IP packets transmitted and received by either a mobile device or a corresponding node or (ii) drop packets that do not match pre-determined firewall rules.

There is a need in the art to address the scenario in which the WiFi network and the corresponding node are both behind NAT routers (or "NATs" for short). The use of NATs is expected to increase significantly as the number of broadband connections worldwide increases while (i) the available pool of public IPv4 addresses remains fixed and (ii) the transition from IPv4 to IPv6 proceeds relatively slowly. For example, the CTO of NTT America estimated that there were only 2,000 consumers in Japan accessing the Internet via IPv6 connections, five years after the introduction of IPv6 services by NTT in Japan (Network World, Mar. 31, 2008). IMS Research projected that the number of fixed broadband connections globally will grow from 150 million in 2005 to over 400 million by 2009. There is also a need in the art for vertical handovers to support Internet standards that are actually widely deployed on common consumer and business NAT routers and firewalls, such as utilizing handover techniques primarily through User Datagram Protocol (UDP) or TCP standards.

Although applications such as VoIP or web browsing operating on a mobile device may prefer to keep the same IP address active during a session under normal circumstances, there are many instances when routing the packets through a new or different IP address on the mobile device (MD) may be preferred in order to provide the superior service to the subscriber. A mobile device that provides services through Internet protocols will generally prefer a link-layer connection that provides higher signal-to-noise ratios, lower power requirements, lower costs for the IP connectivity, and/or other benefits. When the mobile device is in the proximity of an 802.11 access point, connecting to the Internet through the 802.11 access point instead of the macro-cellular network may be preferred.

In addition, WiFi technology is currently widely deployed, and the number of access points globally is expected to continue to increase. For example, the market research firm In-Stat estimated that 213 million Wi-Fi chipsets were shipped out worldwide in 2006, representing a 32% growth rate over 2005. When a subscriber places a telephone call on a mobile device that connects to the Internet through WiFi, such as at the subscriber's home or office, and then the subscriber moves out of WiFi range by leaving the premises, and the macro-cellular network begins providing IP connectivity, the underlying or locally assigned IP address of the mobile device will likely change. There could also likely be a period of time when both the IP address from the WiFi network and the IP address from the wireless wide area network (WAN) are available and active.

Similarly, superior connectivity to the mobile device may be delivered by changing from the macro-cellular network to WiFi. For example, if a macro-cellular WiMax network is provided through the 2.50-2.69 GHz frequency bands identified in the ITU WRC-2000 recommendations, the macro-cellular network signal may be degraded by building walls and an improved connection for the device could be obtained by switching the IP connectivity for the mobile device from the macro-cellular network to WiFi when a subscriber walks inside a building with WiFi access. In some instances, the quality of the macro-cellular connection could degrade to the point where it is unusable while WiFi connectivity is strong, such as if the subscriber moves into the basement of a building in close proximity to a WiFi base station. In this example scenario, there exists a need in the art to change the IP address that the mobile device utilizes for communicating with a corresponding node as rapidly as possible through minimizing requirements for call-control signaling, as the preferred routing of both inbound and outbound packets is changed from the macro network to WiFi.

There may be a period of time when both IP addresses are simultaneously active and available to applications on the mobile device, and a need exists in the art to (i) support "make before break" handover, while (ii) simultaneously addressing the significant need existing in the art to address the complexities of NAT routers and/or firewalls that may be located in front of either or both endpoints during handover of a media session. There exists a need in the art to support handover between WiFi and macro-cellular networks that implement VoIP for telephone calls in order to provide significant benefits to the mobile operator and subscriber through increased network coverage. There is also a need in the art for efficient handover techniques that will reduce the potential for dropped media packets or increased jitter in a manner that requires minimal additional servers or processes for the mobile network or communications service provider to manage. A need exists in the art to perform the handover in a rapid manner.

The IP address of the mobile device may also change when the subscriber moves between separate mobile operator networks that both provide IP connectivity, analogous to roaming in traditional 2G and 3G mobile networks. A need exists in the art to properly execute the handover when the preferred IP address changes, thus allowing an "all IP" network infrastructure to keep active telephone calls from being disconnected, even though the subscriber moves between completely-separate networks. In legacy mobile networks such as those with GSM 2G technology, a subscriber's telephone call will generally not remain active if, for example, a T-Mobile® subscriber moves from a location serviced by T-Mobile® to a location serviced by AT&T® (and not by T-Mobile®), even though AT&T® and T-Mobile® may have roaming agreements that allow idle handovers.

The handover of active calls between heterogeneous GSM 2G networks may not be commonly supported because the roaming agreements and the implementation of GSM protocols may not support roaming where calls stay active even though the subscriber moves to a completely-separate network. In contrast, the WiMax specification generally assumes voice and other media services are managed at the application layer of the traditional OSI stack. For example, two separate networks such as Clearwire® and NextWave® may provide mobile services through WiMax. If a subscriber belonging to the Clearwire® network moves from a location serviced by Clearwire® to a location serviced by NextWave® (but not Clearwire®), the IP address of the mobile device will likely change. There exists a need in the art for seamless handover of an active telephone call or other media sessions, even though the subscriber has moved between the two heterogeneous IP-based mobile networks, also known as making a vertical handover.

A need exists in the art for the vertical handover to be managed at the application layer of the OSI stack. Next-generation mobile networks generally assume voice services are transmitted through VoIP and managed at the application layer. This network architecture provides significant opportunities for companies managed independently of the mobile network operators, such as Skype®, Google®, Yahoo®, or Truphone® to provide voice, video, or other media services. These and similar companies may offer end users a communications service. The communications service could be delivered through software programs operating on a mobile device and may have access to the Internet via the mobile operator's data network.

However, the software programs may not have control over low-level functions such as managing the MAC address or associating the mobile device with a particular base station. What is needed in the art are efficient methods and systems to support active call handover for communications services, as the mobile device moves between heterogeneous IP networks. There exists a need in the art for software programs to (i) detect new IP addresses becoming available on the mobile device and (ii) monitor the quality of the links to decide that a handover is desirable, and (iii) execute the handover as efficiently as possible. Thus, there exists a need in the art for seamless handover to be managed via software operating as an application on the mobile device.

In addition, a need exists in the art to, in the event of handover, adequately support media control protocols, such as the Real-Time Control Protocol (RTCP) or Secure Real-Time Control Protocol (SRTCP), that may operate on a separate port than that used for media. Media control protocols can be helpful for monitoring quality and reporting back to the originating device of a media stream about the attributes of media received at another node. A need exists to provide feedback to a node through media control channels, allowing the node to, for example, introduce additional channel coding in the media if excessive bit errors are observed on the receiving side.

A further need exists, in the case where packet loss is observed on the terminating side, to provide feedback to the originating device in order to implement forward error correction (FEC) codes such as packet duplication, or switch to a different, more frame-independent codec such as switching from G.729b to the Internet Low-Bandwidth Codec (iLBC). A need exists in the art to efficiently handover media control messages from a receiving device to a transmitting device in order to quickly evaluate quality of media during handover and determine if the handover is successful or complete.

Further, a need exists in the art to provide direct communication between a mobile device and a corresponding node, in order to provide a more efficient handover of media than is provided by alternative techniques such as Mobile IP (IETF RFC 3775 and 4721, which are hereby incorporated herein by reference). Notable limitations of Mobile IP include triangular routing of media packets between a mobile device and a corresponding node, the complexity and cost of managing servers such as Home Agents for media sessions, implementing virtual Network Interface Cards (NICs) on a mobile device, and multiple other requirements and signaling overhead as specified in the Mobile IP standards. And other needs exist in the art as well, as the list recited above is not meant to be exhaustive but rather illustrative.

SUMMARY

Methods and systems are provided for handover of active media sessions such as telephone calls as a mobile device moves between heterogeneous IP networks. An objective of the invention is to address the challenges noted above for vertical handover of a media session with a mobile device, while also providing desirable results such as reducing complexity and increasing speed and/or efficiency, among other benefits.

The presently disclosed methods and systems, among other aspects, involve selecting handover procedures based on at least one of (a) a determination as to what type of NAT router (or firewall) is situated between the network to which the device is handing over (i.e. the network on which a new, preferred IP address is being obtained) and the public Internet and (b) a determination as to what type of NAT router (or firewall) is situated between the corresponding node (i.e. the node with which the mobile device is conducting a communication session (e.g. a VoIP or PTT call)) and the public Internet.

This approach stems from a realization by the inventor that certain steps need only be taken in situations involving certain combinations of (a) NAT-router types (e.g. null, full cone, partial cone, port-restricted cone, and symmetric) in front of the network to which the device is handing over and (b) NAT-router types in front of the corresponding node, and also that certain steps can be avoided (increasing the efficiency of the handover) when other combinations are present. Note that, in some situations, there may not be a NAT router in front of either or both of (a) the network to which the mobile device is handing over and (b) the corresponding node; this situation (i.e. the absence of a NAT router) is referred to herein in various places as a NAT-router type of "null".

Note further that a full cone NAT router or firewall generally refers to a NAT router or firewall where any host using any source port can send a packet to an IP:port of a node behind the full cone NAT router or firewall, once the node has transmitted an outbound packet from the IP:port. A partial cone NAT router or firewall generally refers to a NAT router or firewall where a host that has previously received a packet from a node behind the partial cone NAT or firewall can use any source port to send a packet to the node, but packets from other hosts on the internet will be blocked. A port-restricted cone NAT router or firewall generally refers to a NAT router or firewall where a host must communicate with the node behind the port-restricted cone NAT or firewall using the same port where a packet from the node had previously been received. A symmetric NAT router or firewall generally refers to a NAT router or firewall where a unique IP:port on the external interface of the symmetric NAT or symmetric firewall will be opened and uniquely associated with an IP:port on an external host, even if the same source port is implemented by a node for communication with external hosts. Further descriptions of these types of common NAT routers and firewalls may also be found in IETF RFC 3489.

A first exemplary embodiment may take the form of methods and systems for handover of an active media session between a mobile device and a corresponding node. The mobile device may initially establish the media session via a first IP address, and subsequently acquire a second, new IP address with connectivity to the public Internet via a first router that is not (a) a symmetric NAT or (b) a symmetric firewall. The corresponding node may have an IP address with a connection to the public Internet provided through a second router that is (a) a partial cone or port-restricted cone NAT router or (b) a firewall that is not a symmetric firewall. In accordance with the methods and systems for this first exemplary embodiment, a first media stream is sent from the mobile device via the first IP address to the corresponding node, and a second media stream is sent from the corresponding node to the mobile device at the first IP address. The corresponding node receives the first media stream at an IP address and port associated with the corresponding node, which may be an IP address and port on the second NAT router.

When the mobile device acquires a second IP address, the mobile device can determine that the IP connection at the second IP address is through either a first NAT router or firewall that is not symmetric. The mobile device can determine that the corresponding node is behind either (i) a second NAT router that is a partial cone NAT or port-restricted cone NAT router or (ii) a firewall that is not a symmetric firewall. The mobile device (e.g. a software program operating on the mobile device) may measure the quality of the network connections providing the first and second IP addresses and determine that handover is preferred. The mobile device may identify a third, public IP address and port on the first NAT router or firewall associated with the second IP address. The mobile device can identify the third IP address and port utilizing techniques such as Simple Traversal of UDP through NAT (STUN), or similar methods.

The mobile device can begin transmitting a third media stream from the second IP address to the IP address and port associated with the corresponding node on the corresponding node NAT or firewall. The mobile device can transmit the third media stream before the mobile device stops transmitting the first media stream. Since the second NAT router (which is associated with the corresponding node) may be a partial cone or port-restricted cone NAT router, or operate with equivalent firewall functionality without translating port numbers, packets received in the third media stream at the second NAT or firewall may well be dropped until a new external port binding is established between the corresponding node and the second NAT router or firewall. The mobile device can transmit a call-control signal to the corresponding node indicating handover, and the call-control signal can include the third IP address and port.

Upon receipt of the call-control signal, the corresponding node can begin transmitting a fourth media stream to the mobile device, using the third IP address and port as the destination for packets transmitted in the fourth media stream. The corresponding node can use a fourth IP address and port both (i) as the source IP address and port for transmission of the fourth media stream and (ii) for receipt of the first and third media streams. The use of the fourth IP address and port as (i) the source address/port for transmission of the fourth media stream and (ii) the IP address and port where the corresponding node receives the first and third media streams may more readily address NATs or firewalls in front of both the mobile device and the corresponding node.

When the first packet in the fourth media stream traverses the second NAT or firewall (which is associated with the corresponding node), a new port binding can be established on the second NAT or firewall, and packets in the third media stream can be subsequently routed to the corresponding node at the fourth IP address and port. The corresponding node can begin transmitting the fourth media stream before stopping the transmission of the second media stream. The mobile device may combine information in the second and fourth media streams to obtain a superior representation of received media, and thereby enhance quality. The corresponding node may also combine information in the first and third media streams to obtain a superior representation of media transmitted by the mobile device.

The mobile device and corresponding node may also implement a media control channel, such as RTCP or SRTCP messages, in order to provide feedback on the quality of media as received at the other node. The mobile device can monitor the quality of the new media session consisting of the third and fourth media streams. After a period of time when both the third and fourth media streams can be successfully transmitted and received, the mobile device or corresponding node may signal that the handover is complete, and the first and second media streams can be terminated. The media session, now consisting of the third media stream and the fourth media stream, can continue, and the mobile device can subsequently monitor the network connections to determine if another handover is preferred, or if the media session consisting of the third and fourth media streams is terminated by a user (e.g., by ending the call).

A second exemplary embodiment may take the form of methods and systems for handover when (i) the mobile device acquires a second, new IP address with connection to the public Internet provided through a first NAT router or firewall that is not symmetric and (ii) the corresponding node has an IP address with a connection to the public Internet provided through a second NAT router or firewall that is symmetric. In accordance with the methods and systems for this second exemplary embodiment, a media session may initially take the form of (i) a first media stream that is sent from the mobile device via a first IP address to the corresponding node and (ii) a second media stream that is sent from the corresponding node to the mobile device at the first IP address.

The corresponding node can receive the first media stream from an IP address and port associated with the corresponding node, which may be an IP address and port on the second NAT router or firewall. When the mobile device acquires a second IP address, the mobile device can determine that the IP connectivity through the second IP address may be through a first NAT router that is not symmetric (or a firewall that is not a symmetric firewall), and that the corresponding node either connects to the Internet via (i) a second NAT router that is symmetric or (ii) a firewall that is symmetric.

The mobile device (e.g. a software program operating on the mobile device) can measure the quality of the network connections providing the first and second IP addresses and may determine that handover is preferred. The mobile device may further identify a third, public IP address and port on the first NAT router associated with the second IP address and a second port number for receipt of media at the mobile device, wherein the media can be transmitted by the corresponding node. The mobile device may transmit a call-control signal to the corresponding node, and the call-control signal may include the third IP address and port number. The corresponding node may receive and processes the call-control signal, and the corresponding node may begin transmitting a fourth media stream to the mobile device with a destination IP address and port of the third IP address and port number on the first NAT router or firewall.

The fourth media stream can be transmitted by the corresponding node before the second media stream stops. The mobile device may monitor the local, second IP address for receipt of the fourth media stream, may begin receiving the fourth media stream, and may identify a new, different port number implemented on the second NAT router or firewall, since the second NAT router or firewall is symmetric. The mobile device may then begin transmitting a third media stream to the public IP address of the second NAT router or firewall, and the mobile device can utilize (i) the port number equal to the source port number for packets received in the fourth media stream for (ii) the destination port number for packets transmitted in the third media stream.

The first and third media streams can initially be transmitted concurrently and may represent essentially dual copies of the same audio or video information. And the same can be said of the second and fourth media streams. Upon successful receipt of the fourth media stream at the second IP address of the mobile device, the corresponding node can cease transmission of the second media stream to the mobile device at the first IP address. Also, upon successful receipt of the third media stream at the corresponding node, the mobile device can cease transmission of the first media stream from the first IP address in order to complete the handover. In this manner, media packets can properly traverse the NAT routers or firewalls serving both the mobile device and the corresponding node, and the handover can be performed in an efficient manner. Note that the mobile device and the corresponding node can also utilize a media control channel for the handed-over media session, which now takes the form of the third and fourth media streams. The media control channel can provide feedback, and may consist of messages formatted according to RTCP, SRTCP, or similar techniques. In addition, media control messages could be imbedded directly within a stream of UDP packets that also contain media, which is the case in the IAX2 protocol.

A third exemplary embodiment may take the form of methods and systems for handover when (i) a mobile device can acquire a second, new IP address with connection to the public Internet provided through a first NAT or firewall and (ii) a corresponding node can have an IP address with a connection to the public Internet provided through a second NAT router or firewall. In accordance with this third exemplary embodiment, an active media session initially takes the form of a first media stream that is sent from the mobile device via a first IP address to the corresponding node and a second media stream that is sent from the corresponding node to the mobile device at the first IP address.

When the mobile device detects that an alternate network is available as a potential candidate for handover of the media session, the mobile device can access a LAN profile to evaluate the presence and type of NAT or firewall associated with the alternate network. The LAN profile can include information pertaining to the various networks the mobile device has previously visited (and/or include provisioned data), and may be identified by tokens such as a Service Set Identifier (SSID), other identifiers in carriers transmitted by base stations, or geographical information such as GPS positioning, among many options. Ethernet MAC addresses within the network may also be utilized as identification tokens.

The LAN profile can include the type of NAT or firewall present at the alternate network, such as null, full cone, partial cone, port-restricted cone, or symmetric. A null value for the type of NAT can represent that a NAT is not present on the alternate network (which provides the second IP address), indicating that the alternate network provides a publicly routable IP address, which could be common for IPv6 addresses. If no first NAT or firewall is present at the alternate network, the LAN profile may note that the network provides a publicly routable IP address.

In addition, the LAN profile may note that a firewall is present with or without network address translation. For example, if IPv6 addresses are used on the alternate network, a firewall may also be present in order to maintain security and handle unsolicited or unauthorized inbound datagrams. The packet-filtering rules for a firewall may be equivalent to the packet-filtering rules for a NAT, but without port translation. A LAN profile may save time in implementing handover procedures, since (i) the mobile device should not need to probe the first NAT or firewall more than once (or perhaps at all) and (ii) the type of NAT or firewall associated with a particular alternate network is unlikely to frequently change.

The mobile device can acquire a second IP address associated with the alternate network. If the mobile device does not have an entry in the LAN profile for the alternate network, the mobile device can evaluate the first NAT or firewall using techniques such as STUN and record the results in a LAN profile for future use. When establishing the first and second media streams, the mobile device can obtain information regarding the presence and type of the second NAT or firewall associated with the corresponding node. With knowledge of the types for the first and second NATs or firewalls, the mobile device can select an efficient handover procedure using a set of network handover rules, which can specify handover procedures to be used according to the types of NATs and network parameters such as the presence and types of firewalls at either node.

For example, the network handover rules may specify a procedure "A" if the first and second NATs are full cone NATs, but specify a second procedure "B" if the first NAT is a partial cone and the second NAT is a port-restricted cone NAT (or if the first NAT is firewall without port translation but with equivalent packet-filtering rules as a partial cone NAT and the second NAT is also a firewall without port translation but with packet-filtering rules equivalent to a port-restricted cone NAT). Other combinations of NATs and handover procedures may be utilized as well, as one benefit of network handover rules is to allow a mobile device to increase the efficiency of handover procedures depending on the types of NATs or firewalls present. In general, one purpose of network handover rules is to ensure that a mobile device takes those but only those handover steps that are necessary given the NAT/firewall type/situation at the network to which it is handing over and also the NAT/firewall type/situation at the corresponding node.

In this third exemplary embodiment, the mobile device can transmit a third media stream from the mobile device from the second IP address to the corresponding node. The corresponding node can transmit and a fourth media stream from the corresponding node to the mobile device at the second IP address, using procedures specified in the network handover rules. The first and third media streams, as well as the second and fourth media streams, can initially be transmitted concurrently, representing a "make before break" handover. A media control channel can also be implemented in order to provide both nodes feedback on the quality of media received. Upon successful receipt of the fourth media stream from the second IP address of the mobile device, the corresponding node can cease transmission of the second media stream. Also, upon successful receipt of the third media stream at the corresponding node, the mobile device can cease transmission of the first media stream, in order to complete the handover.

In exemplary preferred embodiments, the media session and handover can be managed through a software program operating on the mobile device, and the software program can also be managed by a communications service. A user may access a communications service that supports media on a mobile device, such as voice calls to telephone numbers, generally free "peer-to-peer" calling to other devices with Internet access, or video services. The communications service may be provided to a user via an agreement, such as a service contract or a click-though agreement on a web page or form.

A software program operating at the corresponding node can may compatible with a software program on the mobile device. For example, both the mobile device and corresponding node can operate compatible software such as Skype®, GoogleTalk®, compatible SIP clients, or similar software. The software operating at the mobile device and the corresponding node may initially communicate call control through one or several proxy servers in order to establish the first media session (generally taking the form of a first media stream and a second media stream). A software routine may monitor the quality of network connections for the mobile device and predict that a different network connection will be superior for communication in the future.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1 is a graphical illustration of an exemplary system, where media is transmitted and received by a mobile device and a corresponding node before handover, and where the corresponding node communicates through a Network Address Translation (NAT) router or firewall, in accordance with exemplary embodiments;

FIG. 2a is a graphical illustration of software and hardware components for a mobile device and a corresponding node, in accordance with exemplary embodiments;

FIG. 2b is a graphical illustration of an exemplary call-control channel between a mobile device and a corresponding node, in accordance with exemplary embodiments;

FIG. 2c is a graphical illustration of an exemplary system, where a node can determine the presence and type of NAT router or firewall, in accordance with exemplary embodiments;

FIG. 2d is a simplified tabular summary of network handover rules for a mobile device, based upon the type of NAT router at both an alternate network and a corresponding node, in accordance with exemplary embodiments;

FIG. 2e is a simplified tabular summary of a local area network (LAN) profile, in accordance with exemplary embodiments;

FIG. 2g is a simplified tabular summary of exemplary network handover rules for a mobile device, based upon the type of NAT router at either an alternate network or a corresponding node, in accordance with exemplary embodiments;

FIG. 3 is a graphical illustration of an exemplary system, where a mobile device acquires a second IP address associated with a NAT router, determines a public IP address and port number on the NAT router, and begins transmitting media from the second IP address during handover, in accordance with exemplary embodiments;

FIG. 8 is simplified tabular summary illustrating source and destination IP addresses for media packets and media-control-channel packets transmitted and received during handover procedures, in accordance with exemplary embodiments;

FIG. 15 is a flowchart illustrating exemplary steps for a software routine to monitor a trend in the quality of network connections, and to determine that a handover is preferred, in accordance with exemplary embodiments.

DETAILED DESCRIPTION OF EXEMPLARY EMBODIMENTS OF THE INVENTION

FIG. 1

Figure 2F:
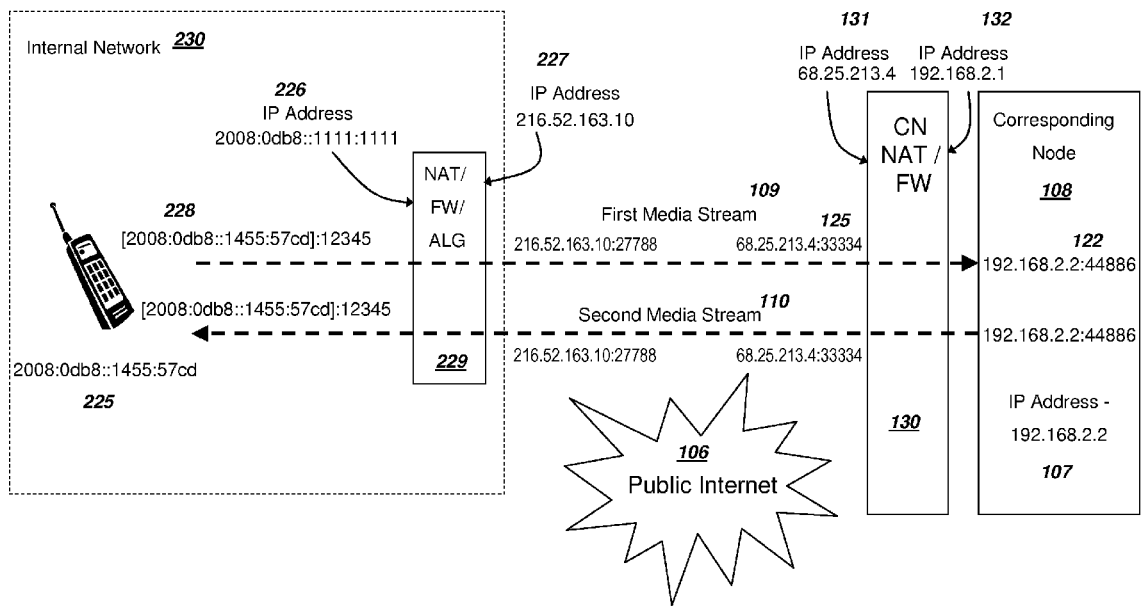
FIG. 2f is a graphical illustration of an exemplary system, where a mobile device accesses an alternate network with an IPv6 address, and a NAT router converts the addresses to IPv4 addresses for communication with other IPv4 servers, hosts, or NAT routers, in accordance with exemplary embodiments.

FIG. 1 is a graphical illustration of an exemplary system, where media is transmitted and received by a mobile device and a corresponding node before handover, and where the corresponding node communicates through a Network Address Translation (NAT) router or firewall, in accordance with exemplary embodiments. The system 100 includes a mobile device (MD) 101 operating within a mobile network (MN) 102. MD 101 preferably is associated with an IP address 103 and can communicate through radio-frequency spectrum and may implement Internet protocols. Although an IPv4 address is shown for MD 101, the MN 102 could implement IPv6, or combinations of IPv4 and IPv6, such as if a mobile device or network operator implements a "dual stack", or similar packet-switched addressing schemes.

Many methods are available for associating an IP address 103 with MD 101. For example, a particular MAC address assigned to hardware within MD 101 can be temporarily assigned an IP address through methods such as Dynamic Host Configuration Protocol (DHCP) for a wireless wide area network (WAN). Alternatively, MD 101 can be associated with an IP address via a Packet Data Protocol (PDP) Context Activation for General Packet Radio Service (GPRS) networks and subsequent standards. Other standards-based methods for MD 101 to acquire an IP address are available as well. The specific IP address numbers shown in FIG. 1 and subsequent figures are for illustration purposes, and other IP addresses could be implemented on each appropriate element.

MD 101 may have a software program operating on the device to manage voice, video, or other streaming communications, and the software program may interface with a user for entering telephone numbers, names, e-mail addresses, or other user IDs with which a user may wish to communicate. The software program may be embedded within the device, such as included within the MD 101 operating system or chip set, or may be a separate application downloaded and installed by the end user. MD 101 may be a mobile phone handset, a laptop computer, a PDA, a tracking device associated with a physical object such as a vehicle, or similar devices that operate software programs and communicate within radio-frequency spectrum. Actions performed by MD 101, such as (i) acquiring IP addresses, (ii) establishing media sessions, and (iii) similar functionality, may be implemented in software operating on MD 101. In addition, MD 101 may have several software programs operating on the device to manage media communications. The software could consist of a software program that is downloaded or installed on MD 101 and may be managed by a communications service. In general, a software program as recited herein may refer to one program, or to more than one program operating cooperatively, perhaps in conjunction with an operating system, firmware, and/or hardware.

The mobile network 102 can provide service to the MD 101 as the user moves within a wide geographical region, such as throughout a city or state. The user may sign up for a communications service that provides services over the Internet, such as paid calling to telephone numbers, free calling to other users on the same communications service, streaming music and video, or discounted calling to telephone numbers through the display of advertisements on the mobile device's screen, among many other examples. The communications service may be provided by a different company than the company operating the mobile network, analogous to using Skype®, Google Talk®, or MSN Messenger® through a fixed broadband connection provided by an ISP. Alternatively, the communications service may be offered by the mobile network operator, similar to traditional mobile voice and data services when a user signs up with communications services such as Verizon®, T-Mobile®, or AT&T Mobility®.

In addition, the communications service may be a service provided by a mobile virtual network operator (MVNO), which may purchase services on a wholesale basis from a mobile network operator and sell services under their own brand; an example of this type of communications service would be with Helio®, which is currently associated with the AT&T® network. In order to access a communications service, a user could either agree to a contract or click on a form to accept a user agreement. The communications service may also have branding information displayed to the user, such as having a logo displayed on a handset screen or printed on the device. The communications service may include software that operates on the mobile device, or a software program that can be downloaded to the mobile device.

Base Station 104 can connect MD 101 to MN 102 via radio communications. Although a single base station is shown, MD 101 may communicate with multiple base stations either simultaneously or in sequence. MN 102 may implement a NAT router associated with the mobile network, such as MN NAT 105, to connect to the public Internet 106. The MN NAT router 105 may support multiple functions including (i) providing a private network internal to the mobile operator, (ii) acting as a firewall between mobile devices and the public Internet for enhanced security within the MN 102, (iii) converting packets between IPv4 and IPv6, and/or (iv) operating as an application-layer gateway (ALG). The application-layer-gateway functionality may be useful for managing communication between mobile devices within MN 102 and external hosts, such as managing ports or call control in SIP-based VoIP calls from mobile devices within MN 102 to external SIP-compatible hosts or devices with connectivity through the public Internet 106.

If IPv6 is implemented within MN 102, MN NAT 105 may be required in order to translate to IPv4 packets for communication with IPv4 hosts or other IPv4 clients with connectivity through the public Internet 106. The NAT router 105 may optionally be omitted, or may be located elsewhere on the Internet. If NAT router 105 is omitted, then publicly-routable IP addresses could be assigned to a mobile device 101 within mobile network 102, but in this case MN NAT 105 may also optionally be a firewall such as a symmetric firewall. MN NAT router 105, if implemented, generally performs both address translation and port translation, especially with IPv4 addresses on the external interface, which may also be referred to as "NATP".

The MN 102 could also implement packet header compression and compress the IP, UDP, and RTP headers in media packets. IP address 103 and similar addresses within MN 102 are illustrated without header compression. MN 102 in FIG. 1 is a simplified representation, and MN 102 may contain multiple servers and elements such as base station controllers, routers, NAT routers, authentication servers, and gateways, among other elements. In addition, a plurality of mobile devices may access the Internet via MN 102.

MD 101 can communicate with a corresponding node (CN) 108 through the public Internet 106. CN 108 may be another mobile device, an IP phone such as a Polycom Sound-Point 501 IP phone, an analog telephone adapter such as a Linksys PAP2, a gateway to the Public Switched Telephone Network (PSTN) such as a Cisco AS-5400XM, a personal computer running a software program for voice or video communications, a server providing features such as voice mail, a server transmitting streaming video such as a television broadcast, or any other device capable of implementing Internet protocols and communicating media with MD 101. CN 108 is preferably an endpoint where media is encoded and decoded and that also implements a codec, some additional example endpoints being (i) a mobile device that converts the digital audio to an analog form for comprehension by a second user, (ii) a camera connected to the Internet that transmits video, or (iii) a server where voice or video is stored for later playback.

CN 108 may also be a computing device running a software program implementing the same protocols as MD 101 to provide "peer-to-peer" communications such as Skype®, Google Talk®, Yahoo Instant Messenger®, MSN Instant Messenger®, AOL Instant Messenger®, or similar programs. CN 108 and MD 101 may implement different protocols, if a server (not shown) between them performs proper translation.

The corresponding node 108 may have a private IP address (CN IP) 107. Private IP addresses are generally not routable on the public Internet 106; examples of private IP addresses can be found in IETF RFC 1918 (which is hereby incorporated herein by reference). The corresponding node 108 may be connected to the public Internet 106 via a corresponding node NAT router (CN NAT) 130, which may be able to map private internal IP addresses to public IP addresses. A software program operating at the corresponding node CN 108 may determine what type of NAT router CN NAT 130 is (i.e. its NAT-router type) through standard techniques such as Simple Traversal of UDP through NATs (STUN or Simple Traversal of UDP through NAT, IETF RFC 3489, which is hereby incorporated herein by reference) or similar methods such as sending a probing packet to a server on the public Internet and analyzing a response to the probe.

CN NAT 130 as illustrated in FIG. 1 may be a non-symmetric NAT router, such as a partial cone, port-restricted cone, or full cone NAT. Some examples of common types of NAT routers may be found in IETF RFC 3489, and other examples are available as well. In accordance with the present invention, if a network, network element, or IP address is not associated with a NAT router, its NAT-router type can be specified as "null". A "null" type for a NAT router may also correspond to an IP address that is publicly routable, which is a possibility identified in IETF RFC 3489.

With a non-symmetric NAT router, a port for a node within the internal network communicating with external hosts can map to one port on the external interface of the non-symmetric NAT router, for the duration the port binding is open and active. In contrast, with symmetric NAT routers, each request from the same internal IP address and port to a different destination IP address or port number may be mapped to a unique external source-IP-address-and-port combination.

If IPv6 is implemented on both the external and internal interfaces of the devices illustrated as AN NAT 119 and CN NAT 130 in FIG. 1, then these devices could function as firewalls to filter inbound traffic from the public Internet 106 and not translate addresses or port numbers. In this case where IPv6 is implemented on either AN NAT 119 or CN NAT 130, the NAT type may also be "null", and firewall functionality on AN NAT 119 or CN NAT 130 could be equivalent to a symmetric firewall, a full-cone firewall, a partial-cone firewall, or a port-restricted cone firewall. For example, symmetric firewall functionality is also described in IETF RFC 3489. CN NAT 130 could be a symmetric firewall that operates without port translation.

As illustrated in system 100, MD 101 and CN 108 have established a media session, and the media session could be a telephone call, a video call, or streaming music from an Internet radio station, as examples. The media session may be implemented through standards-based protocols such as SIP, IAX2, MGCP, XMPP, or similar standards. The media session may also be implemented through protocols managed by third parties such as Skype®, Cisco's Skinny®, or other protocols capable of establishing media communication between endpoints or nodes having Internet connectivity.

The media session may consist of a first media stream 109 (MS 1) transmitted from MD 101 to CN 108 and a second media stream 110 (MS 2) received by MD 101 and transmitted from CN 108. A media stream may constitute a series of packets containing digitized media that are transmitted from a sending node to a receiving node. A media stream may be differentiated from another media stream by observing the source IP:port (i.e. IP address and port number) and destination IP:port within packet headers for packets contained in the media stream, as the packets traverse the Public Internet 106. For example, in system 100 illustrated in FIG. 1, a packet contained in MS 1 109 on the public Internet 106 may (i) have the IP address 216.52.163.10 as the source IP address and 27788 as the source port and (ii) have the IP address 68.25.213.4 as the destination IP address and 33334 as the destination port. A packet with a different source IP address, source port, destination IP address, and/or destination port could be considered as belonging to a different media stream.

MS 1 109 and MS 2 110 may consist of voice that has been digitized or compressed with a codec such as AMR (adaptive multi-rate), GSM-EFR (Global System for Mobile Communications Enhanced Full Rate), iLBC (Internet Low Bandwidth Codec), VMR (Variable Multi Rate), G.711, or some other codec, and the media may be encapsulated within packets formatted according to the User Datagram Protocol (UDP), Transmission Control Protocol (TCP), or similar or subsequent standards. The media streams MS 1 109 and MS 2 110 could also consist of video that has been digitized with a video codec such as MPEG, H.264, VC-1, or some other video codec, or a combination of voice and video, and also be transmitted within UDP or TCP datagrams.

If the media is transmitted according to UDP, the UDP header checksums may preferably be disabled, since many codecs implemented on a mobile device, such as GSM-EFR or AMR, may be designed to be bit-error robust. Bit errors can likely be introduced through the transmission of packets via radio-frequency spectrum, and an entire packet should preferably not be dropped resulting from a bit error in the transmitted media.

MS 1 and MS 2 may be transmitted according to the Real-time Transport Protocol (RTP), Secure Real-time Transport Protocol (SRTP) or other methods that properly sequence the media for playback at the receiving end. Although the transmission of media via UDP may be preferred, other protocols could be implemented as well, such as TCP. Note that TCP could be required for the media if a NAT router or firewall along the media path blocks UDP packets for example.

The media session consisting of MS 1 and MS 2 illustrated in System 100 may optionally include a feedback mechanism to each node to indicate the quality of the media stream at each receiving end, by using a media control protocol. Real-time Transport Control Protocol (RTCP) stream 1 (111) consists of packets periodically sent from CN 108 to MD 101 in order to provide information such as round-trip delay, packet loss, bit errors, and/or jitter for media received in MS 1 109. An example message in the media control channel could be an RTCP or an SRTCP receiver report. Feedback on the quality of the media transmitted can be useful for improved management of mobile-IP links, which naturally incur bit errors and packet loss as the mobile subscriber moves into areas with lower-quality coverage from base stations. Although the feedback mechanism illustrated in FIG. 1 is labeled "RTCP stream", the feedback mechanism could be a generic media control channel and other protocols besides RTCP could be implemented. In addition, the feedback mechanism could optionally include information packets inserted within a media stream.

Based on the feedback within RTCP stream 1 111, MD 101 may make adjustments such as (i) implementing forward-error-correction (FEC) techniques, (ii) changing the codec for transmission of MS 1, or (iii) changing the channel-coding parameters for an adaptive codec such as AMR. Similar adjustments to media transmitted in MS 2 110 by CN 108 could be made based on feedback via RTCP stream 2 112. Some examples of feedback mechanisms other than RTCP include Secure Real-time Transport Control Protocol (SRTCP), RR JITTER or RR LOSS messages within the IAX2 protocol, and proprietary methods.

The media control protocol to provide feedback can also be implemented logically within MS 1 and MS 2, such that feedback messages are inserted within the media stream, which is the case with IAX2 RR JITTER and RR LOSS messages. SRTCP is associated with SRTP, which allows encryption of the media for transmission through the public Internet 106, thereby maintaining confidentiality as the media passes through routers and hops on the public Internet 106 that are not under the control of either a mobile subscriber on MN 102, or the user at the corresponding node 108.

The feedback mechanism illustrated in system 100 may be implemented in ways other than an explicit media control channel such as that shown in RTCP stream 1 111 and RTCP stream 2 112, such as using "out of band" signaling through a call control channel such as SIP NOTIFY messages, or methods that are not based on current, widely deployed IETF RFC standards. The feedback mechanism implemented via RTCP stream 1 111 and RTCP stream 2 112 is not required for useful communication between MD 101 and CN 108, but may be helpful for managing quality of the media and also managing handovers. RTCP Stream 2 112 can be received on IP:port 133 on CN NAT 130, which can then forward packets to CN 108 at IP:port 134.

MD 101 preferably transmits and receives media through the use of specific ports. In the exemplary system illustrated in System 100, IP:port 113 is used by MD 101 for sending media and IP:port 114 is used by MD 101 for receiving media. As illustrated in FIG. 1, IP:ports 113 and 114 may be the same port number, although they could be different ports. In addition, although IP:ports 113 and 114 are shown as IPv4 addresses and ports, they could also be IPv6 addresses and ports, or comply with similar packet-switched addressing schemes. Using the same port number for IP:ports 113 and 114 may help simplify potential NAT-traversal or firewall-traversal issues. If the MN NAT 105 functions as an application layer gateway (ALG), with SIP calls for example, the MN NAT 105 may make adjustments to the Session Description Protocol (SDP) messages within call-setup requests, to properly inform the CN 108 of the public IP:ports on the MN NAT 105 for sending or receiving the media streams.

For the example media session illustrated in System 100, according to the SIP protocol with RTP media, the ALG functionality of MN NAT 105 maps packets (a) between IP:port 113 and IP:port 116 and (b) between IP:port 114 and IP:port 115. Insertion of IP:ports 115 and 116 into the body of the SDP messages transmitted by MN NAT 105 may be useful if the MD 101 belongs to a private IP network (i.e. has an IP address that is not publicly routable), as shown by mobile device IP address 103 (10.0.1.123), which is among the IP addresses that are reserved for private networks according to IETF RFC 1918.

If a software program on the MD 101 is operating a protocol that is not understood by an application layer gateway operating on MN NAT 105, such as with a proprietary protocol or with encrypted packets, as examples, the above-described port translation within the body of session-description messages at MN NAT 105 may not be possible by the application layer gateway functionality operating on MN NAT 105. In this case, IP:ports 113 and 114 may preferably use the same port number and IP:ports 115 and 116 may also preferably use the same port number.

CN NAT 130 may route packets between the Public Internet 106 and the Corresponding Node 108. CN NAT 130 may have an external interface corresponding to a public IP address 131 and an internal interface corresponding to the internal network IP address 132. Although a single NAT router is illustrated in FIG. 1 for CN NAT 130, multiple NAT routers may operate between a node and the Public Internet 106. In this case, the multiple NAT routers may be considered a single logical NAT router for the purposes of implementing the efficient handover techniques described herein. IP:port 125 on CN NAT 130 can receive media transmitted by MD 101 in MS 1 109, and CN NAT 130 can route the incoming packets to IP:port 122 on CN 108. If CN NAT 130 operates as a non-symmetric firewall without network translation, then it would be possible that IP addresses and port numbers would not be translated, and in that case IP:port 122 could be the same as IP:port 125, IP:port 133 could be the same as IP:port 134, and IP:port 123 could be the same as IP:port 124. If IPv6 is implemented at CN 108, the Public Internet 106, and MD 101 at IP 103, CN NAT 130 may be a non-symmetric firewall without network address translation functionality.

If CN NAT 130 operates as a NAT and not a firewall, CN 108 may use IP:port 123 to transmit media to MD 101 in MS 2 110, and CN NAT 130 can translate packets destined for MN NAT 105 with (a) a source IP:port of 123 to (b) a source IP:port of 124 on the external interface. IP:port 122 and IP:port 123 are illustrated as having the same port, and IP:port 125 and IP:port 124 are also illustrated as having the same port, although different ports could be used as well. For example, if the SIP protocol was used and CN NAT 130 contained a SIP application layer gateway (ALG) function, then implementing separate ports for the transmission and receipt of media could be supported, since the ALG could manage the mapping of ports and substitution of ports within SDP messages. If a proprietary or encrypted protocol is implemented for communication between MD 101 and CN 108 across CN NAT 130, then utilizing the same IP:port 122 and IP:port 123 numbers on CN 108 may be preferred for the transmission and receipt of media packets.

Note that, as used herein, one or more IP addresses or IP-address-and-port pairs (i.e. IP:ports) being "associated with" an entity (e.g. a mobile device or a corresponding node) does not necessarily mean that these IP addresses and/or IP:ports are located at (i.e. assigned to) the entity itself.

Rather, the "associated with" language also contemplates an arrangement where the entity is behind a NAT router and/or an application layer gateway and/or firewall, which alone or in combination would function to associate these IP addresses and/or IP:ports with the entity. In addition, if the corresponding node is a relay or a node has a publicly routable IP address, the "associated with" language contemplates the IP address and IP:port also being assigned to the device.

A user operating, owning, or having access to MD 101 may also have access to an alternate network (AN) 117 which can provide connectivity to the Public Internet 106. AN 117 may include a separate wireless network, such as a WiFi access point 118 using IEEE 802.11 or similar standards. The WiFi access point 118 may obtain Internet connectivity through an alternate network NAT router (AN NAT) 119 having a broadband connection from an Internet Service Provider (ISP) via fixed lines such as digital subscriber line (DSL), cable, fixed wireless, fiber optic cables, etc. The ISP may be an entirely separate entity from the operator of MN 102.

AN 117 may provide superior network connectivity to the MD 101 when the MD is within proximity of AN 117. The superior network connectivity would likely take the form of various combinations of higher signal-to-noise ratios (SINRs) via stronger signals, lower power requirement, lower costs for bandwidth, less packet loss, lower delay, fewer bit errors, greater overall bandwidth, less jitter, enhanced security, and/or other benefits.

Since AN 117 likely belongs to a different subnet of the public Internet 106 than does MN 102, a different IP address may well be assigned to MD 101 when MD 101 connects to AN 117. For example, the ISP serving AN 117 could provide connectivity to the public Internet 106 through a class B or class C IPv4 address range that is different from the IPv4 address range belonging to MN 102. Further, the routing of packets from CN 108 to MD 101 will change when MD 101 is receiving those packets via AN 117, since the destination of packets on the public routable Internet 106 would be through the alternate-network public IP address 120 associated with AN 117.

As stated above, AN 117 may have AN NAT 119 that converts packets between being addressed using internal, private IP addresses within the AN 117 to using addresses routable on the public Internet 106. AN NAT 119 can be the default gateway within AN 117, with an example default gateway IP address 121 shown as 192.168.0.1. The AN NAT 119 may be integrated with the WiFi router 118, and/or with a DSL modem or cable modem, or may reside within the data centers operated by an ISP. Note that multiple levels of NAT may exist between MD 101 and the public Internet 106, as opposed to the single AN NAT 119 that is illustrated in system 100. In this case, the multiple NAT routers may be considered a single logical NAT router for the purposes of implementing the efficient handover techniques described herein. In some embodiments, AN NAT 119 may either (i) not be present or (ii) perform as a firewall without NAT functionality, in which case IP addresses assigned within AN 117 may be publicly routable. In addition, IPv6 or other packet switched IP addressing schemes could be utilized instead of the IPv4 addressing illustrated for AN 117 in FIG. 1.

Although the wireless network within AN 117 is illustrated as WiFi, the local IP connectivity could be provided using various wireless technologies such as Bluetooth, infrared, Ultra Wideband, a femtocell, and/or similar local-area-networking technologies. In addition, the AN 117 IP connectivity could be directly provided by a wired connection, such as when the mobile subscriber plugs an Ethernet cable or Universal Serial Bus (USB) directly into MD 101, if MD 101 is a laptop computer, for example.

And although the alternate network 117 is illustrated as being roughly coextensive with a residence, AN 117 may be instead be situated as roughly coextensive with an office building, a commercial establishment such as a coffee shop that provides WiFi access, a municipal WiFi hotspot, an access point provided by a third-party "mesh network", a university campus, and/or other physical locations where IP connectivity separate from MN 102 is available to MD 101. Further, although MD 101 is illustrated as communicating with a single corresponding node 108 in System 100, MD 101 may communicate multiple media streams simultaneously with multiple corresponding nodes, which could be the case in a three-way call or a conference call, as examples. In addition, AN 117 could be a separate wireless network provided by a different mobile network operator, among many other possibilities. AN 117 and MN 102 would commonly be and herein are referred to as "heterogeneous" networks, and the transfer of a media session involving MD 101 between MN 102 and AN 117 would commonly be and herein is referred to as a "vertical handover".

FIG. 2*a*

FIG. 2*a* is a graphical illustration of software and hardware components for a mobile device and a corresponding node, in accordance with exemplary embodiments. FIG. 2*a* is illustrated according to common components within an MD 101 or CN 108 according to prior art. MD 101 and CN 108 may consist of multiple components in order to provide services such as voice or video calls to a user. The physical interface 201 of MD 101 may provide radio-frequency communications with networks including a MN 102 via standards such as GSM, UMTS, mobile WiMax, CDMA, and/or other mobile-network technologies. The physical interface 201 may also provide connectivity to local networks such as 802.11 WLAN, Bluetooth, or possibly wired connections such as Ethernet, when those networks are available to MD 101, among other possibilities.

The physical interface 201 can include associated hardware to provide the connections such as radio-frequency (RF) chipsets, a power amplifier, an antenna, cable connectors, etc. If CN 108 is also a mobile device, such as another mobile handset on MN 102 or another wireless network providing Internet connectivity, the physical interface 206 can be similar to the physical interface 201 and support radio-frequency communication with a transceiver station associated with a base station similar to base station 104 connecting to a mobile network. If CN 108 is a personal computer, server, or gateway, or other generally stationary device, the physical interface 206 may be a wired interface connecting to Ethernet and similar LAN technologies. And other possibilities exist as well, without departing from the invention. The physical interfaces 201 and 206 could also include microphones and speakers for audio, or a camera for video.

Device drivers 202 and 207 can communicate with the physical interfaces 201 and 206, respectively, providing hardware access to higher-level functions on MD 101 and CN 108. Device drivers may also be embedded into hardware or combined with the physical interfaces. MD 101 and CN 108 may preferably include an operating system 203 and 208 to manage device drivers 202 and 207, respectively. The operating systems can also manage other resources such as memory and may support multiple software programs operating on MD 101 or CN 108 at the same time. The operating systems 203 and 208 can include Internet protocol stacks such as a UDP stack, TCP stack, RTP stack, etc., and the operating systems 203 and 208 may include voice and video codecs. Voice or video codecs could instead be integrated with the device driver 202 or 207, embedded into hardware, or included in software programs. An example operating system 203 for MD 101 includes Linux, Windows® Mobile, Symbian®, or Palm® OS.

The software program 204 or 209 may be an application programmed in a language such as C or C++ and could provide functionality to the subscriber such as a VoIP client, a video client, instant messaging, e-mail, or web-browsing capabilities. Many of the logical steps for operation of MD 101 can be performed in software by various combinations of device driver 202, operating system 203, and software program 204. When MD 101 is described as performing various actions such as acquiring a new IP address, monitoring a port, transmitting a packet or media stream, or similar tasks, specifying that MD 101 performs an action can refer to (i) software, hardware, and/or firmware operating within MD 101 performing the action, or also (ii) software, hardware, and/or firmware operating with MD 101 in conjunction with software, hardware, and/or firmware operating on external servers for performing the action.

Likewise, when CN 108 is described as performing various actions such as monitoring a port, transmitting a packet or media stream, or similar tasks, specifying that CN 108 performs an action can refer to (i) software, hardware, and/or firmware operating within CN 108 performing the action, or also (ii) software, hardware, and/or firmware operating with CN 108 in conjunction with software, hardware, and/or firmware operating on external servers for performing the action. Note that MD 101 and CN 108 may also include user interfaces 205 and 210, respectively, each of which may include one or more devices for receiving inputs and/or one or more devices for conveying outputs. User interfaces are known in the art, and thus are not described in detail here.

For many example media sessions between MD 101 and CN 108, the physical interfaces, device drivers, operating systems, and user interfaces may be different, such as if MD 101 is a mobile handset and CN 108 is a gateway to the PSTN. However, the software programs 204 and 209, operating on MD 101 and CN 108, respectively, could be of the same type, such as a Skype® client on MD 101 and another Skype® client on CN 108. Other example compatible software programs operating on both MD 101 and CN 108 could include SIP clients, IAX2 clients, or other "peer-to-peer" clients such as GoogleTalk®.

The device drivers 202 or 207, operating systems 203 or 208, and software programs 204 or 209 could optionally be combined into an integrated system for managing MD 101's or CN 108's functionality, respectively. In addition, the operating systems 203 or 208, and software programs 204 or 209, may be combined respectively within the same device. Although a single physical interface, device-driver set, operating system, software program, and user interface are illustrated in FIG. 2a for each device, MD 101 and CN 108 each may contain multiple physical interfaces, device drivers, operating systems, software programs, and/or user interfaces. And other arrangements could be used as well, without departing from the invention.

FIG. 2b

FIG. 2b is a graphical illustration of an exemplary call-control channel between a mobile device and a corresponding node, in accordance with exemplary embodiments. FIG. 2b is illustrated according to common techniques implemented for call-control channels within the prior art. The call-control channel of FIG. 2b can be used to establish a media session between two endpoints or nodes with Internet connectivity, even though the two endpoints may not have the ability to initially directly communicate due to the presence of NATs or firewalls, illustrated by NATs 211 and 212.

The endpoints MD 101 and CN 108 may each register with a proxy server 213 or 214, respectively. The registration process generally opens external port bindings on NATs 211 and 212 for communication from the Public Internet 106 to MD 101 and CN 108, respectively. The open external port bindings on NATs 211 and 212 may be kept open by periodic messages sent by MD 101 and CN 108 to their respective proxy servers, and the proxy servers may send messages such as call requests through an opened port on a NAT or series of NATs between the proxy server and a node. The proxy servers could also be referred to as "supernodes" according to the Skype protocol, Asterisk servers according to the IAX2 protocol, SIP proxies according to the SIP protocol, or Gatekeepers according to the H.323 protocol, as examples. Note that either NAT 211 or NAT 212 may be a firewall without network-address-translation functionality, and the periodic registration process with a proxy server may be required in order to keep the external port on the firewall open and bound, in order to receive in-bound call requests.

A call request 215 can be generated by MD 101 when an end user keys in a telephone number and presses "dial", or when an end user clicks on an icon or name within a buddy list, as examples. The call request may be formatted according to a protocol that is capable of establishing media sessions through the Internet, such as SIP, XMPP, IAX2, H.323, MGCP, Skype®, or similar methods. Call request 215 is illustrated as formatted according to the SIP protocol. The call request may be encapsulated in packets according to a transport protocol such as TCP, UDP, TLS (Transport Layer Security), SSL (Secure Socket Layer), or similar methods that are commonly supported on the Internet and also by NAT routers.

Proxy server 213 can process the call request by locating the appropriate proxy server for CN 108 via methods such as the Domain Name System (DNS) or a distributed hash table (DHT), as examples. Although not shown, there may be additional layers of proxy servers, such as a gateway proxy, wherein the proxy server 213 passes call requests up to a gateway proxy, and the gateway proxy then locates and passes the call request to a gateway proxy for the corresponding node's network. In addition, with a large network of hundreds of thousands of nodes or more, a network can consist of a plurality of distributed proxy servers. Further, each proxy server can support a plurality of nodes. And other variations are possible as well.

When the call request 215 reaches the corresponding node proxy 214, the corresponding node proxy 214 may locate, and then forward the call request to, the corresponding node 108. The call request 215 may typically include information useful for setting up the media session 216, such as a desired codec and the appropriate public IP address and port for CN 108 to transmit media to, perhaps representing an IP:port on a public Internet interface of NAT router 211, if it is present. CN 108 may respond to the call request with a message that includes the appropriate public IP:port for MD 101 to transmit media to, illustrated in FIG. 2b according to the SIP protocol with "200 OK". Other call-control messages may also be passed between the nodes and proxy servers, such as TRYING and 180 PROCEEDING, as examples. Through these and similar methods, MD 101 and CN 108 can establish media sessions and communicate call-control information.

Once the initial call request and response between MD 101 and CN 108 has been processed, the endpoints may also then communicate further call control directly between them, since a communication channel has been established, although direct communication of call control between MD 101 and CN 108 may require either use of a different protocol than SIP, or future extensions to SIP as currently specified in IETF RFC 3261, which is hereby incorporated herein by reference. After an initial call request is processed by the endpoints, further call-control messages may be processed, such as SIP Re-Invite, SIP UPDATE, or similar transfer messages in other protocols, a SIP BYE or similar "hang up" messages in other protocols to terminate the media session. Other call-control messages may add features such as establishing a conference with a third endpoint (not shown). And other examples are possible as well.

Although a single protocol (i.e. SIP) is illustrated in FIG. 2b, the two endpoints may not necessarily use the same call-control protocol. For example, MD 101 may implement the SIP protocol, whereas CN 108 may implement the XMPP protocol. Proxy server 213 or 214 may translate the protocol in order to establish communication between the endpoints, or the translation may occur on a third server within the call-control flow. If the two endpoints implement different call-control protocols, preferably they can communicate according to the same codec or, alternatively, implement transcoding. FIG. 2b also illustrates that a relay may be used to communicate media between two NATs, and in fact the use of a relay may be required if the two NATs are symmetric. Further, the relay illustrated in FIG. 2b may be used during a call-handover process. For example, the relay could function as an intermediate corresponding node when MD 101 moves to AN 117, and the relay could then forward packets to CN 108, representing a terminating node.

If IPv6 addresses are implemented on the nodes and proxy servers, then the servers illustrated as a NAT routers 211 and 212 in FIG. 2b could function as firewalls as opposed to translating network addresses. The firewall functionality may be analogous to rules within traditional NAT routers for IPv4, such that addresses and ports may not be translated, but inbound packets from the Public Internet 106 could be rejected from an external interface unless an outbound packet had previously been transmitted.

FIG. 2c

FIG. 2c is a graphical illustration of an exemplary system, where a node can determine the presence and type of NAT router or firewall, in accordance with exemplary embodiments. FIG. 2c is illustrated according to common techniques implemented within the prior art. In system 200, a node 223 with an IP address can probe servers on the public Internet 106 to determine the type of NAT or firewall that may connect the node to the public Internet (i.e. be "in front" of the node). The node 223 may send a packet such as a query 217 to a first server 218, illustrated as STUN A (where STUN stands for "Simple Traversal of UDP through NAT," IETF RFC 3489), which may then respond to the source IP address and port that the first server 218 observed as transmitting the query.

The response 219 can contain the source port and IP address that STUN A server 218 observed in the query transmitted by the node 223. The server 218 can also then forward the query to a second server, illustrated as STUN B 220. The second server can then also forward a response 221 back to the source port and IP address for the original query transmitted by the node 223 to STUN A 218. The node 223 can monitor the port on which it transmitted the query, in order to obtain responses from the servers. If two responses 219 and 221 are received, one each from the first and second servers 218 and 220, and the source IP address of the query packet received by the servers is different than the IP address of the node, the node may determine the NAT type is a full cone. If only one response from 219 is received, and the source IP address observed by the server is the same as the IP address of the node, the node may determine the NAT type is "null", but a firewall is present. If only one response is received by the node from the first server, and the source IP address of the query packet received by the servers is different than the IP address of the node, the node may determine the NAT type is either (i) symmetric, (ii) port-restricted cone, or (iii) partial cone.

Further queries from the node 223 also could further resolve the NAT or firewall type. If the response 219 received by MD 101 reports that the IP address observed by server 218 matches the IP address that MD 101 observes for its physical interface, MD 101 can evaluate that its IP address is publicly routable and that the NAT router type is "null". Other, similar, techniques besides STUN can be used by a node to determine the NAT-router type. Although a single NAT is shown between the node 223 and the servers 218 and 220, multiple NATs or firewalls may exist between the node 223 and the servers. In this case, the multiple NATs can be evaluated as a single logical NAT. Example descriptions of the common types of NAT routers can also be found in IETF RFC 3489, section 5. In the present invention, a NAT router type of "null" corresponds to having a publicly routable IP address, which is one possible network environment described in IETF RFC 3489.

FIG. 2d

FIG. 2d is a simplified tabular summary of network handover rules for a mobile device, based upon the type of NAT router at both an alternate network and a corresponding node, in accordance with exemplary embodiments. What constitutes an optimal or at least highly efficient handover method between a mobile device and a corresponding node may depend upon the network environment and the one or more types of NAT router or firewall operating between the two nodes.

For example, if the corresponding node routes packets through a partial cone NAT and the mobile device routes packets through a port-restricted cone NAT on the alternate network, then the mobile device may select one network handover procedure, denoted procedure "B" in FIG. 2d. In contrast, if both the alternate NAT router 119 and the corresponding node NAT router 130 illustrated in FIG. 1 are symmetric NAT routers or symmetric firewalls, then a different network handover procedure may be selected, illustrated as "relay" in FIG. 2d. If both NAT routers are symmetric, then procedure "A" may not be possible.

Some common types of NAT routers are listed in FIG. 2d, such as full cone, partial cone, port-restricted cone, symmetric, and null. The heading "public" or "null" can indicate the node has a publicly routable IP address, and a NAT router may not be present. In addition, the types of NAT routers could be broken down into additional categories, such as classifying port restricted cone routers into two common variations where (i) one variation only allows inbound packets from a specific host IP:port and (ii) a second variation allows inbound packets from another host that implements the same port. Further, some NATs implement Universal Plug and Play (UPnP), which may be considered another form of NAT and may also optionally be included in a set of network handover rules 225. Additional kinds of NATs or firewalls may be introduced in the future, and the precise performance of consumer and business NATs and firewalls in widespread commercial use is not currently standardized. The primary categories of NATs illustrated in FIG. 2d may represent the categories in IETF RFC 3489.

Although the handover procedures A, B, C, D, and "relay" are illustrated according to the various combinations of NAT types, other methods and combinations could be implemented in a set of network handover rules 225 as well, although they may be less optimal. For example, a "relay" could potentially be used in other handover cases illustrated in FIG. 2d, such as if AN NAT 119 is symmetric and CN NAT 130 is a full-cone. However, utilizing the "relay" in this instance may require additional steps and take additional time as compared with method "A" denoted in FIG. 2d.

The "Network Handover Rules" illustrated in FIG. 2d could be stored within memory on the mobile device, accessed via a software program 204 or operating system 203, or downloaded by the mobile device from a central server. A set of network handover rules 225 could also be logically programmed into software operating on MD 101 or a computer communicating with MD 101, such as a server on the mobile network assisting MD 101 with handover. MD 101 or a communications service operating on MD 101 may implement the network handover rules 225 to select handover procedures depending only on a first NAT router associated with the alternate network, depending only on a second NAT router associated with the corresponding node, or depending on both the first and second NAT routers.

Examples of the handover procedures A, B, C, D, and "relay" can be found within the present invention and related applications. In summary, "A" may be the handover procedure depicted and described in connection with FIGS. 3-5 of U.S. patent application Ser. No. 12/120,940, filed May 15, 2008 in the name of John Nix, entitled "Efficient Handover of Media Communications in Heterogeneous IP Networks," while "B" may be the handover procedure depicted and described in connection with FIGS. 3-5 of the present application. Furthermore, "C" may be the handover procedure depicted and described in connection with FIGS. 9-11 of the present application, while "relay" may be the handover procedure depicted and described in connection with FIG. 14 of the present application.

Variations on the above-referenced techniques could also be used in order support efficient handover of media communications, and different procedures could be used in network handover rules as well. For example, although "relay" is illustrated as preferred for some combinations of types of alternate-network and corresponding-node NAT routers and firewalls in FIG. 2d, new techniques could be introduced that attempt to either (i) guess the port number used on a distant NAT router or firewall, or (ii) query a NAT router directly to obtain the external port bindings, and these query results could be transmitted to the other node in order to facilitate handover. These new techniques for handover could be utilized by MD 101 in substitution for the "relay" or other handover techniques denoted in network handover rules 225. And other handover procedures besides those referenced in FIG. 2d could be used in connection with a set of network handover rules 225 without departing from the scope of the present invention.

One benefit of implementing network handover rules in accordance with the presently disclosed methods and systems is that efficient handover procedures can be rapidly and dynamically selected, depending on the NAT or firewall environment, by MD 101, a software program 204, a communications service, or other combinations of software and hardware. In addition, the network handover rules 225 may be also be valuable for handover during a multi-party call, such as if MD 101 communicates concurrently with more than one corresponding node 108 during a conference call. Each corresponding node 108 could connect to the Internet via a different type of NAT or firewall, and in order to rapidly and efficiently handover the multiple media sessions, MD 101 can select a handover procedure according to a set of network handover rules 225 for each corresponding node 108.

FIG. 2e

FIG. 2e is a simplified tabular summary of a local area network (LAN) profile, in accordance with exemplary embodiments. In order to facilitate handover procedures upon detecting the presence of alternate network 117, MD 101—or a communications service managing a media session on MD 101—may rapidly (i) evaluate the NAT-router or firewall type associated with AN 117 and (ii) select an efficient handover procedure based upon the NAT-router or firewall type for AN NAT 119 and/or CN NAT 130. For example, an optimal or efficient handover procedure may depend upon the presence and type of NATs or firewall, as illustrated in FIG. 2d. However, evaluating the presence and type of NATs or firewalls requires valuable time that may slow down the handover process, which could cause undesirable gaps in the audio of the media session to occur, for instance.

One example is the significant time required (relative to the handover speed desired) to determine if a NAT is a full cone or partial cone. As illustrated in FIG. 2c, if Node 223 receives both RESP A 219 and RESP B 221, that can indicate that the NAT router behind which Node 223 is situated is a full cone. If the NAT in FIG. 2c is a partial cone, a timeout (such as 150-400 ms) may expire before MD 101 can determine that RESP B 221 was dropped by the NAT, as opposed to simply being (i) delayed on the public Internet 106, (ii) delayed in processing on server STUN B 220, or (iii) otherwise lost or delayed at an unknown router or hop on the public Internet 106. In addition, completing the full set of steps outlined according to the STUN IETF RFC 3489 to fully evaluate the NAT-router or firewall type may require a few seconds, and the time requirements may be similar for other NAT-evaluation techniques besides STUN. Thus, instead of probing AN NAT 119 each time the network is visited and potentially delaying handover, MD 101 or the communications service may prefer to store—in a LAN profile 224—information regarding the NAT and/or firewall environments (e.g. NAT-router type) for an alternate network 117 that MD 101 had previously accessed and evaluated, in order to improve the efficiency of the handover process.

An example LAN profile 224 is illustrated in FIG. 2e, and the LAN profile may specify the NAT-router type as full cone, partial cone, port restricted cone, symmetric, or null (which may mean publicly routable and without NAT). Other types of a NAT or firewalls than those illustrated in FIG. 2e may be included in a LAN profile 224 as well, such as a UPnP NAT router, or other types of NAT routers yet to be developed and/or yet to be commonly deployed. Further, some combinations of the types of NAT routers illustrated in FIG. 2e may be combined, such that full cone, partial cone, and port-restricted cone types could be combined into a type identified as "non-symmetric" NATs. The various types of NATs shown in FIG. 2e and throughout the present application may also translate port numbers, which is also known in the art as "NATP", but may frequently be referred to simply as "NAT".

A LAN profile 224 can provide significant advantages in speeding a handover process. First, a user may frequently move between MN 102 and the same locations such as a home residence or his or her office, potentially several times a day and commonly several times a week or month. If these example locations of a home and office provide IP connectivity to which a media session could preferably be handed over, the underlying NAT or firewall behavior or NAT-router type will unlikely change on a frequent basis. For example, an ISP providing Internet connectivity to AN 117 may install a DSL modem integrated with the WiFi access point 118, which may also include an integrated AN NAT router 119. In this case, if the AN NAT 119 is initially evaluated to behave as a full cone NAT router within the user's home, for example, MD 101 can reasonably assume during subsequent movement into AN 117 within the user's home that AN NAT 119 continues to behave as a full cone NAT router.

MD 101 can determine the presence and type of NAT or firewall by obtaining an identifier or identity token for an alternate network, and then looking up the NAT-router or firewall type in a table such as a LAN profile 224 illustrated in FIG. 2e. The process of looking up a NAT or firewall type in a table can be performed in a few milliseconds or less, whereas conducting the full set of steps outlined in the STUN standards or similar NAT-evaluation techniques may take several seconds or longer. Once a NAT or firewall type is determined or evaluated, either via techniques such as STUN or from a LAN profile 224, a preferred handover procedure can be identified using a set of network handover rules such as network handover rules 225. Note that use of network handover rules such as network handover rules 225 are not required in order to achieve the benefits of using a LAN profile such as LAN profile 224, nor is use of a LAN profile required in order to achieve the benefits of using network handover rules. Significant benefits may be achieved, however, from use of both in combination.

A LAN profile 224 can contain parameters to (i) identify the alternate network and (ii) provide information useful for handover. The "Identity token" illustrated in FIG. 2e could represent the service set identifier (SSID) for a WiFi access point, a MAC address for a wired or wireless Ethernet connection such as on a switch, a network or cell-site name broadcast by a base transceiver station in a WiMax, LTE, or CDMA network, geographical coordinates if MD 101 supports Global Positioning System (GPS) or similar functionality, or similar tokens to identify a network or location.

Such tokens could be useful for evaluating the presence and type of NAT or firewall even before an IP address is assigned to MD 101, since LAN profile 224 can also contain the NAT type or firewall type shown in the "Type" column. For example, if a user approaches the location "Office Wifi" illustrated in LAN profile 224, and MD 101 can observe the SSID "Go2Call_21" before connection methods such as DHCP are complete, MD 101 can identify that the network will provide IP connectivity via a symmetric NAT router, even before (i) an IP address is assigned, (ii) IP packets can be transmitted via the alternate network, and/or (iii) NAT-probing techniques could be conducted by MD 101 (e.g. by a software program operating on MD 101).

A LAN profile 224 could also provide other information useful for handover, such as the media transport method supported by the NAT or firewall, illustrated by the "media" column in FIG. 2e. Generally, UDP transport is preferred, but some NAT routers may be integrated into firewalls that block UDP traffic, and consequently media may need to be transmitted using TCP, as illustrated in the "Media" column for the network associated with the "Office Wifi" location. In addition, elements such as AN NAT 119 which may be included in a LAN profile 224 may not be present or may not perform network address translation functions, but instead firewall functionality of such elements may block UDP packets, for example. Determining that UDP packets are blocked after MD 101 has initiated a handover could significantly interfere and delay handover or attempts to establish new media streams at an alternate network 117. The LAN profile 224 may also include additional parameters, such as the Internet Protocol version implemented at the alternate network, UDP port timeout parameters, and other parameters useful for either handover or simply for establishing a media session may be included as well.

A UDP port timeout parameter within a LAN profile 224 can be useful for MD 101 to estimate the frequency at which UDP packets must be transmitted in order to keep NAT or firewall ports open and bound. For example, if media control channel messages are sent less frequently than the time required to keep the UDP ports on the AN NAT open and bound, the inbound media control ports could be inadvertently closed by the AN NAT, and inbound media control packets subsequently inadvertently dropped. This could happen if MD 101 transmits media control channel packets at an interval of 60 seconds, but the UDP Timeout for an AN NAT 119 is 45 seconds. Consequently, MD 101 could adjust the frequency of call control or media control channel packets to ensure the UDP ports remain open and bound, depending on a timeout parameter in a LAN profile 224. Timeout values for TCP ports could also be observed and recorded to manage the timing of transmission of TCP packets.

Further, a LAN profile 224 could contain information regarding UDP or TCP ports that are either opened or blocked, also illustrated in FIG. 2e in the "UDP Ports Open" and "TCP Ports Blocked" columns. Either TCP or UDP ports that are observed to be either open or blocked may also be recorded in a database, as opposed to stored in the illustrated tabular summary of FIG. 2e. By recording information regarding specific ports, MD 101 may (i) avoid attempting to transmit packets on ports that were previously observed to be blocked and/or (ii) select ports that are expected to be open. Recording information about open and/or blocked ports in a LAN profile 224 could further speed and increase the efficiency of a handover procedure. For example, if only certain ports are allowed, MD 101 would not have to repeat a port-scanning procedure or send multiple probing packets in order to guess or find open ports each time MD 101 accesses the Internet via AN 117.

A LAN profile 224 can be updated as MD 101 moves to new locations where IP connectivity is provided and MD 101 can evaluate the network parameters, such as NAT and/or firewall type, UDP or TCP ports open, port timeout values, etc. The LAN profile may be stored within MD 101, or periodically transmitted between MD 101 and a central server within MN 102 or other server locations on the Public Internet 106. Likewise, MD 101 could (i) periodically download a LAN profile 224 or (ii) query a remote database that contains information gathered about a particular alternate network from another mobile device, among other options. For example, if another mobile device participating in a communications service has (i) visited a particular alternate network and (ii) recorded information regarding the network environment, such as NAT type, ports open, a network identity token, etc., then MD 101 could access (i) a LAN profile 224, (ii) an entry or a series of entries in a LAN profile 224 representing an alternate network, or (iii) related information recorded by another mobile device, even if MD 101 had not previously connected to the alternate network. Further, a LAN profile 224 may contain a single entry for one alternate network 117, as opposed to a plurality of entries. And other possibilities exist as well, without departing from the invention.

FIG. 2f

FIG. 2f is a graphical illustration of an exemplary system, where a mobile device accesses an alternate network with an IPv6 address, and a NAT router converts the addresses to IPv4 addresses for communication with other IPv4 servers, hosts, or NAT routers, in accordance with exemplary embodiments. The Public Internet 106 could support both IPv4 and IPv6 addresses. Since the migration from IPv4 to IPv6 has been progressing relatively slowly since the introduction of IPv6 more than 8 years ago, the two packet-switched network-addressing schemes are expected to co-exist on the Public Internet 106 for the foreseeable future.

FIG. 2f illustrates that the various NAT functions described in the present invention may apply when a router, firewall, or border element such as NAT 229 converts packets between an IPv6 network and an IPv4 network. NAT 229 can convert the packet headers between the two different addressing schemes. Although NAT 229 is illustrated with IPv6 on the internal interface and IPv4 on the external interface, NAT 229 could also support IPv4 on the internal interface and IPv6 on the external interface. NAT functionality may be used in order to translate the addresses, and port numbers may be translated as well. The various NATs illustrated throughout the present invention, such as MN NAT 105, AN NAT 119, CN NAT 130, etc. may function as NAT 229 does to convert IP addresses between two different schemes. However, conversion between IPv4 and IPv6 is not required in order to implement network address translation on the various NATs such as MN NAT 105, AN NAT 119, or CN NAT 130, and similar NAT routers.

NAT 229 can have an external IPv4 address illustrated as address 227 in FIG. 2f and an internal IPv6 address such as address 226. In addition, NAT 229 may simply function as a firewall or router, such that all packets from an Internal Network 230 to the Public Internet 106 route through NAT 229, and NAT 229 subsequently filters or translates packets transparently for a node such as MD 101 within the Internal Network 230. NAT 229 could filter packets for firewall purposes, such as preventing unauthorized hosts on the Public Internet 106 from accessing internal addresses or nodes, such as MD 101. Although illustrated as routing a first media stream 109 and a second media stream 110, NAT 229 may be located at within the mobile network 102, the alternate network 117, or other locations accessible via the public Internet 106, among other possibilities.

NAT 229 may also function as an application layer gateway, to translate ports and IP addresses within the body of packets, such as within SDP messages, in order to properly handle address and port conversion for the proper routing of call control and/or media. For example, NAT 229 may function as a SIP application layer gateway, in addition to optionally translating IP addresses. MD 101 may have an IPv6 IP address 225 within Internal Network 230, and may transmit packets to hosts with IPv4 addresses such as IP address 131 on a CN NAT 130, for example. MD 101 could implement IPv6 addresses and ports such as IP:port 228. NAT 229 may also function as an outbound proxy with an IP address 226, such that MD 101 routes call-control messages such as a SIP INVITE to NAT 229. NAT 229 can also route call-control messages in protocols such as SIP from proxy servers or corresponding nodes on the public Internet 106 back to MD 101. Other VoIP protocols may be used as well.

FIG. 2g

FIG. 2g is a simplified tabular summary of exemplary network handover rules for a mobile device, based upon the type of NAT router at either an alternate network or a corresponding node, in accordance with exemplary embodiments. FIG. 2g illustrates various forms that network handover rules may take. Although network handover rules are illustrated in FIG. 2d according to a preferred embodiment, other mappings of NAT-router types to handover procedures may be implemented by MD 101, a software program operating on a mobile device, or a communications service, as examples, in order to obtain the benefits of network handover rules. In addition, network handover rules may specify different handover procedures depending on different firewall types that may be present, even if network address translation is not implemented.

For example, network handover rules 226 of FIG. 2g could specify handover procedures that are independent of the NAT-router type of AN NAT 119, and depend instead on the NAT-router type of CN NAT 130. Although network handover rules 226 illustrates handover procedures that are independent of the NAT-router type of AN NAT 119, network handover rules 226 could alternatively be independent of the NAT-router type of CN NAT 130 and instead dependent on the NAT-router type of AN NAT 119.

In addition, other methods for handover besides those previously identified as "A", "B", "C", or "Relay" in FIG. 2d could be implemented. For example, as Internet protocols and standards continue to evolve, and also as additional capabilities can be realized for mobile devices or corresponding nodes, additional or alternate handover procedures could be derived other than the procedures described herein. These alternate handover procedures could be applied to various combinations of NAT-router types in order to achieve an efficient handover between heterogeneous IP networks, and are illustrated in network handover rules 226 as procedures "X", "Y", "Relay A", and "Relay B".

Note that these (i.e. X, Y, Relay A, Relay B) are arbitrarily chosen identifiers for unspecified handover procedures, and that, in general, the concepts described herein contemplate selecting efficient handover procedures based (i) at least in part on the type of NAT residing between a network to which a device is handing over (i.e. a target network) and the Internet and/or (ii) at least in part on the type of NAT residing between a corresponding node and the Internet, whatever those handover procedures might involve. As but one example, if Streaming Control Transmission Protocol (SCTP) becomes widely deployed and also supported by commercial NAT routers and mobile devices, an example handover procedure "X" could implement and leverage the capabilities of SCTP.

Network handover rules 227 illustrate that handover procedures may also be specified according to NAT types other than the common NAT types illustrated in FIG. 2d and identified in IETF RFC 3489. Some NAT types for the alternate network and/or the corresponding node could be combined, while other NAT types could be entirely omitted by an exemplary set of network handover rules. Furthermore, future types of commonly deployed NATs may emerge, such as NATs that allow queries directly to the NAT router to determine the NAT type or possibly allowing hosts within an internal network to specify NAT parameters or routing functionality. Network handover rules could address these additional future types of NAT routers and could specify new handover procedures according to the future NAT types.

A mobile device could access network handover rules in order to determine a new, efficient handover procedure that may contemplate the functionality of future NATs, which may be different from the current, common NAT types of full cones, partial cones, port-restricted cones, symmetric, and null. Network handover rules could address (i) types of NAT routers not described in IETF RFC 3489, such as future NAT routers with different capabilities, and/or (ii) handover procedures that leverage either new Internet standards or the increased adoption of existing standards that are currently not widely deployed, such as support for SCTP through most consumer NAT routers. In addition, network handover rules could also specify handover procedures that depend on firewall functions only and not on network address translation. Alternatively, network handover rules could specify handover procedures that depend on combinations of firewall functionality/type and network address translation.

FIG. 3

FIG. 3 is a graphical illustration of an exemplary system, where a mobile device acquires a second IP address associated with a NAT router, determines a public IP address and port number on the NAT router, and begins transmitting media from the second IP address during handover, in accordance with exemplary embodiments. Since MD 101 can be a mobile device operated by a user or subscriber that changes location, the subscriber may move within range of alternate network 117 that also provides Internet access (in addition to MN 102 providing Internet access), as illustrated by system 300 in FIG. 3.

In order to obtain connectivity to the Internet through the alternate network 117, the mobile device 101 can acquire an IP address 301 that is provided by a local area network within alternate network 117. Although IPv4 addresses are shown within AN 117, IPv6 or similar packet-switching addressing schemes could be implemented. IP address 301 may be acquired by various methods such as DHCP, and MD 101 has sufficient computing power to associate with multiple IP addresses simultaneously. A software program 204 operating on MD 101 can observe that IP address 301 becomes available via periodic queries to an operating system 203 or a device driver 202.

IP address 301 can be considered assigned to MD 101 when a software program 204, operating system 203, or device driver 201 can transmit or receive packets using IP address 301. Under many scenarios, IP 103 and IP 301 can be available simultaneously to a software program 204 operating on MD 101, such as when MD 101 is within range of more than one network. The software program 204 may be a component of a communications service, such as a program downloaded and installed on MD 101. MD 101 may measure the quality of the two network connections, which can include measurements at the physical, data-link, and network levels. Quality can be measured according to several parameters, including power levels, signal-to-noise ratios, bit errors, packet loss, delay, and jitter. Quality may also be measured on both the uplink and downlink, for transmitting and receiving data.

MD 101 can include a software routine to determine that handover of the media session from IP 103 to IP 301 is preferred. A software routine operating within MD 101 may determine that IP 301 is preferred for communication due to a combination of increased signal-to-noise ratios, reduced packet loss, reduced bit errors, reduced power consumption, reduced delay, reduced jitter, reduced costs for bandwidth, increased stability of network quality, increased bandwidth available for communication, and/or one or more other network characteristics according to which AN 117 would provide a superior connection to that provided by MN 102. The software routine to determine handover may be operating in conjunction with software program 204, operating system 203, or device driver 202, among other possibilities, and may also function as a subroutine within a larger software program. The software routine may also include logic or functions performed externally to MD 101, such as monitoring the quality of the network connection from a server or base station 104 within MN 102 or a server accessible through the public Internet 106.

MD 101 (e.g. using a software routine that determines when handover is preferred) may also predict that IP 301 may become preferred for communication, based on monitoring and comparing the relative quality of communication through AN 117 and MN 102. For example, even though the network connection providing IP 301 may initially have a relatively weak signal compared to the network connection providing IP 103, with corresponding higher bit errors, higher packet loss, and/or greater delay on the network providing IP 301, MD 101 can monitor the network providing IP 301 as MD 101 approaches the example AN 117 illustrated as including a WiFi access point 118 in system 300.

If the network connection or IP connectivity between MD 101 and WiFi access point 118 improves at a sufficient rate, MD 101 may predict that IP 301 will become preferred over IP 103 and, consequently, MD 101 may initiate handover before communication via IP 301 is superior to IP 103. Conversely, MD 101 may observe that communication through IP 103 is degrading at a sufficient rate that communication through IP 301 will likely become preferred, even though the quality of communication via IP 301 is relatively static or improving only slowly. Again, in this instance of degrading quality for communication via IP 103, MD 101 may determine that IP 301 will become preferred and MD 101 may also initiate handover even though IP 103 is superior to IP 301 when MD 101 starts handover procedures. And other possibilities exist as well.

Further, a software program or a communications service operating on MD 101 could simply determine that establishing a duplicate media path via IP 301 may be desirable regardless of the trends in quality, due to the benefits of transmitting media through two independent communications channels, which can increase the quality received at the corresponding node. Once MD 101 may determine (i) that IP 301 is preferred for communication or (ii) that IP 301 may become preferred for communication, or (iii) that establishing a second media channel at IP 301 is preferred, MD 101 could initiate handover procedures that will be both rapid and also reduce the probability that a user will notice gaps, delays, or distortion in the media during the handover process. Likewise, efficient handover procedures can reduce the impact on media received at CN 108. Further, MD 101 may also automatically establish a duplicate media path when the quality of the network through IP 301 has increased to reach minimum thresholds, or the performance of either MN 102 or AN 117 is greater or less than specified parameters. And many other handover triggers could be used instead or in addition, as some are included herein for illustration and not for limitation.

As stated, a duplicate media path can provide superior quality, and trends in quality may not be predictable. Thus, the techniques described in the present invention could be implemented for the purposes of rapidly establishing a duplicate media channel, with or without the intent of terminating the first media session, which includes MS 1 and MS 2. In addition, a handover could be preferred in order to obtain increased quality, reduced power, reduced interference, or other benefits from simply establishing a duplicate media channel through a IP network other than MN 102.

After acquiring IP 301, MD 101 may determine that a handover is preferred due to the benefits of using AN 117. Perhaps prior to initiating handover, or perhaps during the establishment of the first media session that includes MS 1 109 and MS 2 110, MD 101 in system 300 may evaluate whether (i) CN 108 has an address that is fully routable on the public Internet (i.e. does not belong to the set of private addresses in IETF RFC 1918) or (ii) CN 108 connects to the Internet via a NAT router.

MD 101 can use multiple methods in this evaluation, such as observing if the IP addresses and ports within fields of received SIP and/or SDP messages match the actual ports used for media transmission in MS 2 110, or determining if the CN 108 user agent belongs to (a) a class of gateways to the PSTN (which the MD could therefore reasonably expect to have public IP addresses), or (b) a class of session border controllers (which would also likely have public IP addresses). A software program operating on MD 101, as opposed to the physical hardware, may evaluate if CN 108 has a publicly-routable IP address or rather connects to the public Internet via a NAT router. In addition, MD 101 will likely have a call-control channel—such as that illustrated in FIG. 2*b*—implemented in order to set up MS 1 109 and MS 2 110, and MD 101 could query CN 108 through the call-control channel, requesting that CN 108 provide an assessment of its NAT environment.

Further, MD 101 could have gained knowledge of any NAT routers in front of CN 108 during the setup of MS 1 109 and MS 2 110. Alternatively, CN 108 may report a category or type that CN NAT 130 represents, such as full cone or partial cone to a centralized server such as a registrar or proxy server 214, and MD 101 could submit a query to the central server(s). CN 108 can evaluate the presence of any NAT routers or firewalls between CN 108 and the Public Internet 106 via the techniques illustrated in system 200, or using some other technique(s). In addition, CN 108 may record information pertaining to its NAT/firewall environment as an entry in a LAN profile, and the entry could be stored either locally or on a remote server, and MD 101 could query the server. MD 101 could also query CN 108 directly by inserting a non-media "NAT query" packet within MS 1 and monitor for a response in a non-media "NAT response" packet in MS 2, or send similar messages through a media control channel such as RTCP Stream 1. In summary, there are many methods available for MD 101 to determine if CN 108 has a public IP address, or rather is connected to the Internet via a NAT router (such as a NAT router that is not symmetric), or a firewall that is not a symmetric firewall such as a reflective firewall equivalent to partial cone packet filtering rules.

Likewise, MD 101 can determine whether AN NAT 119 is symmetric. According to an exemplary preferred embodiment, MD 101 can evaluate before acquiring IP 301 whether CN 108 connects to the Public Internet 106 via a non-symmetric NAT router or a non-symmetric firewall. Evaluating CN 108's NAT-router type (i.e. the NAT-router type of CN NAT 130) before acquiring new IP addresses such as IP 301 can reduce the time required for MD 101 to complete handover. However, MD 101 can bypass an evaluation of the NAT-router type of CN NAT 130 and follow the other steps described in the present invention, although bypassing an evaluation the NAT-router type of CN NAT 130 may not be preferred if CN 108 connects to the Internet via a symmetric NAT or a symmetric firewall, for example. In addition, if the evaluation of the NAT type of AN NAT 119 or CN NAT 130 is bypassed, then a less-efficient method of handover may be implemented, which could increase the probability of delays, distortions, or gaps in the audio for a user at either the mobile device or the corresponding node, or both.

According to system 300, if (i) CN NAT 130 is not symmetric and AN NAT 119 is not symmetric or (ii) CN NAT 130 is not a port-restricted cone and AN NAT 119 is not symmetric, MD 101 may preferably begin transmitting a third media stream (MS 3) 302 from IP 301 to CN 108 with a destination IP:port for the transmitted media packets of IP:port 125, once MD 101 can determine that (i) handover is preferred or (ii) communicating with CN 108 via AN 117 is desirable. MD 101 can—and preferably does—begin transmitting the third media stream 302 before MD 101 stops transmitting the first media stream 109.

Transmitting MS 3 302 from IP 301 to IP:port 125 can provide multiple benefits. First, IP:port 125 has already been opened on CN NAT 130 and bound to IP:port 122 on CN 108 as a port for the receipt of media packets, so additional ports on CN NAT 130 or CN 108 do not need to be opened and communicated with MD 101 via one or more call-control messages or similar signaling techniques. Determining port mappings on CN NAT 130 or transmitting call-control messages to communicate the port mappings on CN NAT 130 may take additional time to both process on the nodes as well as traverse the public Internet, thereby speeding the handover process by using IP:port 125 as the destination port for media in MS 3 302.

As stated, MD 101 preferably performs a "make before break" handover, such that MS 1 109 and MS 3 302 are transmitted concurrently and include substantially the same media, although a "make before break" handover is not required. A node such as MD 101 or CN 108 may transmit two packets for each codec frame (i) from a different source IP:port or (ii) to a different destination IP:port, and each packet can be considered to belong to a separate media stream. MD 101 may transmit packets for MS 3 302 from IP 301 via IP:port 303. The AN NAT 119 may convert the source IP:port in the packets transmitted by MD 101 in MS 3 302 from IP:port 303 (i.e. 192.168.0.2:11122) on its internal interface to IP:port 304 (i.e. 24.35.111.15:16600) on its external interface. Consequently, CN 108 can observe the source IP:port of (i.e. for packets received in connection with) MS 3 302 as received at CN 108 as IP:port 304, due to the fact that IP:port 125 on CN NAT 130 had already become open and bound to IP:port 122 on CN 108.

"Transmitting concurrently" may refer to operating a software routine within MD 101 with sufficient speed such that both IP:port 113 and IP:port 303 each transmit a media packet on a sufficiently short time scale, such as with less than 200 milliseconds between the time when IP:port 113 transmits a media packet and IP:port 303 transmits a media packet comprising substantially the same media. Thus, although IP:port 113 and IP:port 303 may transmit at separate points in time on the timescale of a computing device's operating system, which may be on the order of microseconds for example, CN 108 could observe that MS 3 302 and MS 1 109 are effectively duplicate media streams. For example, if 5 packets in a row are dropped on MS 1 109 but not MS 3 302, a process operating on CN 108 could receive copies of the dropped packets in MS 3 302 in order to output media to a user associated with CN 108 without noticeable gaps or delay. Note that the copies of media in MS 1 and MS 3 could be—but do not have to be—identical.

If CN NAT 130 is a port-restricted cone or partial cone NAT router, MS 3 302 may not initially be received by CN 108 until CN 108 performs additional actions to properly open and bind ports on CN NAT 130. For example, if CN NAT 130 behaves as a standard port-restricted cone NAT router, CN NAT 130 may drop inbound packets on IP:port 125 in MS 3 302 if CN 108 had not previously transmitted an outbound packet from IP:port 122 to IP:port 304. Alternatively, if CN NAT 130 behaves as a standard partial cone NAT router, CN NAT 130 may drop inbound packets on IP:port 125 in MS 302 if CN 108 had not previously send a packet from IP:port 122 to the external IP address on AN NAT 119, which is the IP address 24.35.111.15 illustrated in system 300.

CN NAT 130 may also function as a firewall and not translate addresses, but implement packet-routing rules that are analogous to a port-restricted cone or partial cone NAT router. For example, even if CN NAT 130 does not translate addresses or ports, an inbound packet from AN NAT 119 may not be allowed to pass through CN NAT 130 until a packet from CN 108 has been transmitted first to AN NAT 119, which would be similar to the filtering rules on a partial cone NAT, for example. Thus, although CN NAT 130 is illustrated as a NAT router in system 300, the CN NAT 130 may act as a firewall with packet-filtering rules equivalent to a NAT router, without actually translating the IP addresses or ports.

When MD 101 (e.g. a software program operating on MD 101) can determine that (i) handover is preferred or (ii) establishing a second channel via AN 117 for the existing media session illustrated in FIG. 1 is preferred, MD 101 may send a probing request 305 to STUN server 306 from IP 301. The probing request 305 can preferably use as its source IP:port the same IP:port 303 utilized as the source IP:port in media packets transmitted in MS 3 302. STUN server 306 can respond to MD 101 with the IP:port 304 observed as the source IP:port in the probing request 305. If AN NAT 119 is not symmetric, then the observed source IP:port observed by STUN server 306 should match the IP:port in the source IP:port field for media packets in MS 3 302. Although STUN server 306 is identified in system 300 as utilizing the STUN protocol, other similar techniques to determine external port bindings on a NAT router could be implemented as well. The STUN functionality and server could also be combined with the proxy server 213 illustrated in FIG. 2b or with other servers on the Internet.

MD 101 may also alter the sequence of steps of (i) starting to transmit MS 3 302 and (ii) sending a probing request 305, such that the probing request 305 is transmitted before transmission of MS 3 302 is initiated. For example, MD 101 may observe that the alternate network 117 is available and that IP 301 is active, but may not have determined (i) that handover is preferred or (ii) that establishing a duplicate media session through IP 301 is desirable. However, MD 101 can still send the probing request 305 in order to obtain port binding on AN NAT 119 before determining that handover is preferred, in order to reduce time required once handover is determined to be preferred. If a probing request 305 is transmitted a significantly long duration, such as greater than 30 seconds, before transmission of MS 3 302 is initiated then the probing request 305 may likely need to be repeated by MD 101, since the port binding on AN NAT 119 may no longer be valid, such as if the NAT times out or expires the port bindings for IP:port 304.

Upon receipt of the response from STUN server 306, MD 101 may then communicate IP:port 304 to CN 108 via a call-control signal 307. Call-control signal 307 could traverse the call-control channel used to initially establish MS 1 and MS 2, which may be similar to the system illustrated in FIG. 2b. The call-control signal could be a SIP Re-INVITE or SIP UPDATE if the SIP protocol is used, and similar call-control messages in other protocols could be implemented as well. Alternatively, the call-control signal 307 could be a specially formatted packet inserted within either MS 1 109 or RTCP Stream 2 112, illustrated as call-control signal 307a. If the call-control signal is transmitted as call-control signal 307a, MD 101 can insert the call-control signal or packet 307a within the UDP packet stream of MS 1 109. If the call-control signal 307a is (i) inserted within MS 1 109 or RTCP Stream 2 112 and (ii) can be properly processed by CN 108, receiving call-control signal 307a may require CN 108 to monitor IP:port 122 or IP:port 134 for call control, in addition to media or media control, respectively.

The mixing of (i) media or a media control channel and (ii) call control on the same port may not be readily implemented with present, unmodified versions of standard protocols such as such as SIP, XMPP, MGCP, or H.323. However, the standards could be modified to allow the transmission of a call-control message within media streams or media control channels, thus speeding and simplifying a handover process. The mixing of media and a handover call-control signal 307a within the same pair of UDP ports may be more readily implemented with (i) a proprietary protocol such as Skype® or (ii) IAX2-capable clients and hosts, or (iii) similar protocols which providing mixing of call-control messages and media within the same stream of UDP or TCP packets.

The call-control signal 307 or 307a may preferably contain IP:port 304 observed as reported by STUN server 306 and received by MD 101 in Response A 219, for example. This call-control signal could be sent by MD 101 through IP 103 or IP 301, although IP 103 is likely preferred since a call-control channel with CN 108 was previously set up through IP 103 in order to establish the media session illustrated in system 100. Alternatively, the call-control signal 307 could be transmitted to the mobile device proxy 213 using the IP:port 303 as the source port of the call-control signal 307. A hash function of a password or identity token or similar security mechanism would likely be required to authenticate the call-control signal 307 if it is transmitted from IP:port 303, to reduce the time-consuming process (relative to handover) of establishing registration from a new IP address for MD 101. One benefit would be that the observation of the external IP:port 304 by proxy 213 or a similar server could be combined with receipt of the call-control signal, such that proxy 213 receives the call-control signal indicating handover and inserts IP:port 304 in the call-control signal that is forwarded to CN 108. In this case, the probing request 305 and the call control signal 307 can be combined and transmitted from IP 301.

Assuming IP 103 retains a sufficient quality network connection, sending call control through IP 103 may be faster than attempting to set up a new call-control channel via IP 301, and then processing the call-control signal 307 via IP 301. If CN NAT 130 is a full cone NAT, CN 108 may preferably (i) begin receiving MS 3 302 at IP:port 122 without requiring any call-control signal or message and (ii) begin processing both MS 1 109 and MS 3 302 which could represent essentially duplicate media streams. If CN NAT 130 is a full cone NAT, CN 108 can observe the source IP:port for packets received in MS 3 302 as IP:port 304, without requiring additional ports or port bindings to be opened on CN NAT 130. Further, although MD 101 is illustrated as communicating with a single corresponding node 108 in system 300, MD 101 may communicate with multiple corresponding nodes 108 simultaneously such as with a three-way call or a conference call, and the handover procedure illustrated in system 300 may be applied with multiple corresponding nodes concurrently. The handover procedure illustrated in system 300 is denoted method "B" in the network handover rules 225 illustrated in FIG. 2d.

FIG. 4

Figure 4:
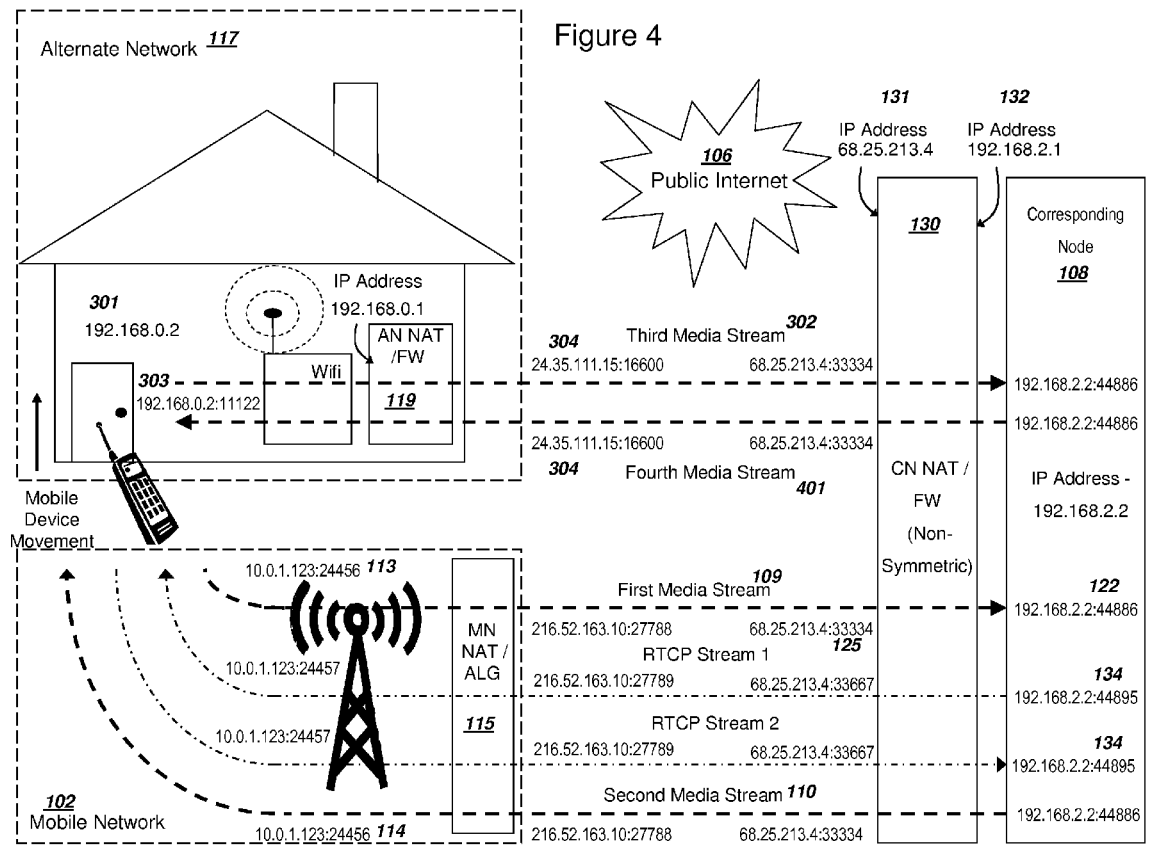
FIG. 4 is a graphical illustration of an exemplary system, where a mobile device and a corresponding node transmit and receive media during handover, in accordance with exemplary embodiments.

FIG. 4 is a graphical illustration of an exemplary system, where a mobile device and a corresponding node transmit and receive media during handover, in accordance with exemplary embodiments. According to a preferred exemplary embodiment, if CN NAT 130 is (i) a partial cone or port-restricted cone NAT router or (ii) a firewall with equivalent packet-filtering rules but without NAT functionality, once CN 108 receives IP:port 304 via call-control signal 307, CN 108 preferably begins transmitting a fourth media stream (MS 4) 401 to IP:port 304, representing essentially a duplicate copy of MS 2 110. As noted in connection with FIG. 3, IP:port 304 could represent the external port on AN NAT 119 that binds to MD 101 on IP:port 303, where a software program or other application running on MD 101 can monitor IP:port 303 for the receipt and further processing of media packets.

According to common implementations of partial cone or port-restricted cone NAT routers or firewalls without NAT functionality but with equivalent packet filtering rules such as partial cone or port-restricted cone packet filtering, as soon a CN 108 transmits a packet through CN NAT 130 from IP:port 122 to IP:port 304, IP:port 125 should open up for the proper receipt of media packets by CN 108 at IP:port 122. Note that IP:port 125 can be utilized as the destination IP:port in MS 3 301 as transmitted by MD 101 at IP 301, but incoming packets in MS 3 302 from AN NAT 119 illustrated in FIG. 3 may initially be dropped by CN NAT 130 until an outbound packet traverses CN NAT 130 with a destination IP address equal to an address of AN NAT 119 (perhaps a destination IP:port equal to IP:port 304 on AN NAT 119); this outbound packet may be the first media packet in MS 4 401. This behavior of CN NAT 130 dropping incoming packets in MS 3 302 until an outbound packet traverses CN NAT 130 can correspond to a partial cone or port-restricted cone NAT, or a firewall without NAT functionality but with partial cone or port-restricted cone packet filtering rules.

It is not required that MD 101 start transmitting MS 3 302 prior to transmitting call-control signal 307 or call-control signal 307a; that is, MD 101 could transmit call-control signal 307 or call-control signal 307a prior to starting to transmit MS 3 302. By MD 101 starting to transmit MS 3 302 before (i) receiving a response from STUN Server 306, or (ii) transmitting call-control signal 307 or call-control signal 307a, MS 3 302 packets can be more quickly received by CN 108. MS 3 302 media packets can be received by CN 108 within a few milliseconds from when the first media packet in MS 4 401 transmitted by CN 108 traverses CN NAT 130 destined for AN NAT 119, especially if CN 108 is co-located on a LAN with CN NAT 130.

One benefit of transmitting MS 4 401 packets from CN 108 with the source IP:port 122, which is also the destination port in MS 3 302 upon passing through CN NAT 130, is that media packets from CN 108 can more quickly be routed through AN NAT 119, that is if AN NAT 119 is not symmetric. Alternative ports on CN 108 besides IP:port 122 may be used as the source for MS 4 401, but that would likely require obtaining the proper port bindings between MD 101, AN NAT 119, and CN NAT 130 through techniques such as those illustrated in system 200, as well as communicating the ports between MD 101 and CN 108 via call-control messages or signals. Obtaining new port bindings and communicating the ports prior to starting the transmission of media may significantly slow the handover process, and may also result in dropped or delayed media packets.

CN 108 can accept and process the duplicate media streams MS 1 109 and MS 3 302; that is, the various software routines operating on CN 108 may efficiently process duplicate media streams. In addition, if the media is transmitted as RTP then the RTP software stack within CN 108 can also drop duplicate media packets received. Software programs that implement RTP according to the IETF RFC 3550 standard can ignore the source IP address of RTP packets, and can reject or accept media from the synchronization source identifier (SSRC) within a packet containing RTP data. Thus, using both IP 103 and IP 301, MD 101 can transmit separate copies of the underlying media via MS 1 109 and MS 3 302 to CN 108, and CN 108 can monitor IP:port 122 for both media streams. Transmitting MS 1 109 and MS 3 302 via RTP is not required, and other methods for media transmission and sequencing the media packets could be used, such as SRTP, IAX2, or the proprietary techniques implemented by Skype®. Other methods for handling duplicate media packets are available as well for those skilled in the art.

Preferably, the handover for media from CN 108 to MD 101 can be implemented via "make before break" methods, whereby MS 4 401 and MS 2 110 can be transmitted concurrently for a period of time until the handover is complete. Similarly, CN 108 could begin transmitting MS 4 401 before CN 108 stops transmitting MS 2 110. If CN 108 implements standards which (i) do not support "make before break" methods and (ii) only support the equivalent of call-transfer or media-redirect methods, then MS 4 401 can be set up effectively at the same time that MS 2 110 is torn down, representing a "break before make" handover for media from the CN 108 to MD 101. For example, if the SIP protocol is used on a legacy gateway to the PSTN at CN 108, the call-control signal 307 from MD 101 could be a SIP Re-Invite or SIP UPDATE message indicating a change in the destination IP:port for media transmitted from CN 108 in MS 4 401. Even if "break before make" methods are used for the setup of MS 4 401, media packets should not be dropped because MD 101 can, perhaps concurrently, monitor both IP:port 114 and IP:port 303 for the receipt of media (i.e. packets) transmitted by CN 108.

"Monitoring concurrently" may refer to (i) a software program 204 or a software routine within MD 101, (ii) the operating system 203, (iii) a device driver 202, and/or (iv) hardware within MD 101 operating with sufficient speed such that both IP:port 114 and IP:port 303 are each polled for receipt of a media packet on a sufficiently short time scale, such as less than every 200 ms. Thus, although IP:port 114 and IP:port 303 may be polled at separate points in time on the timescale of a computing device's operating system, such as an amount of time on the order of microseconds, the net effect of the rapid switching time is that the ports are monitored concurrently and packets are not dropped.

For example, if several packets in a row are dropped in MS 4 401 due to poor network conditions, but not dropped in MS 2 110, a process operating on MD 101 can switch between IP:port 114 and IP:port 303 with sufficient speed such that all packets are acquired and media is played out to a user without significant gaps or delay. One objective of monitoring, perhaps concurrently, both IP:port 114 and IP:port 303 could be to reduce possible distortions or gaps in audio or video observed by a user. Although a single corresponding node 108 is shown in system 400, the handover procedures illustrated can also be applied if MD 101 communicates with more than one CN 108, such as if MD 101 participates in a three-way call or a conference call. Different handover procedures may be implemented by MD 101 according to the type of NAT for each CN 108 in a three-way or conference call.

FIG. 5

Figure 5:
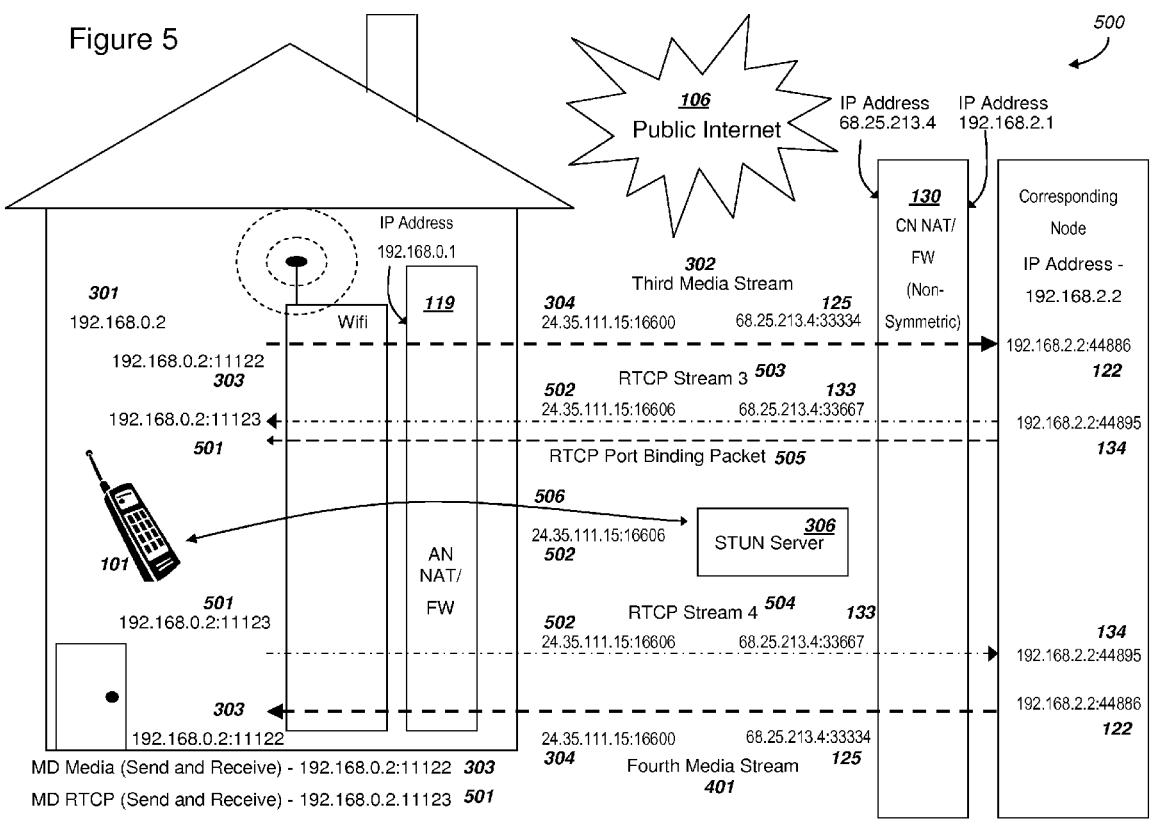
FIG. 5 is a graphical illustration of an exemplary system, where a mobile device and a corresponding node transmit and receive media and a media control channel upon completion of a handover, in accordance with exemplary embodiments.

FIG. 5 is a graphical illustration of an exemplary system, where a mobile device and a corresponding node transmit and receive media and a media control channel upon completion of a handover, in accordance with exemplary embodiments. In system 500 illustrated in FIG. 5, CN 108 transmits MS 4 401 to IP 301 using IP:port 304 as the destination port in the packets transmitted. This facilitates the media being properly forwarded to MD 101 listening on the IP:port 303, since the AN NAT 119 would generally otherwise drop packets on ports not previously opened by MD 101 and properly bound by AN NAT 119. Alternative techniques to establish a different IP:port on AN NAT 119 for CN 108 to transmit media to MD 101 at IP 301 may both take time and also may not be readily discernable in any case, such as if AN NAT 119 is a symmetric NAT and CN 108 is also behind a symmetric NAT. If the subscriber's premises at the alternate network 117 are a corporate office building or other LAN with higher security requirements than a consumer DSL environment, the AN NAT 119 could well be symmetric, though it could also be so in other contexts.

Voice activity detection (VAD) may preferably be disabled within MS 3 302 in order to keep IP:port 304 open and bound, and likewise VAD may be disabled within MS 4 401 in order to keep IP:port 125 open and bound. For example, if the G.729a codec is implemented by MD 101 and the user is silent for an extended period such as 120 seconds, AN NAT 119 may close IP:port 304 to inbound packets from the external interface since a timeout on the port bindings may expire. Consequently, MD 101 should periodically send packets from IP:port 303 in order to keep IP:port 304 open and bound, even if media is not present, such as by (i) sending a packet from IP:port 303 at an interval of every 30 seconds or (ii) sending media packets with silence descriptor frames or similar silence information, as examples. Packets may also need to be sent periodically from IP:port 122 in order to keep IP:port 125 open and bound even if, for example, a user at CN 108 is silent for an extended period such as a minute or longer during a voice call.

MD 101 may also wish to establish a new media control channel with a CN 108 either (i) after MS 3 and MS 4 are established or (ii) during the process of establishing MS 3 and MS 4. As discussed previously, a media control channel allows a transmitting endpoint to evaluate the quality of media received at the receiving endpoint and subsequently make adjustments for transmitted media in attempt to improve the quality received. A media control channel can be useful for both MD 101 and CN 108 to determine that the handover is complete and successful before terminating MS 1 or MS 2, respectively. For example, during a handover period where all four media streams are transmitted concurrently, both MD 101 and CN 108 may prefer to receive feedback from the receiving node that the new media streams MS 3 and MS 4 are properly being received with sufficient quality.

Without a media control channel, there may not be a feedback mechanism to message a transmitting node about the quality of media received. For example, MD 101 may have projected that IP 301 would be preferred for communication, but the underlying network performance could suddenly change, perhaps due to unexpected congestion on the internal LAN within alternate network 117, immediately after handover had been initiated.

In general, MD 101 and CN 108 could programmatically decide to terminate MS 1 and MS 2 and complete the handover based on feedback from a media control channel such as RTCP, SCTP, or proprietary methods, among other options. MS 1 109 and MS 2 110 may be terminated after quality data in a media control channel confirms that the quality of MS 3 302 and MS 4 401 meets acceptable thresholds. Further, decisions on terminating MS 1 109 and MS 2 110 could be made independently, such that either MS 1 109 or MS 2 110 can be terminated, while the other media stream may continue.

System 500 of FIG. 5 illustrates the transmission of the media control channel as RTCP, although other techniques such as SRTCP or proprietary protocols could be implemented. In addition, a media control channel could optionally be included as periodic messages transmitted within the media stream, which is implemented in the IAX2 protocol, for example. The benefit of mixing media and media control within the same UDP stream is that fewer NAT ports have to remain bound and open for communication. Further, the implementation of a media control channel could optionally be omitted.

If a media control channel is implemented on a separate port pair than media, according to IETF specification RFC 3550 or similar standards illustrated in System 500, the proper ports for communication through the NATs will need to be properly determined, bound, and communicated. A sequence of steps to properly open and negotiate the ports for a media control channel may be similar to the steps for opening and negotiating the ports for the media streams in the presence of NATs, or firewalls with packet filtering rules but not network address translation. According to a preferred exemplary embodiment, if (i) CN NAT 130 is not symmetric and AN NAT 119 is not symmetric or (ii) CN NAT 130 is not a port-restricted cone and AN NAT 119 is not symmetric, MD 101 may send a probing request 506 to a STUN server such as STUN server 306. The probing request 506 can preferably use the same IP:port 501 utilized as the source IP:port in media control channel packets transmitted by MD 101 at IP 301, and MD 101 may use the next highest UDP port from IP:port 303 to transmit and receive RTCP reports or other media control channel messages. Other port numbers at IP 301 could be used as well, in addition to the fact that other protocols such as TCP may be used for the transmission of media control channel packets.

STUN server 306 can respond to MD 101 with the IP:port 502 observed as the source IP:port in the probing request 506. Although STUN server 306 is described as utilizing the STUN protocol, other similar techniques could be implemented to determine an IP:port 502 on the external interface of AN NAT 119. The STUN functionality and server could also be combined with the proxy server 213 illustrated in FIG. 2b or with other servers on the Internet. Probing request 506 can be transmitted concurrently with probing request 305, and the response containing the external ports on AN NAT 119 from STUN server 306 could be transmitted together in call-control signal 307 illustrated in FIG. 3. Alternatively, the two ports on AN NAT 119, i.e. IP:port 304 for the receipt of MS 4 and IP:port 502 for the receipt of RTCP Stream 4 504, could be communicated from MD 101 to CN 108 in two separate call-control signals 307 or 307a.

Upon receipt of MS 4 401, MD 101 may begin evaluating the quality of the media and prepare an RTCP receiver report or similar quality feedback message for transmission to CN 108. MD 101 should be able to transmit RTCP message to CN 108 at IP:port 134 via the IP:port 133 (on the external interface of CN NAT 130), which may be bound to IP:port 134, since that IP:port was implemented by CN 108 to receive RTCP reports for media stream 2 110 as illustrated in system 100. The series of media control channel messages or packets for MS 4 401 is illustrated in FIG. 5 as RTCP Stream 4 504. If CN NAT 130 is a standard partial cone NAT, or a firewall with partial cone packet filtering rules but without network address translation functionality, then inbound media control channel packets destined to IP:port 134 should automatically be passed by CN NAT 130, since packets in MS 4 may have already traversed the NAT or firewall and opened up CN NAT 130 for the receipt of packets from the external public IP address of the AN NAT 119.

If CN NAT 130 is a standard port-restricted cone NAT router or port-restricted firewall, then CN 108 may need to first transmit a packet from IP:port 134 to IP:port 502 in order for inbound packets in RTCP Stream 4 504 to be properly received by CN 108, which may require first the transmission of a packet from IP:port 134 on CN 108 to IP:port 502 on AN NAT 119, which could be the first packet in RTCP stream 3 503, for example. In addition, if CN NAT 130 is a standard port-restricted cone NAT router or port-restricted firewall, CN 108 could transmit a port binding packet 505 from IP:port 134 to IP:port 502 before media control channel messages in RTCP stream 3 503 are available, in order to open and bind IP:port 133 on CN NAT 130 to IP:port 134 on CN 108 for the receipt of RTCP stream 4 504 packets, with a source IP:port of 502. Consequently, MD 101 can establish a new media control channel by sending RTCP reports for MS 4 401 from IP:port 501 to IP:port 134 via IP:port 133 on CN NAT 130.

The new media control channel for MS 4 is illustrated as RTCP stream 4 504 in FIG. 5. Since MD 101 may be located behind AN NAT 119, CN 108 may not be able to readily transmit a RTCP report for MS 3 302 until CN 108 can determine the proper external port on AN NAT 119 that would forward packets to MD 101 at IP:port 501. Upon receipt of a call-control signal 307 or call control signal 307a that may contain the external IP:port 502, CN 108 can begin transmitting media control channel messages or packets such as RTCP receiver reports in RTCP Stream 3 503 from IP:port 134 to IP:port 502. The destination IP:port implemented by CN 108 for packets transmitted in RTCP stream 3 503 could be IP:port 502 on AN NAT 119, and AN NAT 119 can forward packets in RTCP stream 3 503 to IP:port 501 on MD 101 at IP 301.

Thus, in order to effectively support a media control channel through AN NAT 119, MD 101 may implement the same IP:port for both sending and receiving media control packets on the alternate network 117, as shown by IP:port 501 in system 500. In addition, CN 108 may implement the same IP:port for receipt of media control channel packets both before and after handover, in order to reduce the time required to set up a media control channel upon handover. Although the same IP:port 134 may be implemented by CN 108 for the receipt of media control channel packets, CN 108 can differentiate RTCP receiver reports for RTCP stream 2 and RTCP stream 4 based on the source IP address, when implementing the same IP:port for receipt of RTCP stream 2 112 and RTCP Stream 4 504.

Other benefits can be achieved by implementing the same IP:port 134 on CN 108 for sending and receiving the media control channel messages, in addition to simplifying the NAT and/or firewall traversal for those messages. If (i) a separate port is used for transmitting and receiving media control channel messages at each node, or (ii) sender reports are not implemented or transmitted less frequently such as every 120 seconds, either or both of AN NAT 119 IP:port 502 and CN NAT 130 IP:port 133 may close due to lack of outbound traffic from (a) MD 101 sent from IP:port 501 or (b) CN 108 sent from IP:port 134, respectively.

Through transmitting RTCP receiver reports as illustrated by system 500 in FIG. 5 on a periodic basis such as every 30 seconds or more frequently, the inbound IP:ports 502 and 133 should remain properly active and bound, thereby allowing both CN 108 and MD 101 to continue receiving media control channel messages for the duration of the media session after handover started. Although generally not standardized, many common NATs will close inbound UDP ports if outbound packets have not been transmitted in a short interval, such as the previous 60 seconds. If the devices AN NAT 119 and CN NAT 130 act as firewalls and packet filters, but do not perform network address translation, the firewall rules may similarly apply, such that inbound UDP ports may close if outbound traffic has not been transmitted in a short interval, such as the previous 60 seconds.

When MD 101 determines that handover is complete, it may send a call-control signal via a system such as that depicted in FIG. 2b to the CN 108 to terminate MS 2 and the corresponding media control channel, if implemented. MD 101 may also then terminate MS 1 and a related media control channel RTCP 1, if implemented. The completion of the handover could also be signaled by the corresponding node. In addition, the signal to stop transmitting MS 1 and MS 2 could be a logical signal as opposed to the transmission of an explicit call-control message. An example of a logical signal could be the transpiring of a period of time where the new media streams have been transmitted concurrently with sufficient quality, such as 45 seconds with an estimated Mean Opinion Score (MOS) of 3.75 or greater.

Note that the call-control channel implemented through the system depicted in FIG. 2b that established the initial media session illustrated in system 100 may need to be transferred from IP 103 to IP 301, and many methods are available to those of ordinary skill in the art. The transfer of a call-control channel to terminate MS 1 or MS 2 may be less time-sensitive than messages or signals to indicate the handover of media. A delay of several hundred milliseconds or more due to call-control processing to terminate MS 1 109 and MS 2 110 would likely not be noticeable to an end user, while a delay or gap of a few hundred milliseconds or more in audio would likely be noticeable and should be avoided. In addition, MD 101 and CN 108 could continue to transmit either MS 1 109 or MS 2 110 for the entire duration of MS 3 302 and MS 4 401, waiting until the user is finished with the entire media session before any individual media stream is terminated. Further, although a single corresponding node 108 is shown in system 500, the handover procedures illustrated can also be applied if MD 101 communicates with more than one CN 108, such as if MD 101 participates in a three-way call or a conference call.

FIG. 6

Figure 6:
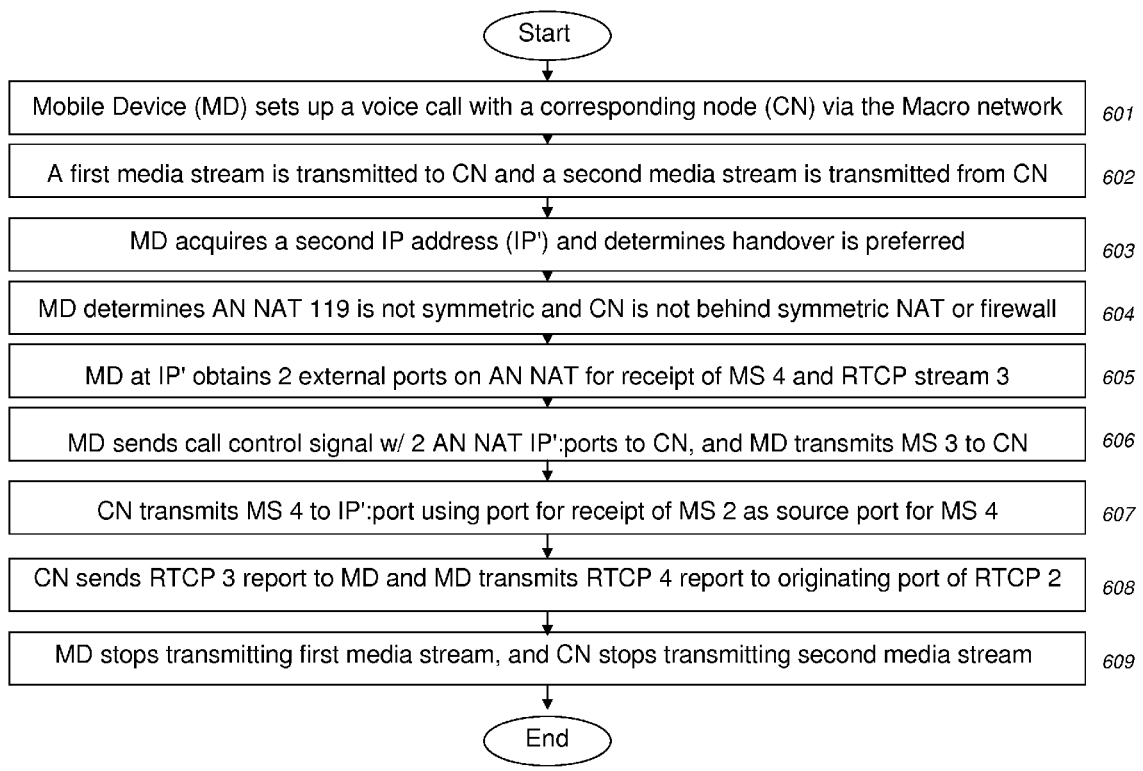
FIG. 6 is a simplified flowchart for exemplary handover procedures, in accordance with exemplary embodiments.

FIG. 6 is a simplified flowchart for exemplary handover procedures, in accordance with exemplary embodiments. In FIG. 6 and other flow charts describing the present invention, the processes and operations of the handover method described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer-implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel with other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

In FIG. 6, at Step 601, MD 101 establishes a media session such as a voice call with a CN 108, utilizing a first IP address such as an IP address provided by a mobile network operator. The media session could be established through call-control messages such as SIP INVITE, IAX2 NEW, XMPP Request, or other similar messages according to a protocol implemented by MD 101. In addition, MD 101 and CN 108 may not implement the same call-control protocol, and an intermediate server may translate the call-control messages between the two nodes. Although a request for a media session is described as originating from MD 101, a request to initialize a session could be requested from the corresponding node, representing an incoming call to the mobile device. Further, the voice call illustrated in FIG. 6 at Step 601 could initially be set up via a local network such as WiFi.

As shown in Step 602, upon establishment of the media session, a first media stream MS 1 109 is transmitted from MD 101 to CN 108, and a second media stream MS 2 110 transmitted from CN 108 to MD 101. The media session may optionally include a separate media control channel or protocol, such as RTCP or SRTCP, or the media control channel could possibly be imbedded directly into the media stream, as with IAX2. Preferably, quality feedback is provided by RTCP, SRTCP, similar protocols, or media control packets inserted into the media stream to (i) monitor the quality of received media received at another node and (ii) allow adjustments such as changing a codec, implementing forward error correction, or taking other steps to attempt to improve call quality.

At Step 603, the mobile device can acquire a second IP address, such as IP 301, and may determine that handover of the active media session to the new IP address is preferred. One of many example possible parameters to determine if handover is preferred include whether handover will reduce consumption of network resources for the mobile network 102, or alternatively if call quality will be improved. In addition, at step 603, MD 101 may determine that establishing a second communications channel through a second IP address is desirable, and may later determine that handover from one network to the next is preferred.

At Step 604, the mobile device 101 can evaluate whether the corresponding node 108 connects to the Internet via a NAT router that is not a symmetric NAT, or if CN 108 connects to the Internet via a firewall that is not a symmetric firewall. Information regarding the NAT type for CN NAT 130 could be acquired when MD 101 established the first media session in step 601. In this case, a LAN profile of CN 108, or a single entry within a LAN profile of CN 108 representing the network when CN 108 is located during the media session, could be stored in memory on MD 101 during Step 601 and then retrieved from memory during later handover procedures such as at Step 604. CN 108 may be behind a non-symmetric NAT if CN 108 is peer-to-peer client operating on a computer behind a consumer broadband connection, for example, since many consumer NATs are not symmetric, and other combinations of NAT types and alternate networks are possible as well. CN 108 may be behind a symmetric NAT or a port restricted cone NAT if it operates within a corporate LAN, for example. CN 108 may alternatively be behind a symmetric firewall without NAT functionality if IPv6 on a corporate LAN, also for example. MD 101 may not be able to directly determine whether CN 108 is behind a non-symmetric NAT, but rather could query CN 108 or a server on the Internet with a stored profile such as a LAN profile for CN 108, such as server 214, if server 214 contains information about the presence and type of NAT for CN NAT 130.

Also at Step 604, MD 101 could access a LAN profile for AN 117 illustrated in FIG. 2e in order to quickly evaluate the NAT or firewall type, without requiring the time-consuming series of probing requests to a STUN Server 306, for example. If the NAT type for AN NAT 119 is unknown or not stored in a LAN profile, MD 101 could determine the NAT type via STUN or similar techniques illustrated in FIG. 2c. Further, Step 604 could be divided into two separate steps, such that the AN NAT type is determined when MD 101 acquires IP 301, such as at step 603, and the determination of CN NAT 130 type is made earlier, such as at step 601. And other possibilities exist as well, without departing from the invention.

At Step 605, MD 101 obtains external port bindings on AN NAT 119 for both media and a media control channel. Although Step 605 shows MD 101 acquiring two port bindings, a single port binding could be acquired first for media and then a second port binding could be later acquired for a media control channel, if implemented. Likewise, if media and media control channel messages are mixed within the same port, such as with IAX2, a single port binding on AN NAT 119 mapping to IP:port 303 could be acquired for both media and media control channel messages.

At Step 606, MD 101 transmits to CN 108 a call-control signal 307 that contains the external IP:port on AN NAT 119 for MD 101 to receive media and media control channel packets. As noted previously, the transmission of the call-control signal 307 could be utilized to determine an external IP:port on AN NAT 119, by MD 101 transmitting the call-control signal from IP:port 303 to proxy server 213, where proxy server 213 can both process the call-control message and evaluate the external IP:port 304 on AN NAT 119.

If (i) a media control channel is not implemented, (ii) a media control channel is implemented later after handover of media, or (iii) packets for media control are combined into the media stream, then MD 101 could obtain a single external IP:port such as IP:port 304 in Step 605 and include this single IP:port in the call-control signal of Step 606. At Step 606, the mobile device 101 can also begin transmitting a third media stream using IP 301, preferably to the same destination IP:port that MD 101 utilizes for packets transmitted in the first media stream (e.g. IP:port 125 on CN NAT 130). Other destination ports could also be used as the destination IP:port for the third media stream, but a change in the receiving port on CN 108 would require signaling and processing overhead to both (i) open and bind the port on CN NAT 130 and (ii) negotiate the port with MD 101.

At Step 607, the corresponding node begins transmitting a duplicate media stream MS 4 to the mobile device, preferably utilizing IP:port 122 as the originating port for MS 4 and sending the traffic to IP:port 304 on the AN NAT 119. CN 108 can identify the IP:port 304 through the receipt and processing of call-control signal 307 sent by MD 101 in Step 606. If CN NAT 130 is a partial cone or port-restricted cone NAT, or a firewall with partial cone or port-restricted cone packet filtering rules but without network address translation functionality, the first media packet in MS 4 transmitted through CN NAT 130 can also open IP:port 125 for the receipt of media packets in MS 3, and these packets can subsequently be forwarded to IP:port 122 on CN 108. If CN NAT 130 is a is a partial cone or port-restricted cone NAT, packets in MS 3 received at IP:port 125 may be dropped until the first packet in MS 4 transmitted from CN 108 can traverse CN NAT 130, where CN 108 implements IP:port 122 as the source IP:port for packets transmitted in MS 4 401.

Once IP:port 125 on CN NAT 130 is open to MS 3, by implementing standard methods available in protocols such as UDP, RTP, IAX2, or proprietary protocols with similar functionality, the duplicate or redundant media streams MS 3 302 and MS 1 109 received by CN 108 should not degrade quality or cause other problems, and receipt of duplicate media could enhance call quality. The duplicate media streams MS 1 and MS 3 may be useful for CN 108 to maintain audio quality if the quality of MS 1 degrades while the mobile device moves away from base station 104 or into a location of reduced coverage or lower signal-to-noise ratios, such as movement into a building. If packets in MS 1 are dropped or contain errors, CN 108 may compensate for the errors by substituting/combining the equivalent packets in MS 3.

Also at Step 607, MD 101 can receive MS 4 without requiring the negotiation of additional or new ports on either AN NAT 119 or CN 108. MD 101 preferably monitors IP:ports 303 and 114 concurrently for the receipt of both MS 2 and MS 4. Again, the duplicate media streams MS 2 and MS 4 may be useful for MD 101 to maintain audio quality if communication through IP 103 begins to deteriorate, and the packets from MS 4 can compensate for potential loss or errors within MS 2.

At Step 608, the MD 101 and CN 108 may optionally establish a media control channel using RTCP or similar protocols for the two newly established media streams MS 3 and MS 4. Reports on quality and other media control channel messages, such as an RTCP receiver report, may be transmitted to MD 101 at IP:port 502 on the AN NAT 119, which could have been (i) identified in Step 605 and (ii) communicated to CN 108 via a call-control signal 307 or call-control signal 307a. A probing request 506 at Step 605 could previously have established the port bindings on the AN NAT 119 between IP:port 501 and IP:port 502.

Thus, MD 101 can (i) receive media control channel messages for MS 3 on IP:port 501 and (ii) transmit media control channel messages such as RTCP reports for MS 4 to IP:port 133 on CN NAT 130, using IP:port 501 as the source IP:port, and CN NAT 130 can map packets received on IP:port 133 to IP:port 134 on CN 108. The media control channel process illustrated in Step 608 may be omitted, although it could be useful for MD 101 and CN 108 to monitor quality of the new media streams.

At Step 609, the handover can be completed and MD 101 may stop transmitting MS 1, CN 108 may stop transmitting MS 2, and the associated media control channels, if implemented, may be closed. The signaling to terminate MS 1 and MS 2 could be sent through the call-control channel illustrated in FIG. 2b, or via a call-control packet inserted in the media streams, as examples. Step 609 may be optionally omitted, in that MS 1 and MS 2 could continue for the duration of the user's media session.

FIG. 7

Figure 7:
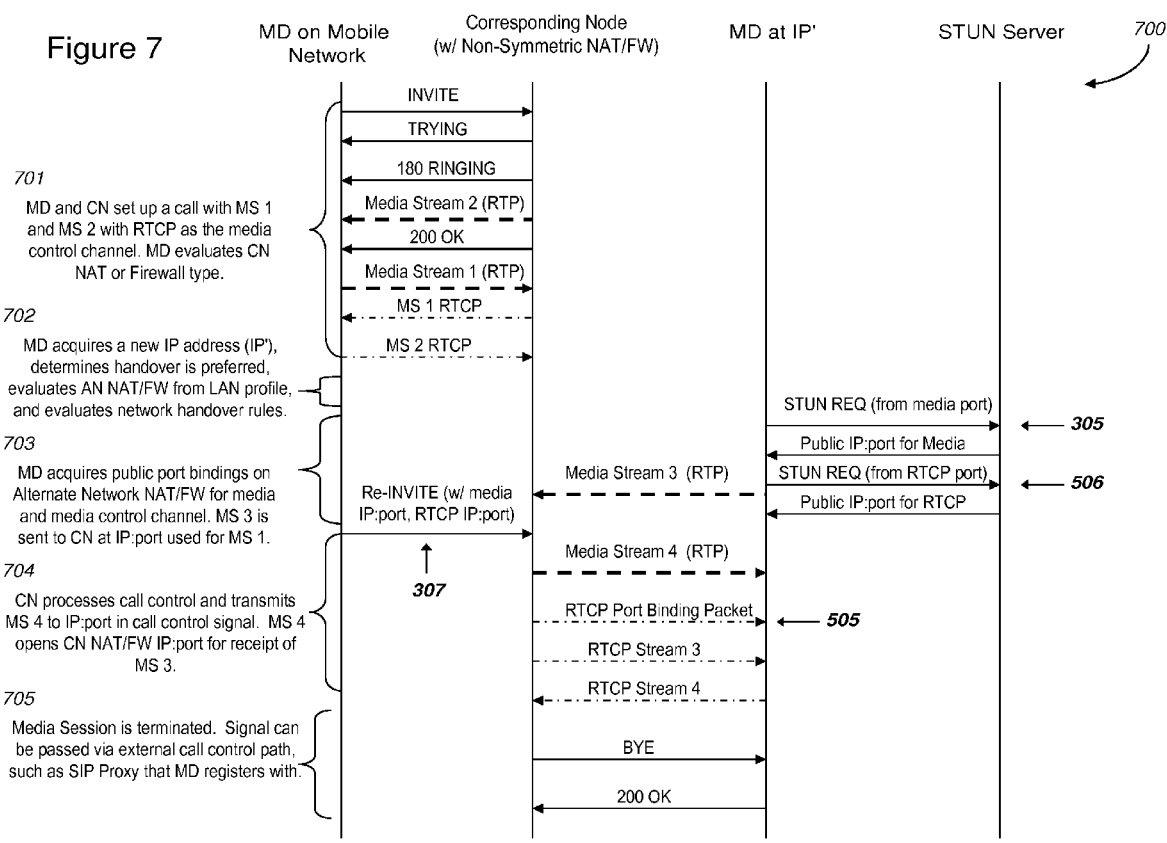
FIG. 7 is a simplified message flow diagram illustrating the handover call-control messages and media flow between a mobile device and a corresponding node, in accordance with exemplary embodiments.

FIG. 7 is a simplified message flow diagram illustrating the handover call-control messages and media flow between a mobile device and a corresponding node, in accordance with exemplary embodiments. The protocol illustrated in 700 is according to common, current implementations of the SIP protocol, but other protocols that can establish media sessions between endpoints on the Internet could be used. The corresponding node in message flow 700 may connect to the Internet via a NAT that could belong to the full cone, partial cone, or port-restricted cone types. Instead, the corresponding node may connect to the Internet via a firewall that does not perform network address translation, but rather restricts inbound packets according to the logic implemented in non-symmetric NATs for accepting or rejecting inbound packets.

For example, a firewall connecting the corresponding node to the Internet could reject packets from an external host on the Internet where a packet had not first been transmitted. If a packet from any port on the external host can be transmitted and passed through the firewall only after the corresponding node has transmitted a packet to that host, then the firewall would implement logic equivalent to a partial cone NAT. Similarly, if a packet from an external host can only be transmitted and passed through the firewall from a specific port on the external host where the corresponding node had previously transmitted a packet, then the logic implemented by the firewall would be equivalent to a port-restrict cone NAT for the purposes of accepting or rejecting inbound packets.

At Step 701, the mobile device and corresponding node establish a media session according to methods that are well known in the art. Although the media is shown as RTP in Step 701, the media could be transmitted according to other protocols. A media control channel in the form of RTCP messages can optionally be used. In addition, MD 101 may evaluate the type of NAT for CN NAT 130 at Step 701 during the setup of the media session.

At Step 702, MD 101 acquires a second IP address and determines that handover is preferred. Alternatively, at Step 702, MD 101 may simply determine that establishing a duplicate media session is preferred and may later determine that handover is preferred. The acquisition of the second IP address and the handover decision may be handled by different software routines operating within the mobile device. For example, the mobile-device operating system 203 may manage the acquisition of a second IP address, while a software application or software module may determine that (i) handover is preferred or (ii) establishing a duplicate media session is preferred.

In one example, a software routine that is running within the operating system 203 may determine that handover is preferred. In another example, a program such as Truephone® or MSN Messenger® may (i) monitor the quality of an existing media session and (ii) observe that the second IP address, IP 301, becomes available at MD 101, and (iii) measure the quality of a connection via the second IP address to make decisions regarding handover. In Step 702, MD 101 may also access a LAN profile 224 in order to evaluate whether AN NAT 119 has a NAT-router or firewall type such as full cone, partial cone, port-restricted cone, or alternatively whether the IP address IP 301 is publicly routable or connects to the public Internet 106 via a firewall. In addition, MD 101 may identify an efficient handover procedure in Step 702 by evaluating a set of network handover rules such as network handover rules 225.

At Step 703, the mobile device can transmit a probing request 305 to a server such as STUN server 306 in order to obtain port bindings on an AN NAT 119. External port bindings on AN NAT 119 which can be accessed by CN 108 can be acquired since AN NAT 119 may have previously been evaluated to be non-symmetric. One probing request can identify an IP:port 304 mapping to IP:port 303 for receipt of a media stream. A second probing request can identify an IP:port 502 mapping to IP:port 501 for the receipt of media control channel messages such as RTCP packets. The probing request 305 can alternatively be combined with a call-control signal 307 (not shown), such that the call-control signal is transmitted from IP:port 303, for example, and the server can observe IP:port 304 and subsequently communicate IP:port 304 in a call-control signal 307 that is forwarded from the server on to CN 108.

Also in Step 703, MD 101 can begin transmitting MS 3 302 from IP:port 303 to IP:port 125 on CN NAT 130. MS 3 302 may also be transmitted later, such as during Step 704, but generally starting to transmit MS 3 302 as quickly as possible may be preferred in order to speed handover. The destination IP:port for packets transmitted in MS 3 302 can preferably be the same IP:port that MD 101 implements for MS 1 109, which is IP:port 125 as illustrated in FIG. 3. Other destination ports could be used, which would likely require additional signaling between MD 101 and CN 108.

In Step 704, MD 101 transmits a call control signal 307 or 307*a* to CN 108, where the call-control signal may contain the IP:port 304 that CN 108 may implement as the destination IP:port in MS 4 401. MD 101 may also send a call-control signal to CN 108 to indicate that handover is requested, such as through a SIP Re-INVITE message via the call-control channel illustrated in FIG. 2*b*. Upon receipt of call-control signal 307, CN 108 can begin transmitting MS 4 401 to the mobile device, preferably to the IP:port 304 contained in call-control signal 307 or 307*a*. Note that AN NAT 119 may not be present, and in this case IP:port 304 and IP:port 303 could be the same. Again, other ports could be used as the destination IP:port for MS 4 as transmitted by CN 108, but that may require opening ports on the AN NAT 119, if present, and negotiating the change in ports between MD 101 and CN 108. MD 101 may monitor IP:port 303 for the receipt of MS 4, preferably while continuing to receive MS 2 on IP:port 114.

Also at Step 704, a media control protocol such as RTCP may be implemented, and in this case CN 108 may send one or more media-control-channel packets (perhaps according to RTCP) in RTCP stream 3 503 to IP:port 502 that could be communicated to CN 108 via a call-control signal 307 or 307*a*. As noted by the port binding packet 505 illustrated in Step 704, if CN NAT 130 is of the port-restricted cone type, CN 108 may transmit a packet to open and bind IP:port 133 before sending RTCP Stream 3 503, in order to open the inbound IP:port 133 for receipt of RTCP Stream 4 504 packets. According to an exemplary embodiment, IP:port 133 can become properly open and bound with the transmission of the first packet in RTCP Stream 3 503, but transmitting a port-binding packet will allow the port to be opened and bound earlier in the handover process.

AN NAT 119 can forward media-control-channel packets from IP:port 502 to IP:port 501 in order to be processed by MD 101, to provide feedback on the quality of MS 3 302 received by CN 108. The binding between IP:port 502 and IP:port 501 could be previously established by probing request 506 in Step 703. MD 101 can also transmit media-control-channel packets such as RTCP reports in RTCP Stream 4 504 to IP:port 133, which could be the same IP:port implemented on CN NAT 130 for the receipt of media-control-channel packets in RTCP Stream 2 112. In Step 705, after the handover can be completed and the users can finish the media session, the MD 101 may terminate the call and end MS 3 and MS 4, via standard methods such as a "BYE" with SIP or similar messages in related protocols. Although not illustrated in FIG. 7, a separate call-control message could be implemented to terminate MS 1 109 and MS 2 110, and corresponding media control channels, before terminating MS 3 and MS 4.

FIG. 8

FIG. 8 is simplified tabular summary illustrating source and destination IP addresses for media packets and media-control-channel packets transmitted and received during handover procedures, in accordance with exemplary embodiments. The use of NATs and/or firewalls at both nodes, such as alternate network NAT 119 and corresponding node NAT 130, increase the complexity of managing communications and handover between MD 101 and CN 108. Each call-control, media, or media-control-channel packet transmitted and received should have a source IP address and a destination IP address, as well as a source port number and a destination port number. Various example IP addresses and ports for the present invention are illustrated throughout FIGS. 1-5. The tabular summary in FIG. 8 illustrates example IP addresses and ports in headers on packets within both the media and media-control streams according to an exemplary embodiment illustrated in FIGS. 1, 3, 4, and 5, though other appropriate IP addresses and ports could be utilized as well. Although IPv4 addresses are illustrated in FIG. 8, IPv6 addresses could be used, or also combinations of IPv4 and IPv6 addresses could be used.

The headers on a packet may be different as a packet routes (i) between MD 101 and AN NAT 119, (ii) between the external interfaces of the AN NAT 119 and CN NAT 130, and (iii) between CN NAT 130 and CN 108. In addition, though a single NAT is shown for each node in FIG. 1 and FIG. 8, multiple levels of NATs may connect either MD 101 or CN 108 to the Internet. If multiple NATs are deployed between a node and the public Internet 106, in general their combined function may be modeled as a single logical NAT for most applications such as voice and media.

The IP addresses and port numbers in packet headers for both media and a media-control channel for all four media streams and media-control channels in system 100 and system 500 are illustrated in FIG. 8. An RTCP media-control channel is illustrated in FIG. 8, although other media-control packets could be inserted directly into the media streams, if the protocols implemented by the nodes support this type of logical channel. In addition, the media-control channel could be omitted or partially omitted, such that RTCP or related techniques are implemented before handover but not after, thereby simplifying the handover process. Further, a media-control channel could optionally be implemented in only one direction, such as for MS 3 302 but not for MS 4 401. In addition, although NAT functionality is illustrated in FIG. 8, a NAT may not be present at both nodes in order to utilize the handover techniques described herein. For example, if CN 108 is behind a firewall, such as a firewall with port-restricted cone packet filtering rules but without network address translation functionality, the IP addresses for both the source port and the destination port at the corresponding node can be the same for each media stream.

FIG. 9

Figure 9:
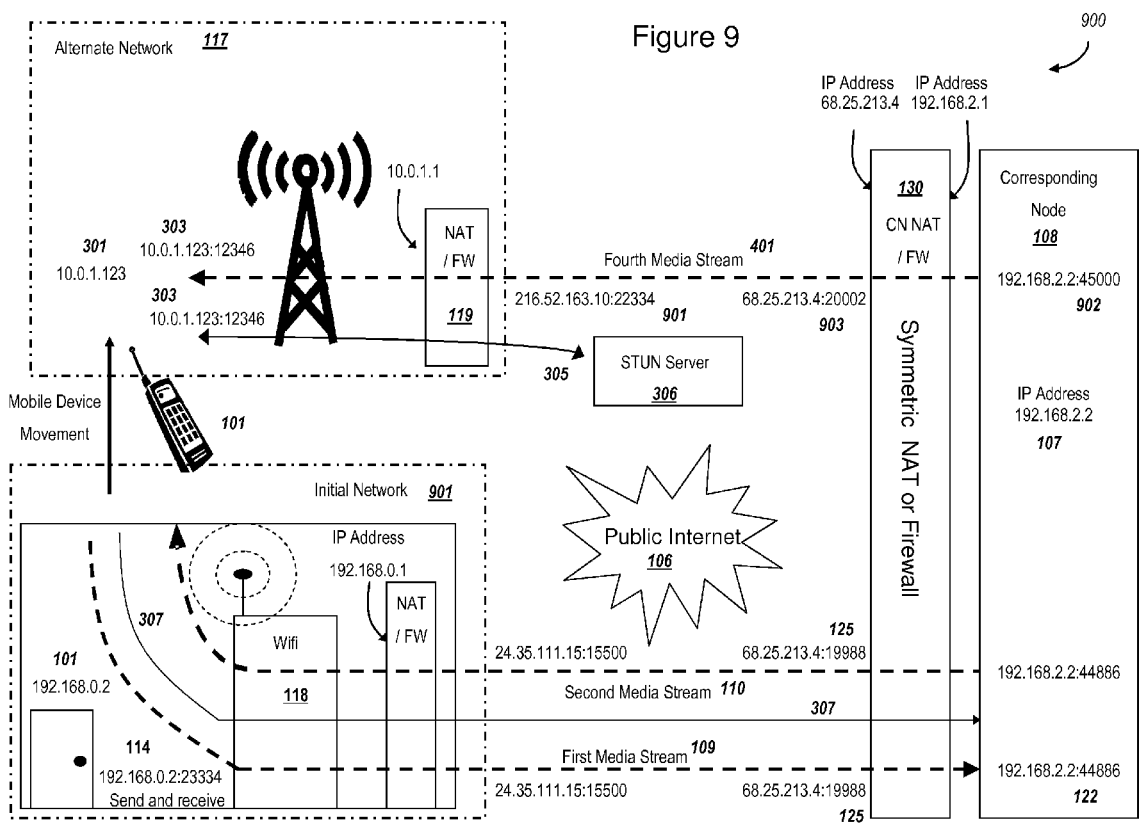
FIG. 9 is a graphical illustration of an exemplary system, where a mobile device initiates handover, and where a corresponding node accesses the Internet through a symmetric NAT router or firewall, in accordance with exemplary embodiments.

FIG. 9 is a graphical illustration of an exemplary system, where a mobile device initiates handover, and where a corresponding node accesses the Internet through a symmetric NAT router or firewall, in accordance with exemplary embodiments. For the system 900 illustrated in FIG. 9, the alternate network 117 is shown as the mobile operator's WAN, representing the target network for the handover. The initial network 901 is the network where the first media session with CN 108 was established. Alternatively, the initial network 901 could be the network to which a previously-established call has already been handed over, such as if the user was moving through several different networks during a call.

In order to obtain connectivity to the Internet through the alternate network 117, the mobile device 101 can acquire a new IP address (IP) 301 that is provided by the alternate network 117. System 100 and system 900 illustrate that the alternate network (i.e. the network that is the target of a potential or actual handover) can be of any one of a variety of network types, and in general is any network from which an endpoint—such as MD 101—would obtain a new IP address for communicating over the public Internet 106.

For example, even though the mobile network operator may refer to the mobile network 102 as the "home network", for the purposes of the efficient handover techniques of the present invention, the mobile network 102 may also be an alternate network 117, representing a target network to which a mobile device may prefer to transfer an existing media session such as a telephone call or a "peer-to-peer" voice or video communication. The example IP addresses shown in FIG. 9 within AN 117 and the Initial Network 901 are for illustration purposes and are shown as similar to the IP addresses illustrated in systems 100 and 300, although the IP addresses within AN 117 and the Initial Network 901 in system 900 could be different, and any appropriate packet switching may be implemented, including IPv6 addresses.

The corresponding node 108 may have a private IP address (CN IP) 107. The corresponding node 108 may be connected to the public Internet 106 via a symmetric NAT router, CN NAT 130. A software program operating at the corresponding node CN 108 may determine the NAT type for CN NAT 130 through standard techniques such as Simple Traversal of UDP through NATs (STUN) or similar methods illustrated in system 200. The type of NAT for CN NAT 130 can be communicated to MD 101 during the setup of the first media session, which includes MS 1 109 and MS 2 110.

A port on a symmetric NAT external interface, which is open and bound to an IP:port on the internal network, may be uniquely mapped to a specific IP:port on a an external host, such that, if the same IP:port on the internal network connects to a different IP:port on an external host, then a new, second IP:port on the NAT external interface may be open and bound to the same IP:port on the internal network. It is not necessary, however, for CN 108 to confirm that CN NAT router 130 is a symmetric NAT in order to implement the techniques illustrated herein; that is, the handover method and system illustrated in FIG. 9 could be implemented if CN NAT 130 is another type of NAT. In addition, CN NAT 130 could be a symmetric firewall, such that no network address translation is performed, and the rules to allow packets and map ports between external and internal interfaces are analogous to a symmetric NAT without address translation. An example of a symmetric firewall is described in IETF RFC 3489. If CN NAT 130 is a symmetric firewall without NAT functionality, then IP:ports 125 and 122 could be the same, and IP:ports 903 and 902 could also be the same.

A media session between MD 101 and CN 108 has previously been established through protocols and a system such as the system shown in FIG. 2*b*. The media session includes a first media stream MS 1 109 transmitted from MD 101 to CN 108 and a second media stream MS 2 110 transmitted by CN 108 to MD 101. Although not illustrated in FIG. 9, a media control channel such as RTCP or STRCP may optionally be implemented, but is not required, and other quality feedback mechanisms could be utilized as well, such as inserting quality feedback messages into MS 1 or MS 2. A symmetric CN NAT 130 can map packets transmitted and received at its external interface to the CN IP address 107 with associated ports.

MD 101 may acquire IP 301 in part due to movement. Alternatively, both IP 103 and IP 301 may be present and active on MD 101 when the media session with CN 108 was established, and MD 101 may have previously determined that IP 103 was preferred for communication for one or a combination of multiple reasons previously illustrated, such as superior quality, lower costs, higher bandwidth, etc. In other words, physical movement of MD 101 is not a necessary trigger to leveraging the advantages of implementing the present invention. MD 101 could be stationary and either (i) acquire a new IP address IP 301 as the signal from AN 117 improves, or (ii) have multiple IP addresses assigned and active, whereby MD 101 monitors the multiple IP addresses for quality and determines that a handover is preferred as the multiple network-quality profiles change.

These two cases represent a situation where the signal strength at a particular physical location is dynamic, such as due to periodic interference or other sources of variation in network quality. One possible example is if a user is located in a residence at the initial network 901 and MD 101 communicates through a local WiFi access point 118 for an existing media session, and then a family member turns on a microwave oven nearby, which could interfere heavily with 802.11 signals at 2.4 GHz. Microwave ovens typically operate at power levels of hundreds of watts close to 2.4 GHz. With (i) an active media session established and (ii) both IP 103 and IP 301 assigned and active on MD 101, MD 101 may determine that handover from IP 103 to IP 301 is preferred even though the mobile device is stationary in this example involving high, unexpected interference. This example also illustrates that rapid handover techniques are preferred and that the need for a handover may not be readily predictable by MD 101. The efficient handover techniques outlined herein can provide rapid handover of media sessions to minimize the impact on voice or video quality for the user.

Before handover of the existing media session from IP 103 to IP 301, MD 101 may first evaluate whether AN NAT 119 is present and, if it is present, what type of NAT it is. MD 101 could determine the type of NAT for AN NAT 119 by evaluating whether the alternate network 117 has an entry in a LAN profile 224. Alternatively, MD 101 could evaluate the presence and type of NAT for AN NAT 119 through STUN techniques outlined in system 200 or similar methods, which may be preferred if there is no entry for the alternate network 117 in a LAN profile, which could be the case if MD 101 has not previously connected to the Public Internet 106 via alternate network 117. Note that a LAN profile may also contain entries regarding a wireless WAN, such as the alternate network 117 illustrated in FIG. 9. Thus, the entries within a LAN profile may not be limited to only "local area networks", but could also include information pertaining to wide area networks visited by MD 101. For example, a mobile network may route packets through a NAT or firewall, and properties such as the NAT or firewall type on the mobile network could also be stored within a LAN profile.

Upon evaluating the type of NAT for AN NAT 119, in conjunction with determining that CN NAT 130 is a symmetric NAT or symmetric firewall in system 900, MD 101 may select an efficient handover technique using network handover rules 225. For system 900 illustrated in FIG. 9, MD 101 may determine that AN NAT 119 is a full cone or partial cone NAT, and that CN NAT 130 is symmetric. Instead, MD 101 may determine that AN NAT 119 is not present and that IP 301 can be a publicly routable IP address, representing an example NAT type of "null" or "public" in an example set of network handover rules 225. The handover technique illustrated in system 900 is denoted method "C" in network handover rules 225.

According to a preferred embodiment, MD 101 may determine that AN NAT 119 is a full cone, partial cone, or null NAT based upon an entry for AN 117 in LAN profile 224. To initiate handover, MD 101 can obtain an external IP:port 901 on AN NAT 119 by transmitting a probing request 305 to a STUN server 306 from IP:port 303. STUN server 306 can respond to the probing request 305 with the observed external IP:port 901. MD 101 can transmit a call-control signal 307 to CN 108 via the call-control system implemented to establish the first media session, such as a system illustrated in FIG. 2*b*, and the call-control signal 307 may indicate both (i) that handover is preferred and (ii) the IP:port 901 to which CN 108 can transmit a fourth media stream MS 4 401. Alternatively MD 101 can transmit a call-control signal 307 as a packet or message within MS 1 109, if CN 108 can process media and call control concurrently on IP:port 122. In addition, MD 101 could transmit call-control signal 307 both in MS 1 and a call-control channel illustrated in system 200.

Upon receipt and processing of call-control signal 307, CN 108 may begin transmitting MS 4 401 from an IP:port 902 to the IP:port 901 specified in call-control signal 307. Although IP:port 902 is illustrated as being a different IP:port than IP:port 122 in system 900, the two IP:ports 902 and 122 could be the same. Since CN NAT 130 may be a symmetric NAT or symmetric firewall, the specific port implemented by CN 108 to transmit MS 4 401 may be less important, since an entirely new IP:port 903 on CN NAT 130 can be opened and bound to CN 108 regardless of the IP:port implemented by CN 108 as the source port for the transmission of MS 4 401. For example, even if IP:ports 902 and 122 are the same, CN NAT 130 may still open a new IP:port 903, with a different port number than IP:port 125, if it is a symmetric NAT or a symmetric firewall.

AN NAT 119 can begin receiving MS 4 401 at IP:port 901 and forward the packets to MD 101 at IP:port 303. CN 108 preferably performs a "make before break" handover, so MS 2 110 and MS 4 401 can be transmitted concurrently. MD 101 could observe that MS 2 110 and MS 4 401 are effectively duplicate media streams. Alternatively, CN 108 may perform a "break before make" handover, and simply cease transmission of MS 2 110 when MS 4 401 is started, although sending duplicate media streams from CN 108 may be preferred for a period of time, such as 60 seconds, and other time intervals for—as well as triggers for stopping—the transmission of duplicate media streams are possible as well.

MD 101 should process the duplicate or redundant media streams without requiring any previous signaling other than transmitting a call-control signal 307, and the two streams of media received by MD 101 may not be identical copies, as each stream may have different levels of packet loss, bit errors, or jitter, for example. In addition, MS 4 402 and MS 2 110 could be transmitted according to a different codec. Preferably, MD 101 can process both media streams in order to obtain a superior representation of the media transmitted by CN 108. For example, if MD 101 determines that a particular packet in MS 2 likely has bit errors, but the equivalent packet in MS 4 is received without errors, then MD 101 may utilize the packet in MS 4 for media playback.

In addition, if two packets representing a frame in both MS 2 and MS 4 both have bit errors, MD 101 can combine information in the two packets in order to minimize the bit errors for an aggregate, enhanced representation of the frame. Conversely, if MD 101 determines that a second packet in MS 4 was lost but that the equivalent packet in MS 2 was received for a particular frame, then MD 101 may utilize the second packet from MS 2 for media playback. Consequently, a receiving node may combine information received in two separate media streams to reduce errors and enhance voice quality during handover.

Upon receipt of the first packet in MS 4 401, MD 101 may begin transmitting a third media stream MS 3 302 (not shown) from (a) IP 301 using IP:port 303 as the source IP:port to (b) CN NAT 130 at IP:port 903. MD 101 can identify the correct port on a symmetric NAT CN NAT 130 to transmit MS 3 302 by observing the source IP:port 903 for a packet received in MS 4 401. MD 101 may begin transmitting MS 3 302 before stopping the transmission of MS 1 109 (i.e. perform a "make before break" handover). MD 101 may preferably not transmit MS 3 302 until a packet is received in MS 4 401, in order to determine the correct IP:port 903 on symmetric CN NAT 130 that will map to a receiving IP:port 902 at CN 108. MD 101 can use the same IP:port 303 for the transmission of media stream 3 302 and receipt of media stream 4 401, and CN 108 can use the same IP:port for the transmission of media stream 4 401 and receipt of media stream 3 302, in order to efficiently establish media streams that can traverse both AN NAT 119 and CN NAT 130.

Further, MD 101 may implement different codecs for transmitting MS 1 and MS 3, and likewise CN 108 may implement different codecs for transmitting MS 2 and MS 4. MD 101, CN 108, or a server or host on the Internet may have determined that a higher-bandwidth codec such as G.711 is preferred for MS 1 when MS 1 was established, perhaps due to high bandwidth availability or lower cost bandwidth at IP 103, as examples. However, a different codec such as AMR may be preferred for communication through the alternate network 117, perhaps due to lower bandwidth, more expensive bandwidth, or higher bit errors, as examples, and consequently a mobile network codec such as GSM-EFR or AMR may be preferred for MS 3 over the previously selected codec utilized for MS 1.

MD 101 and CN 108 may have shared a supported codec list when establishing the first media session using a system similar to FIG. 2*b*. Consequently, upon handover, MD 101 may begin transmitting MS 3 formatted in a different codec to CN NAT 130 IP:port 903 than the codec MD 101 implemented in the transmission of MS 1 109 at IP:port 125. In this case, CN 108 preferably supports the different codec for MS 3 and processes the duplicate media streams in order to minimize potential gaps or errors in media received during handover. The media in FIG. 9 may be sent as RTP or SRTP, although other methods of sequencing the transmitted media packets could also be implemented.

FIG. 10

Figure 10:
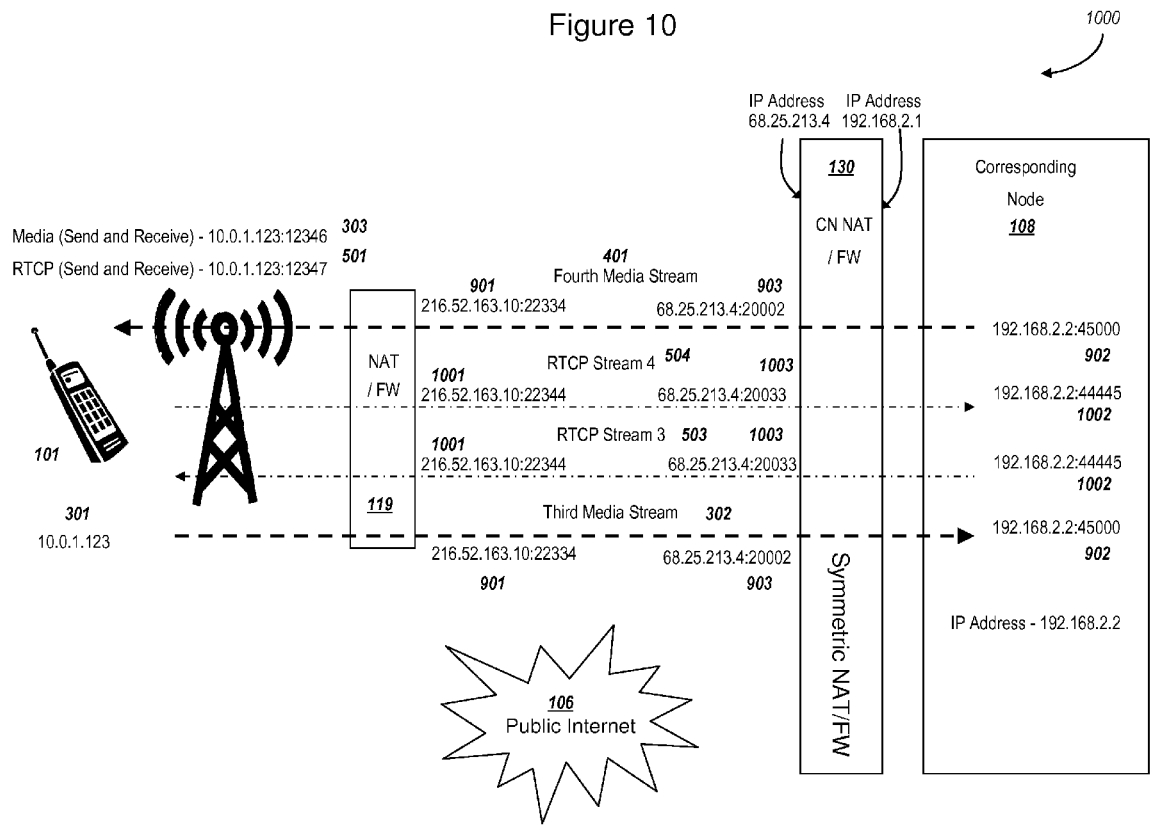
FIG. 10 is a graphical illustration of an exemplary system, where a mobile device and a corresponding node transmit and receive media and a media-control channel upon completion of a handover, and where the corresponding node accesses the Internet through a symmetric NAT router or firewall, in accordance with exemplary embodiments.

FIG. 10 is a graphical illustration of an exemplary system, where a mobile device and a corresponding node transmit and receive media and a media-control channel upon completion of a handover, and where the corresponding node accesses the Internet through a symmetric NAT router or firewall, in accordance with exemplary embodiments. FIG. 10 may be viewed as depicting the completion of the handover process shown in FIG. 9, where CN NAT 130 may be symmetric and where AN NAT 119 may be of the full cone or partial cone types. Further, AN NAT 119 could be omitted and IP 301 could be publicly routable, representing the null type of NAT router. In addition, both CN 108 and MD 101 could have publicly routable IP addresses, and AN NAT 119 and CN NAT 130 could function as firewalls and not perform network address translation. If either AN NAT 119 or CN NAT 130 are firewalls that do not perform NAT functionality, then the IP:ports illustrated on both the external and internal interfaces can be the same for each illustrated stream of packets, such as MS 4 401.

According to a preferred exemplary embodiment illustrated in FIG. 10, after MD 101 starts receiving MS 4 401 via the symmetric CN NAT 130, MD 101 may begin transmitting a third media stream MS 3 302. Voice activity detection (VAD) may preferably be disabled within MS 3 302 and/or MS 4 401 in order to keep IP:port 901 and/or IP:port 903, respectively, open and bound. Alternatively, VAD techniques that send silence descriptor packets more frequently than every few seconds could be implemented in order to keep the NAT ports open and bound, and other techniques to periodically send packets in the media streams during silence could be utilized as well.

MD 101 and CN 108 may also implement a media control channel such as RTCP messaging, and the techniques to manage the transmission of packets through an AN NAT 119 and CN NAT 130 can follow equivalent steps outlined above in FIG. 9 for media. The media control channel may also be useful as a feedback mechanism to inform each node whether their transmitted media is (i) properly received, or (ii) requires adjustments such as increased channel coding, before terminating either MS 1 or MS 2. System 1000 illustrates the transmission of the media control channel as RTCP, although other techniques such as SRTCP or proprietary protocols could be implemented, or the media control channel could be omitted or embedded directly into the media streams. If the media control channel is embedded directly into the media streams, then IP:port 303 could be equal to IP:port 501.

Upon determining that handover is preferred, MD 101 can obtain (e.g. via STUN) an external IP:port 1001 (on AN NAT 119) that will map to IP:port 501 for the receipt of media control channel packets at IP 301. MD 101 can inform CN 108 of the IP:port 1001 via a call-control signal 307 (not shown). Upon receipt of a call-control signal 307, CN 108 may transmit a packet from IP:port 1002 to IP:port 1001 in order to open and bind IP:port 1003 on symmetric CN NAT 130. AN NAT 119 can forward the incoming packet on IP:port 1001 to MD 101 IP:port 501, since the port on AN NAT 119 was previously opened and bound via the STUN request to obtain IP:port 1001 for MD 101. MD 101 can observe the originating IP:port 1003 in the packet received on IP:port 501, and transmit media control channel messages for MS 4 401 to CN 108 via RTCP Stream 4 504, using IP:port 501 as the source IP:port and IP:port 1003 as the destination IP:port.

CN 108 can transmit media-control-channel messages for MS 3 302 to MD 101 at IP:port 1001 via RTCP Stream 3 503. In order to effectively support a media control channel through AN NAT 119 and CN NAT 130, MD 101 can implement the same IP:port 501 for the transmission of RTCP stream 4 504 and receipt of RTCP stream 3 503, and CN 108 can implement the same IP:port 1002 for the transmission of RTCP stream 3 503 and receipt of RTCP stream 4 504. Although IP:port 1002 is illustrated as a different IP:port than IP:port 134 in FIG. 4 on CN 108 for the transmission and receipt of media-control-channel messages, the two ports could be the same. However, since CN NAT 130 may be symmetric, even if IP:ports 1002 and 134 are the same, they may still likely map to different external IP:ports on CN NAT 130.

FIG. 11

Figure 11:
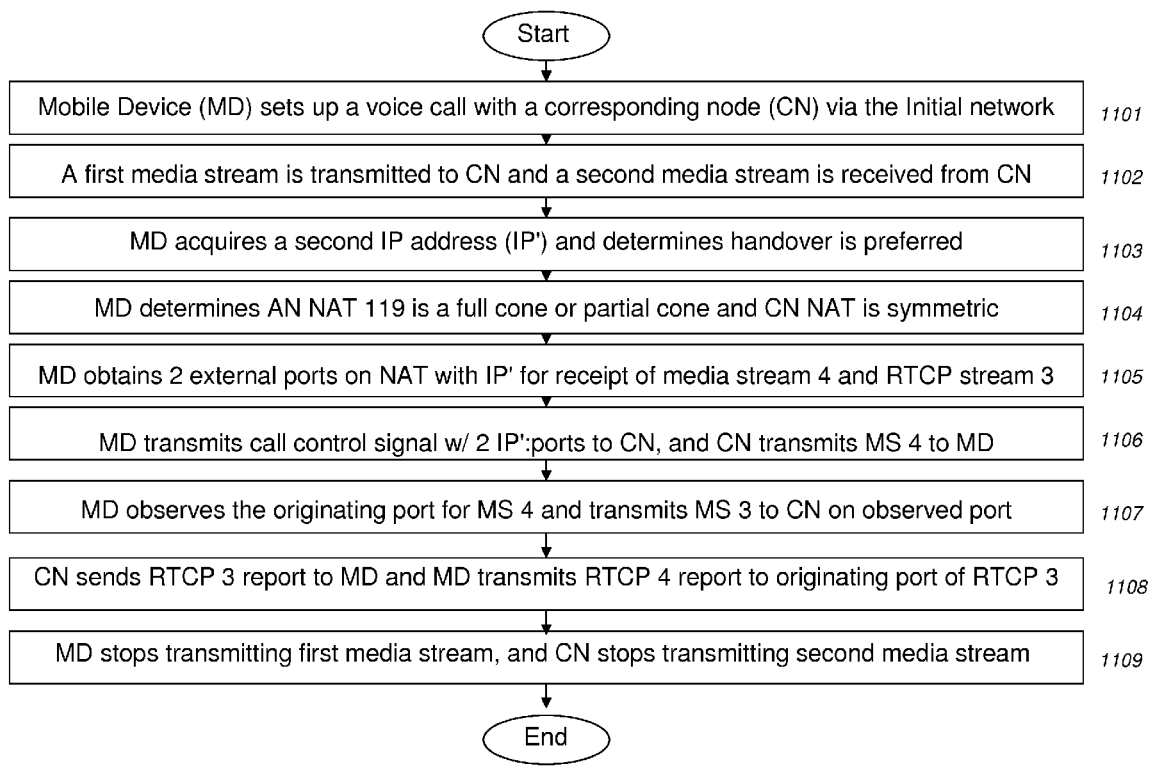
FIG. 11 is a simplified flowchart for exemplary handover procedures, where a corresponding node accesses the Internet through a symmetric NAT router or firewall, in accordance with exemplary embodiments.

FIG. 11 is a simplified flowchart for exemplary handover procedures, where a corresponding node accesses the Internet through a symmetric NAT router or firewall, in accordance with exemplary embodiments. In FIG. 11, at Step 1101, MD 101 establishes a media session such as a voice call with a CN 108, utilizing a first IP address such as an IP address provided by an initial network, such as initial network 901. Although a voice call is illustrated in Step 1101, the media session could consist of other media such as video, voice and video, or streaming music, for example. The media session could be established through call-control messages such as SIP INVITE, IAX2 NEW, XMPP Request, or other similar messages according to a protocol implemented by MD 101, using a call-control channel such as that illustrated in FIG. 2*b*. Although a request for a media session is described as originating from MD 101 in Step 1101, a request to initialize a session could originate from the corresponding node, representing an incoming call to the mobile device.

As shown in Step 1102, upon establishment of the media session, a first media stream MS 1 109 is transmitted from MD 101 to CN 108 and a second media stream MS 2 110 transmitted from CN 108 to MD 101. The media session may optionally include a separate media control channel and associated protocol, such as RTCP or SRTCP, or the media control channel could possibly be imbedded directly into the media stream, as with IAX2. Preferably, quality feedback can be provided by RTCP, SRTCP, or similar protocols, to (i) monitor the quality of received media received at another node and (ii) allow adjustments such as changing a codec, implementing forward error correction, or taking other steps to attempt to improve call quality, such as increasing channel coding of the media.

At Step 1103, the mobile device acquires a second IP address, such as IP 301, and may determine that handover of the active media session to the new IP address is preferred. One of many example possible parameters to determine whether handover is preferred include whether call quality can be improved through establishing a second path for media via an alternate network 117, which may also be a mobile network providing WAN access. In addition, at step 1103, MD 101 may determine that establishing a second communications channel through a second IP address is desirable, and may later determine that handover from one network to the next is preferred.

At Step 1104, the mobile device 101 determines that (i) the alternate network connects to the Internet via a full cone or partial cone NAT router or provides a publicly routable IP address and (ii) the corresponding node 108 connects to the Internet via a symmetric NAT or symmetric firewall. Information regarding the NAT type or firewall type for CN NAT 130 could be acquired when MD 101 established the first media session in step 1101. In this case, a LAN profile of CN 108 could be stored in memory on MD 101 during Step 1101 and then retrieved from memory during later handover procedures such as at Step 1104. Also, instead of storing a complete LAN profile for CN 108, MD 101 could acquire a single record within the LAN profile for CN 108 corresponding to the network where CN 108 communicates with MD 101. In addition, CN NAT 130 may be a symmetric firewall and not perform NAT functions. CN 108 may be a symmetric NAT or symmetric firewall if CN 108 operates behind a corporate or secure broadband connection, for example, since many corporate broadband connections are symmetric.

MD 101 may not be able to determine whether CN 108 connects through a symmetric NAT directly, but rather could query CN 108 or a server on the Internet with a stored profile for CN 108, such as server 214. For example, CN 108 could also be a mobile device with a LAN profile 224, and information about the CN NAT 130, such as type of NAT, could be stored in a LAN profile 224 for CN 108. At Step 1104, MD 101 could access a LAN profile 224 for AN 117 illustrated in FIG. 2e in order to quickly evaluate the NAT type, without requiring the time-consuming series of probing requests to a STUN Server 306 or similar NAT probing techniques. If the NAT type for AN NAT 119 is unknown or not stored in an LAN profile, MD 101 could determine the NAT type via STUN or similar techniques illustrated in FIG. 2c. Further, Step 1104 could be divided into two separate steps, such that the AN NAT type is determined when IP 301 is acquired, such as at step 1103, and the evaluation of CN NAT 130 type is made earlier, such as at step 1101. And other examples are possible as well.

At Step 1105, the mobile device 101 can obtain external port bindings on AN NAT 119 for both media and a media control channel. Although Step 1105 shows MD 101 acquiring two port bindings, a first port binding could be acquired initially for media and then a second port binding could be later acquired for a media control channel, if implemented, and also on a different port than media. Likewise, if media and media-control-channel messages are mixed within the same port, such as with IAX2, a single port binding on AN NAT 119 mapping to IP:port 303 could be acquired via STUN or similar techniques at Step 1105.

At Step 1106, MD 101 can transmit a call-control signal 307 to CN 108, where the call-control signal contains the external IP:ports on AN NAT 119 for MD 101 to receive media and media-control-channel packets. As noted previously, the transmission of the call-control signal 307 could be utilized to determine an external IP:port on AN NAT 119, by MD 101 transmitting the call-control signal from IP:port 303 to proxy server 213, where proxy server 213 can both process the call-control signal and identify the external IP:port 304 on AN NAT 119. Also at Step 1106, CN 108 receives the call-control signal 307 and begins transmitting MS 4 401 to the external IP:port 304 on AN NAT 119. MS 4 401 can be transmitted by CN 108 before CN 108 stops transmitting MS 2 110, representing a "make before break" handover. MS 4 401 can be received by MD 101 at IP:port 303 since a probing request 305 or call-control signal 307 could have previously opened and bound IP:port 304 on AN NAT 119 to IP:port 303 for MD 101 at IP 301.

At Step 1107, MD 101 begins receiving MS 4 401, and MD 101 can observe the IP:port 903 used by symmetric CN NAT 130 as the source IP:port for packets transmitted in MS 4 401. MD 101 can also begin transmitting a third media stream (MS 3 302) using IP 301, preferably using IP:port 303 as the source IP:port and IP:port 903 as the destination IP:port for packets transmitted in MS 3 302. Other destination ports could also be used as the source IP:port for the third media stream, but a change in the source port on MD 101 would require signaling and processing overhead to both (i) open and bind the ports on both AN NAT 119 and CN NAT 130 and (ii) negotiate the ports with CN 108. MD 101 can begin transmitting MS 3 302 before MD 101 stops transmitting MS 1 109, representing a "make before break" handover.

The essentially duplicate media streams (i) MS 3 302 and MS 1 109 and (ii) MS 4 401 and MS 2 109 can be received by CN 108 and MD 101, respectively, and the receipt of duplicate or redundant media streams could enhance call quality. The duplicate or redundant media may be useful for MD 101 and CN 108 to maintain audio or video quality if the quality if the network quality through the Initial Network 901 degrades while the mobile device moves away from access point 118 or into a location of reduced coverage or lower signal-to-noise ratios, such as movement away from a building where access point 118 may be located. If packets are dropped or contain errors in either of the two media streams received by MD 101 and CN 108, the nodes may compensate for the errors by combining the two media streams. In addition, "make before break" techniques for the handover are not required, and "break before make" techniques could be implemented, although "break before make" may not be preferred.

At Step 1108, the MD 101 and CN 108 may optionally establish a media control channel such as RTCP, SRTCP, or similar protocols for the two new MS 3 and MS 4. Reports on quality and other media control channel messages, such as a RTCP receiver reports, may be transmitted to MD 101 at IP:port 1001 on the AN NAT 119 that could have been (i) open and bound by a probing request in Step 1105 and (ii) communicated to CN 108 via a call-control signal 307 in Step 1106. A probing request 506 at Step 1105 could have previously established the port bindings on the AN NAT 119 between IP:port 1001 and IP:port 501. Thus, MD 101 can (i) receive media-control-channel messages for MS 3 in RTCP Stream 3 503 on IP:port 501, (ii) observe the source IP:port 1003 on symmetric CN NAT 130 for packets received in RTCP Stream 3 503, and (iii) transmit media-control-channel messages such as RTCP reports for MS 4 to IP:port 1003, which CN NAT 130 can map to IP:port 1002 on CN 108. The media control channel process illustrated in Step 1108 may be omitted, although it could be useful for MD 101 and CN 108 to monitor quality of the new media streams.

At Step 1109, the handover can be completed and MD 101 may stop transmitting MS 1, CN 108 may stop transmitting MS 2, and the associated media control channels, if implemented, may also be closed. The signaling to terminate MS 1 and MS 2 could be sent through the call-control channel illustrated in FIG. 2b, or via a call-control packet inserted in the media streams. Step 1109 may be optionally omitted, such that MS 1 and MS 2 and associated media control channels can continue for the duration of the user's media session. The signal to terminate either MS 1 or MS 2 could also be a logical signal, such that either node terminates the media stream once sufficient quality is achieved.

FIG. 12

Figure 12:
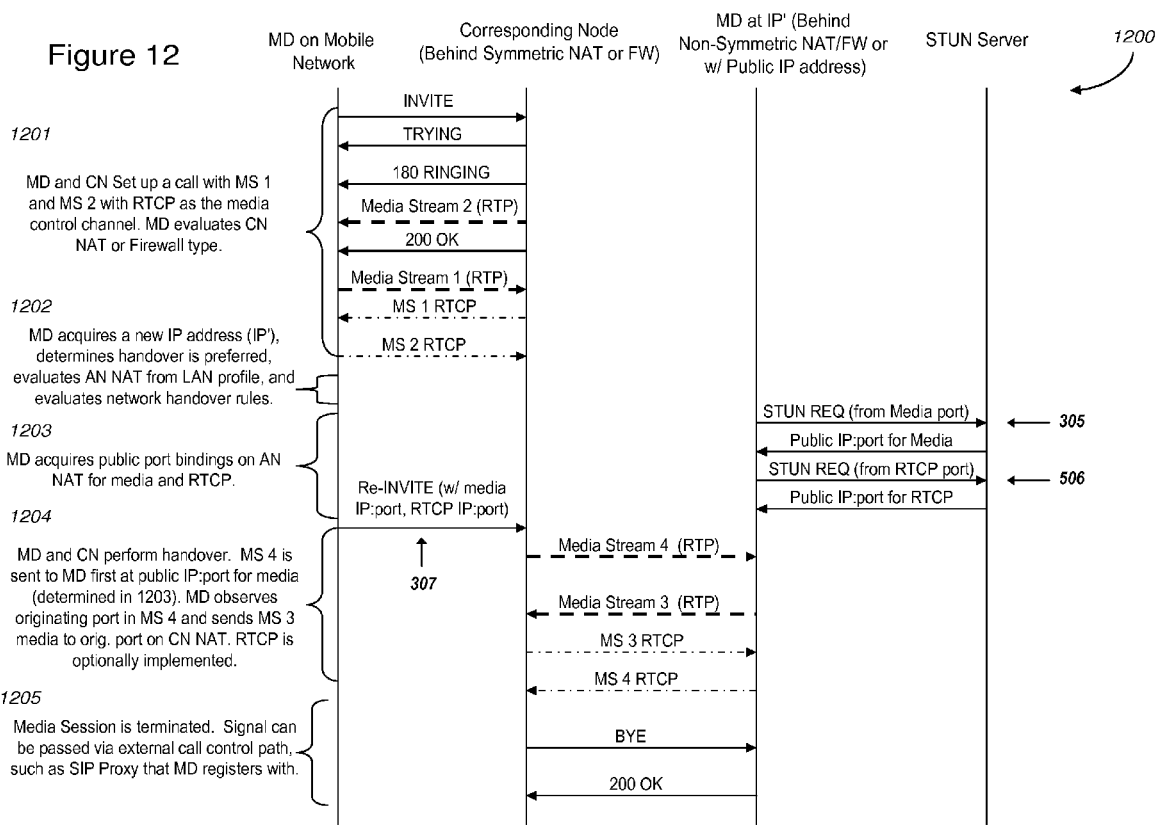
FIG. 12 is a simplified message flow diagram illustrating handover call-control messages and media flow between a mobile device and a corresponding node, where the corresponding note accesses the Internet via a symmetric NAT router or a symmetric firewall, in accordance with exemplary embodiments.

FIG. 12 is a simplified message flow diagram illustrating handover call-control messages and media flow between a mobile device and a corresponding node, where the corresponding note accesses the Internet via a symmetric NAT router or a symmetric firewall, in accordance with exemplary embodiments. In addition, although the flow diagram illustrated in FIG. 12 is for a symmetric NAT router at the corresponding node, the same flow diagram can apply if the corresponding node connects through a symmetric firewall without network address translation.

The protocol illustrated in system 1200 is according to common, current implementations of the SIP protocol, but other protocols that can establish media sessions between endpoints on the Internet could be implemented. The corresponding node may connect to the Internet via a symmetric NAT or a symmetric firewall. Further, the illustrated handover steps may be implemented if the corresponding node NAT router is not symmetric, such as if CN NAT 130 is any other type such as null, full cone, partial cone, or port-restricted cone. In this case, the handover steps may be less efficient than other methods, as measured by the time required to communicate new media streams between the mobile device and the corresponding node when the mobile device acquires Internet connectivity from an alternate network.

In Step 1201, the mobile device and corresponding node establish a media session according to methods that are well known in the art. Although media is shown as RTP in Step 1201, media could be transmitted according to other protocols. A media control channel in the form of RTCP messages can optionally be implemented in message flow 1200. At Step 1202, MD 101 acquires a second IP address and determines that handover is preferred. Alternatively, at Step 1202, MD 101 may simply determine that establishing a duplicate or redundant media session is preferred, and may later determine that handover is preferred. In Step 1202, MD 101 may access a LAN profile 224 in order to evaluate whether AN NAT 119 is of a full cone, partial cone, port-restricted cone, or symmetric type, or alternatively whether the IP address IP 301 is publicly routable, which could be identified as the null type of NAT router. In addition, MD 101 may identify the efficient handover procedures in Step 1202 by evaluating a set of network handover rules such as network handover rules 225. The remaining steps in message flow 1200 may correspond to network handover procedure "C" denoted in network handover rules 225 illustrated in FIG. 2*d*.

At Step 1203 the mobile device may transmit a probing request 305 to a server such as STUN server 306 in order to obtain port bindings on AN NAT 119. One probing request can identify an IP:port 901 mapping to IP:port 303 for receipt of a media stream. A second probing request can identify an IP:port 1001 mapping to IP:port 501 for the receipt of media-control-channel messages such as RTCP packets. The probing request 305 can alternatively be combined with a call-control signal 307, which may be transmitted from IP:port 303, for example, and a server such as proxy 213 can observe IP:port 901 and subsequently communicate IP:port 901 in a call-control signal 307 that is passed to CN 108.

In Step 1204, MD 101 can transmit a call-control signal 307 to CN 108, and call-control signal 307 may contain the IP:port 901 that CN 108 may then use as the destination IP:port in MS 4 401. The call-control signal 307 may alternatively be sent as a packet or message within MS 1 or RTCP Stream 2. MD 101 may also send a call-control signal to CN 108 to indicate that handover is requested through a SIP Re-INVITE message via the call-control channel illustrated in FIG. 2*b*. Upon receipt of call-control signal 307, CN 108 can begin transmitting MS 4 401 to the mobile device, preferably to the IP:port 901 referenced in call-control signal 307. Note that AN NAT 119 may not be present, or network address translation functionality on AN NAT 119 may not be utilized but AN NAT 119 may perform firewall functions such as a symmetric firewall and in that case IP:port 901 and IP:port 303 could be the same.

MD 101 may monitor IP:port 303 for the receipt of MS 4, preferably while continuing to receive MS 2 on IP:port 114 as illustrated in FIG. 9. In Step 1204, MD 101 can also begin transmitting MS 3 302 from IP:port 303 to IP:port 903 on CN NAT 130. The proper port for the destination IP:port for packets transmitted by MD 101 in MS 3 302 can be determined by MD 101 observing the source IP:port for packets received in MS 4 401. MD 101 may wait until MS 4 401 is received before transmitting MS 3 302. Other destination ports for MS 3 302, besides the source IP:port for packets received in MS 4 401, could be used, which would likely require additional signaling between MD 101 and CN 108, and subsequently require additional time in order to perform a handover given that CN NAT 130 may be symmetric.

Also at Step 1204, a media control protocol such as RTCP may be implemented, and in this case CN 108 may send one or more media-control-channel packets such as RTCP stream 3 503 to IP:port 1001. The proper IP:port 1001 can could be communicated to CN 108 via a call-control signal 307 or 307*a*. The IP:port 1001 could be evaluated by MD 101 by the "STUN REQ (from RTCP port)" message or packet illustrated in message flow 1200, which may also be equivalent to the probing packet 305 illustrated in system 300.

AN NAT 119 can forward media-control-channel packets from IP:port 1001 to IP:port 501 in order to be processed by MD 101 and provide feedback on the quality of MS 3 302 received by CN 108. MD 101 can also transmit media-control-channel packets such as RTCP reports in RTCP Stream 4 504 to IP:port 1003, which could be the port MD 101 observes as the source IP:port for packets received in RTCP stream 3 503. CN NAT 130 can forward packets from IP:port 1003 to IP:port 1002. Thus, CN 108 can implement the same IP:port 1002 for the transmission and receipt of media-control-channel packets, and MD 101 can implement the same IP:port 501 for the transmission and receipt of media-control-channel packets.

In Step 1205, after the handover can be completed and the users can finish the media session, the MD 101 may terminate the call and end MS 3 and MS 4, via standard methods such as a "BYE" with SIP or similar messages in related protocols. Although not illustrated in message flow 1200, a separate call-control message could be implemented to terminate MS 1 109 and MS 2 110, and corresponding media control channels, before terminating MS 3 and MS 4.

FIG. 13

Figure 13:
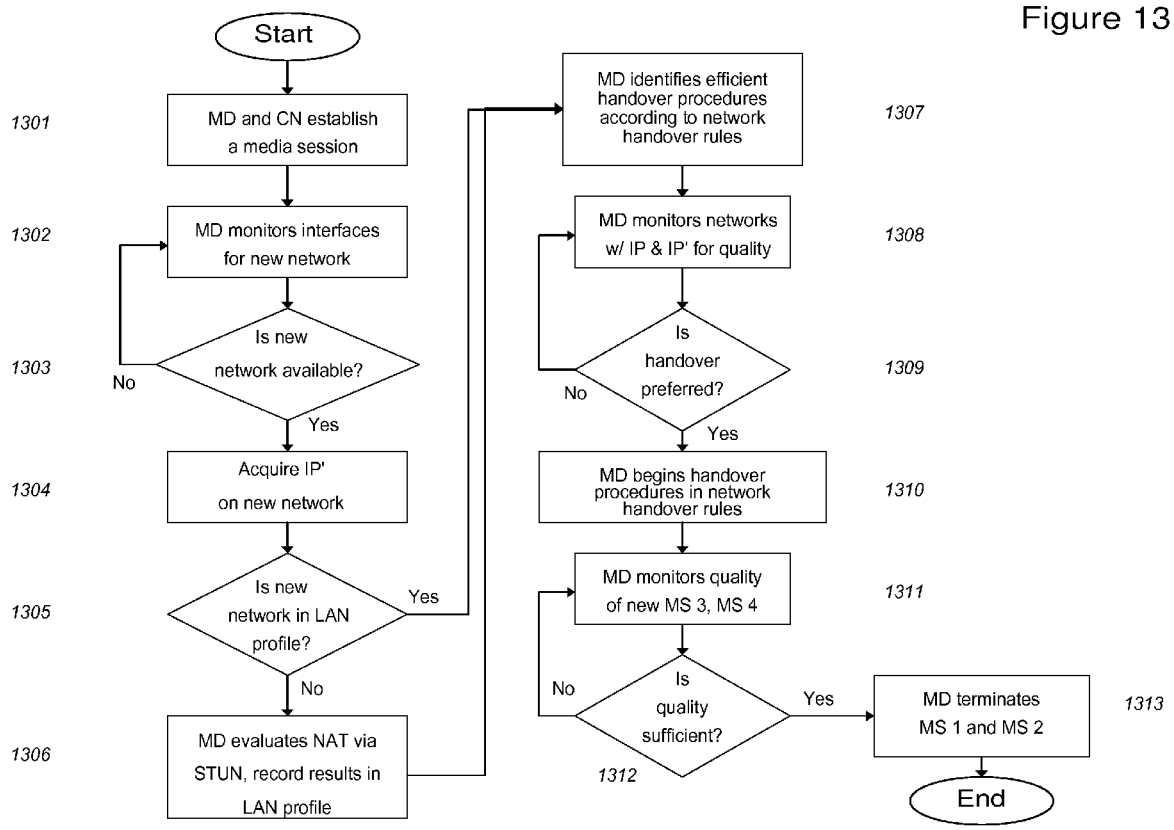
FIG. 13 is a flowchart illustrating exemplary steps for a mobile device to perform handover between heterogeneous data networks, in accordance with exemplary embodiments.

FIG. 13 is a flowchart illustrating exemplary steps for a mobile device to perform handover between heterogeneous data networks, in accordance with exemplary embodiments. The data networks may provide access to the public Internet. Although the steps illustrated in FIG. 13 describe a mobile device as performing actions, the logic and decisions could be performed by (i) software operating within a mobile device, (ii) software operating within a mobile device in conjunction with software operating on remote computers, or (iii) software and/or firmware operating within a mobile device and/or remote computers, among many other examples.

At Step 1301, MD 101 establishes a media session such as a voice call with a corresponding node 108. The media session may consist of a first media stream MS 1 from a MD 101 to a CN 108, and a second media stream MS 2 from a CN 108 to a MD 101, routed through an initial network which could be a WiMax or LTE WAN, as examples. A media-control channel in the form of RTCP streams could optionally be implemented. Either MD 101 or CN 108, or both, could be connected to the Public Internet via NAT routers or firewalls (that may or may not have NAT functionality). During the establishment of the media session in Step 1301, MD 101 can identify the presence and type of NAT that may connect the CN 108 to the Internet. In addition, MD 101 could identify the presence and type of NAT or firewall for CN 108 from a server on the Internet or querying CN 108 through a call-control channel as illustrated in FIG. 2b, among other options. Either MD 101 or CN 108, or both MD 101 and CN 108, may store information pertaining to the type of NAT or firewall as an entry within a LAN profile 224.

At Step 1302, MD 101 monitors the physical interfaces for the presence of additional networks, as the MD 101 is mobile and may move after the media session has been established at Step 1301. In addition, an alternate network 117 may become available without mobile-device movement. At Step 1303, MD 101 evaluates whether additional networks are available, such as by determining whether a service set identifier (SSID) can be accessed by MD 101 (perhaps involving determining whether MD 101 is authorized to use the WLAN or WAN).

If an additional network is not available, MD 101 may continue to monitor the physical interfaces for the presence of additional networks. If an additional network is available and MD 101 is authorized to communicate via that additional network, MD 101 may acquire a new IP address, such as IP 301, on the additional network in Step 1304. MD 101 may complete a network authentication and authorization process as part of Step 1304. The new network can be an alternate network 117 as illustrated in system 100. The media session with the corresponding node established in Step 1301 can continue through the initial network, such as between the mobile network 102 and CN 108 in system 100.

At Step 1305, MD 101 can access a LAN profile 224 which may contain information about the presence and type of NAT or firewall that may connect AN 117 to the Internet. The LAN profile 224 could be stored in memory on MD 101 or downloaded from a server or other host on the Internet or within the mobile network 102 or other locations. The LAN profile 224 could include information from networks that MD 101 had previously visited, such as the user's home, office location, or coffee shop or other retail location that provides WiFi Internet access, as examples. The LAN profile 224 could include information about wireless WANs as well such as another mobile operator's network, in addition to WLANs. A benefit of a LAN profile 224 is that determining the presence and type of NAT or firewall may be time consuming, perhaps involving following the steps in the IETF RFC 3489 to evaluate the presence and type of NATs or firewalls, also referred to as STUN.

If MD 101 is moving rapidly and/or the wireless network quality is changing rapidly, then efficient and rapid handover techniques may be preferred by MD 101 accessing a LAN profile 224 in order to speed a handover process and minimize the potential for gaps or distortion of audio or video. If no NAT or firewall is present, the LAN profile can note that the AN 117 provides a publicly routable and open IP address. The LAN profile 224 could also provide information that AN 117 connects to the internet via a full cone, partial cone, port-restricted cone, or symmetric NAT router, or that AN 117 has a firewall without network address translation, such as a symmetric firewall.

The LAN profile 224 could address other identifiers of NAT types as well, such as UPnP, groupings of the above listed categories, or future types of NATs that become identified in commercial use. Further, the LAN profile 224 could have information pertaining to the types of media that are allowed to pass through the network, such as UDP or TCP, as well as information on ports that may be opened or blocked. And the LAN profile 224 may contain one or more other pieces of information instead of or in addition to those listed herein, without departing from the scope and spirit of the present invention.

MD 101 can determine whether AN 117 is present in LAN profile 224 through matching identifiers of AN 117 such as an SSID, MAC address, or network codes broadcast by WAN base stations, to individual records in the LAN profile. MD 101 could also query a server through the initial network or MN 102 for information that pertains to AN 117, and in this case an entry in a LAN profile 224 representing AN NAT 119 could be stored on a remote server or in a database, as examples. The information pertaining to AN NAT 119 could be included in a response to the query transmitted by MD 101. If a match is found for AN 117 within a LAN profile 224, MD 101 can proceed to Step 1307. Although Step 1305 is illustrated as performed after Step 1304, Step 1305 could be performed before 1304 or concurrently with Step 1304. In general, the ordering of steps in this and other flowcharts, message flows, and other figures and descriptions herein is for purposes of illustration and not limitation, and some steps may be able to be carried out in different orders than those depicted and/or described, without departing from the invention.

If a match is not found for AN 117 within LAN profile 224, MD 101 can evaluate the presence and type of NAT or firewall in Step 1306. MD 101 could utilize techniques such as STUN in IETF RFC 3489 or similar methods in order to evaluate the presence or type of NAT or firewall. A LAN profile 224 could also be updated with the results from MD 101 evaluating AN 117 for the presence and type of NAT or firewall.

In Step 1307, MD 101 can identify a preferred (e.g. efficient) handover procedure, given the presence and type of NATs or firewalls associated with AN 117 and a corresponding node 108, such as AN NAT 119 and CN NAT 130, respectively. The identification of the efficient handover procedure could be made using a set of network handover rules such as network handover rules 225, as illustrated in FIG. 2d, though other network handover rules could be used as well. Network handover rules 225 illustrate that selection of a handover procedure may be conducted based upon the types of NATs or firewalls that may be associated with and alternate (i.e. target) network and/or a corresponding node. The network handover rules 225 could be stored in memory within MD 101 or logically programmed within a software or firmware routine operating on MD 101 to manage handover between heterogeneous data networks, among other options. Based upon the presence and type of NATs or firewalls, MD 101 can select a preferred handover procedure in Step 1307.

At Step 1308, MD 101 can monitor the initial network and the alternate network for quality of the data connections. Although shown as starting after Step 1307, MD 101 could begin evaluating some quality parameters for the network providing IP 301 before Step 1308, perhaps as soon as the network is observed on the physical interface at Step 1303. By evaluating network quality at 1303, IP network-level parameters for monitoring quality, such as packet loss, may not be available, but physical and/or data-link level parameters for quality could be available, such as received signal-to-noise ratios or bit errors observed in a carrier transmitted by the AN 117, as examples. In addition, MD 101 can continuously monitor the quality of the initial network providing IP 103 even before the media session with a CN was initially established at Step 1301. Also at Step 1308, MD 101 can record network performance values into memory and also extrapolate trends in performance into the future for network quality on two or more networks, such as predicting performance over the next 10 seconds. Although two networks, corresponding to IP and IP', are illustrated as compared in Step 1308, MD 101 could concurrently monitor more than two networks.

At Step 1309, MD 101 can evaluate whether handover is preferred. Instead or in addition, MD 101 can determine that establishing a second media session is desirable, by routing a duplicate or redundant media stream through the alternate network 117, and MD 101 may later determine handover is preferred, such as at the point when MS 1 or MS 2 are terminated. At Step 1309, the mobile network 102, other servers or software processes, or CN 108 could also assist MD 101 in the determination that handover is preferred, such as issuing handover commands from mobile network similar to handover in traditional GSM 2G or 3G and similar networks. If (i) handover is not preferred or (ii) establishing a duplicate or redundant media stream is not desirable, for reasons such as power management or other reasons, MD 101 can continue monitoring the available networks for quality in Step 1308.

At Step 1310, MD 101 can begin handover procedures. The handover procedure(s) used by MD 101 can be the one(s) selected according to the network handover rules 225 at Step 1307. For example, MD 101 could have selected handover procedure C if MD 101 determined that AN NAT 119 is a partial cone NAT and that CN NAT 130 is a symmetric NAT; other handover procedure(s) could be selected as well, depending on the presence and types of NATs or firewalls associated with the alternate network and/or the corresponding node. Alternatively, network handover rules 225 could be bypassed, and the same handover technique could be implemented in all cases, such as always using a relay for handover, although bypassing network handover rules 225 may be less efficient.

In addition, if MD 101 communicates with multiple corresponding nodes 108 concurrently, such as with a three-way call or conference call, MD 101 could use a different handover procedure for each CN 108 at Step 1310 according to the type of NAT or firewall associated with each corresponding node. An objective of starting the handover procedure(s) in Step 1310 can be to establish new media streams, MS 3 and MS 4 and associated media-control channels, with each corresponding node 108.

At Step 1311, MD 101 can monitor the quality of new media streams MS 3 and MS 4 that were established in Step 1310. Monitoring could be performed through measurements such as bit errors, packet loss, jitter, or other performance parameters. MS 4 can be monitored by MD 101 by directly observing the quality of media received. MS 3 can be monitored by MD 101 through the receipt of media-control-channel messages such as RTCP receiver reports, IAX2 RR LOSS, or similar messages that provide feedback to MD 101 regarding the quality of media received by a corresponding node 108. If MD 101 communicates with multiple corresponding nodes 108, such as with a conference call, the quality of each media session associated with each CN 108 can be monitored independently in Step 1311.

At Step 1312, MD 101 can evaluate whether the quality of the new media streams via the alternate network is sufficient. Many methods are available to MD 101 in order to make the evaluation. MD 101 could determine whether the quality of MS 3 and MS 4 exceed preset thresholds, such as a calculated or estimated mean opinion score (MOS) of 3.75, as an example. A media control channel or other feedback mechanism to MD 101 may be required for MD 101 to evaluate the quality of MS 3 as received at a CN 108. MD 101 could also compare the quality of MS 3 to MS 1 and MS 4 to MS 2, and evaluate whether the quality is sufficiently superior for the new media streams.

Alternatively (and not illustrated in FIG. 13), MD 101 could bypass an evaluation of the quality of the new media streams and simply leave all media streams MS 1 through MS 4 open for the remaining duration of the call. MD 101 could also evaluate the quality of MS 3 and MS 4 independently in Step 1312, such that the quality of MS 4 can be deemed to be sufficient, while the quality of MS 3 can be deemed not sufficient. Further, if MD 101 participates in a multi-party call with multiple corresponding nodes 108, the quality of each media session and each media stream between MD 101 and each CN 108 could be evaluated independently. If the quality of a media stream is not deemed to be sufficient at Step 1312, MD 101 can continue monitoring quality at Step 1311.

In addition (and again not illustrated in FIG. 13), MD 101 could also take proactive steps in order to increase quality after Step 1312 if the quality is not sufficient, such as increasing channel coding of the media or switching to an alternate codec for media transmitted in a media stream such as MS 3. In order to increase the quality of media received, such as MS 4, at Step 1312, MD 101 could send a call-control signal to a CN 108 requesting CN 108 make adjustments to transmitted media, such as implementing forward error correction or changing the codec. And many other possibilities exist as well, as these are merely examples.

Once MD 101 can evaluate the quality of media to be sufficient for new media streams MS 3 and MS 4 in Step 1312, MD 101 can stop the transmission of MS 1 and MS 2 and any associated media control channels in Step 1313. The decision to stop MS 1 and MS 2 could be made by MD 101 independently, such that MS 1 is terminated while MS 2 continues, which could be the case if MS 3 is sufficient quality, but MS 4 has not achieved sufficient quality. MD 101 may not be able to terminate MS 2 directly, but could transmit a call-control signal to CN 108 for CN 108 to terminate MS 2. Further, if MD 101 participates in a multi-party call with multiple corresponding nodes 108, the decision to terminate each media session corresponding to each CN 108 can be made independently, such that MS 1 and MS 2 continue with one CN 108, while the media streams with a second CN 108 at the MD 101's initial network on IP 103 are terminated.

FIG. 14

Figure 14:
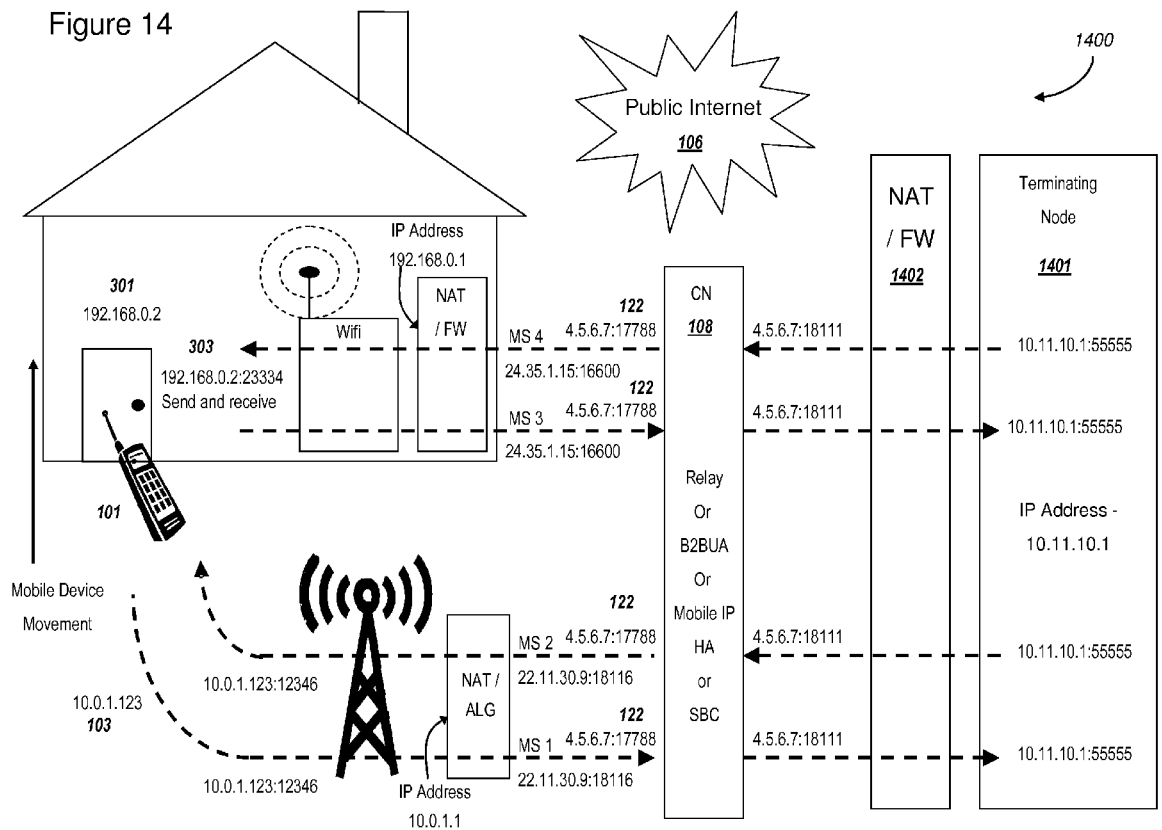
FIG. 14 is a graphical illustration of an exemplary system, where a corresponding node performs as a relay to a terminating node, in accordance with exemplary embodiments.

FIG. 14 is a graphical illustration of an exemplary system, where a corresponding node performs as a relay to a terminating node, in accordance with exemplary embodiments. One principle of media communications across the Internet is the transmission of media directly between endpoints may be generally preferred. Direct communication can both reduce delay and also avoid the cost of routing packets through an intermediate server, such as a Back-to-Back User Agent (B2BUA) in the SIP protocol, a home agent (HA) within the Mobile IP specification (IETF RFC 3344 and related standards), a relay for the traversal of communication between endpoints behind NATs, or a session border controller, among other examples. In addition, direct communication between nodes may improve quality by reducing the probability of lost packets by decreasing the total number of router hops a packet may traverse between endpoints.

However, in some cases, the direct routing of packets between endpoints may not be available, such as if both nodes connect to the public Internet 106 via symmetric NATs. If packets between a mobile device and a terminating node are routed through an intermediate server, the server may also function as a corresponding node for the mobile device. In this example case of the corresponding node bridging the communication between a mobile device and a terminating node, the encoding and decoding of media may not take place on the corresponding node, in order to reduce processing load on the corresponding node as well as preserve media quality, since multiple encodings and decodings of media can degrade quality. An intermediate server functioning as a corresponding node could also implement the techniques described in the present invention in order to both expedite and simplify the handover process.

In system 1400, CN 108 operates as an intermediate server between MD 101 and a terminating node (TN) 1401. CN 108 could be a device that communicates with both MD 101 and TN 1401, such as a Mobile IP Home Agent, SIP B2BUA, a session border controller such as a NET-NET server manufactured by Acme Packet, or a relay, as examples. CN 108 may preferably have a publicly routable IP address and may preferably not be connected to the Internet via a NAT router. TN 1401 can be another mobile device, a personal computer operating a software program, or similar endpoint for the receipt and transmission of media across the Internet. TN 1401 may have a private IP address and connect to the Internet via a NAT router 1402.

MD 101 can establish a media session with CN 108 by transmitting MS 1 and receiving MS 2. Communication between MD 101 and TN 1401 is obtained by CN 108 re-routing MS 1 to TN 1401 and also re-routing media from TN 1401 to MS 2. MD 101 could have previously handed over MS 1 and MS 2 to CN 108 in preparation for a second handover to IP 301. When MD 101 determines that communication with CN 108 is preferred via IP 301, or that a duplicate or redundant media session is desirable, MD 101 can initiate a handover. The handover can begin by MD 101 transmitting MS 3 to the same IP address and port implemented at the corresponding node for the receipt of MS 1, illustrated as IP:port 122. MS 3 and MS 1 may preferably represent duplicate copies of the media, according to a "make before break" handover. The copies of the media do not have to be identical, as explained herein.

Upon receipt of essentially-duplicate media at IP:port 122, CN 108 may begin transmission of MS 4 without previously requiring a call-control message to be processed. A signal that MD 101 is performing handover can be communicated to CN 108 by, as examples, (i) the receipt of MS 3 at IP:port 122, (ii) a call-control message via a call-control channel, (iii) a packet inserted within MS 1, or (iv) a change in the UDP checksums for packets within MS 1, which would otherwise normally be disabled since mobile codecs are designed to be bit error robust. If the signal for handover consists of the transmission of MS 3, CN 108 can observe the new IP address and port number as the source IP and port for packets received in MS 3, and implement the source IP and port in MS 3 as the destination IP and port for packets transmitted in MS 4.

Media packets do not have to be transmitted by UDP, and other transport protocols, such as TCP, could be used as well. UDP checksums on media packets may optionally be disabled, since mobile-device codecs are generally designed to be bit error robust, and a single bit error could result in an incorrect checksum, which could result in the entire frame within a packet being dropped if UDP checksums are enabled and implemented by a software UDP stack operating on either MD 101 or CN 108. CN 108 can transmit both MS 2 and MS 4 concurrently, also representing a "make before break" handover. MD 101 can monitor both IP 103 and IP 301 for the receipt of MS 2 and MS 4, respectively. A separate call-control message confirming handover can be processed by CN 108 after the transmission of MS 4 begins. The call-control message may need to traverse a call-control channel via a series of proxy servers such as that illustrated in FIG. 2b. By transmitting MS 4 before a call-control message is separately received at CN 108, the time required to implement handover of media can be reduced.

In FIG. 14, CN 108 may not need to make any changes in the communication with TN 1401 as MD 101 performs the handover. The duplicate media streams MS 1 and MS 3 can be filtered into a single media stream. In addition, CN 108 can perform the action of bi-casting a single media stream received from TN 1401 to the two addresses IP 103 and IP 301. Consequently, TN 1401 need not be aware of the handover by MD 101.

FIG. 15

FIG. 15 is a flowchart illustrating exemplary steps for a software routine to monitor a trend in the quality of network connections, and to determine that a handover is preferred, in accordance with exemplary embodiments. In Step 1501, MD 101 can begin monitoring AN 117, such as when a new network is initially observed through a physical interface 201. In Step 1502, MD 101 measures the quality of the network providing services for IP 103, such as measuring signal-to-noise ratios, bit errors, packet loss, or delay, and MD 101 could record the measurement in memory to keep a trend of the data over time for subsequent analysis.

Similarly, MD 101 can measure the quality of the network providing services for IP 301 in Step 1503 and also update memory with the new measurement. The measurements in 1502 and 1503 could also include evaluations of other network characteristics, such as the total bandwidth available. At Step 1504, MD 101 can extrapolate trends in performance into the future for network quality on the two networks, such as predicting performance over the next 10 seconds, as one example. The extrapolation could be performed using linear regression or another regression technique that best suits the data, such as an exponential regression for example. In addition, the sequence of steps 1502, 1503, and 1504 could be in a different order.

In Step 1505, a software routine compares the predicted network performance in the future, using the extrapolated trends from Step 1504. The example timeframe for evaluation is 5 seconds in the future in FIG. 15, although other timeframes could be used. The timeframe in the future could also be dynamically determined based upon the rate of change in repeated measurements in Step 1502 and Step 1503. For example, if the network quality is observed as rapidly changing then the timeframe to compare the two connections in the future could be smaller, such as comparing the two networks 2 seconds into the future. If the network quality is observed as being more stable, then the timeframe to compare the two connections in the future could be larger, such as comparing the two networks 15 seconds into the future.

At Step 1505, if the software routine determines that the network providing services via IP 103 is preferred, no handover request is made and the network monitoring returns to Step 1502 and may continue. If the software routine determines that the network providing IP 301 will be preferred in the future, such as within the next five seconds, MD 101 can begin preparing for handover. In Step 1506, MD 101 may obtain a current external port binding on AN NAT 119 via a probing request 305, for example, since the UDP port bindings may not have been opened or may have expired. Thus, the routine monitoring the performance of network connections could be coupled to the routine managing handover procedures. Also in Step 1506, MD 101 could initiate handover by transmitting a SIP Re-Invite, a similar call-control signal 307, or a non-media packet within MS 1 that contains call-control information, or simply begin transmitting MS 3 to signal handover to CN 108. And other possibilities exist as well for indicating initiation of handover.

Also at Step 1506, MD 101 may (i) increase the frequency of media control channel messages and (ii) request that CN 108 increase the frequency of media control channel messages. A benefit of increasing the frequency of media control messages is that the quality of media streams during handover may more carefully be monitored. For example, MD 101 and CN 108 may transmit RTCP or SRTCP receiver reports at an interval of every 10 seconds in RTCP Stream 1 111 and RTCP Stream 2 112 during a call. If MD 101 determines that handover is preferred, MD 101 or another software routine could increase the frequency of media control messages to an interval of every 2 seconds, for example. Increased frequency can allow MD 101 and CN 108 to (i) more quickly determine whether the handover is successful, and (ii) take proactive steps to improve the handover by increasing channel coding, power levels, or similar adjustments. After handover is deemed successful, the frequency of media control channel messages could be reduced.

The software routine illustrated in FIG. 15 could also be implemented in hardware, or some steps operated by a remote server separate from MD 101, with appropriate signaling between MD 101 and the remote server. The steps outlined in FIG. 15 could also be applied when a mobile device has three or more available networks, where each of the networks is measured and then compared, and a preferred handover in the future may also be predicted between the multiple different available networks.

Conclusion

Various exemplary embodiments have been described above. Those skilled in the art will understand, however, that changes and modifications may be made to those examples without departing from the scope of the claims.

What is claimed is:

1. A method for a mobile device to conduct a handover of an active media session, the method comprising the mobile device:
    engaging in a media session, wherein engaging in the media session initially comprises (a) transmitting a first media stream from a first Internet Protocol (IP) address and a first port to an IP address and port associated with a corresponding node and (b) receiving a second media stream at the first IP address from the corresponding node;
    acquiring a second IP address;
    identifying a third IP address and a second port on an external interface of a first network address translation (NAT) router, wherein packets received at the third IP address and the third port are routed to the second IP address and a third port;
    determining a first NAT-router type for a second NAT router associated with the corresponding node comprises one of non-symmetric NAT router and a symmetric NAT router;
    selecting one of a (i) first handover procedure wherein the first NAT-router type comprises a non-symmetric NAT router and (ii) a second handover procedure wherein the first NAT-router type comprises a symmetric NAT router, wherein the first handover procedure specifies a third media stream sent from the second IP address includes a destination port number the same as a source port number in the second media stream, and wherein the second handover procedure specifies (a) the corresponding node sends a fourth media before the mobile device sends the third media stream and (b) the fourth media stream includes a destination port the same as the second port; and
    determining that a handover of the media session from the first IP address to the second IP address is preferred, wherein, after the handover, engaging in the media session comprises (a) transmitting a third media stream from the second IP address and the second port to the IP address associated with the corresponding node and (b) receiving a fourth media stream at the second IP address and the third port from the corresponding node.

2. The system of claim 1, wherein, before the mobile device starts transmitting the first media stream, the corresponding node determines the second NAT router associated with the corresponding node comprises one of (i) the symmetric NAT router and (ii) the non-symmetric NAT router.

3. The method of claim 1, wherein the mobile device transmits a call-control signal to the corresponding node, wherein the call-control signal contains the third IP address and the second port.

4. The method of claim 1, wherein the non-symmetric NAT-router comprises one of a null, full cone, partial cone, and a port-restricted cone, NAT router, and wherein a null NAT router comprises using a public IP address, and wherein a port-restricted cone NAT router comprises an address-restricted cone NAT router.

5. The method of claim 1, wherein the IP address and port associated with the corresponding node is an IP address and port assigned to a second NAT router associated with the corresponding node, and wherein the second NAT router forwards packets received on the IP address and port associated with the corresponding node to the corresponding node.

6. The method of claim 5 further comprising identifying a fourth port on the external interface of the first network address translation (NAT) router, wherein the corresponding node sends a media-control packet to the fourth port.

7. The method of claim 1, wherein the media streams comprise packets containing media formatted according to a codec, and wherein the packets contain IP headers.

8. The method of claim 7, wherein the IP headers are compressed.

9. The method of claim 1, wherein the corresponding node receives the first and third media streams on the same IP address and port.

10. The method of claim 1, wherein the corresponding node transmits the fourth media stream and a media-control packet to the third IP address and the second port.

11. The method of claim 1, wherein the source IP address and the source port for packets in the fourth media stream as received at the mobile device is the IP address and port associated with the corresponding node.

12. The method of claim 1, wherein the corresponding node begins transmitting the fourth media stream before the corresponding node stops transmitting the second media stream.

13. The method of claim 1, wherein the mobile device begins transmitting the third media stream before the mobile device stops transmitting the first media stream.

14. The method of claim 1, wherein at least one of the mobile device and the corresponding node transmit a media-control packet to the other.

15. The method of claim 14, wherein the mobile device transmits and receives a media-control packet on one media-control port at the second IP address.

16. The method of claim 14, wherein at least one media-control packet is a non-media packet transmitted within the media streams.

17. The method of claim 1, wherein at least one of the first NAT router and the second NAT router covert a packet between an IP version 4 (Ipv4) address and an IP version 6 (Ipv6) address.

18. The method of claim 1, wherein the mobile device uses a local area network (LAN) profile to select the first handover procedure, wherein the mobile device records a second NAT-router type in the LAN profile before engaging in the media session, and wherein the mobile device identifies the second NAT-router type before acquiring the second IP address during the media session.

19. A method for a mobile device to conduct a handover of an active media session, the method comprising the mobile device:
engaging in a media session, wherein engaging in the media session initially comprises (a) transmitting a first media stream from a first Internet Protocol (IP) address and a first port to an IP address and port associated with a corresponding node and (b) receiving a second media stream at the first IP address from the corresponding node;
acquiring a second IP address;
using a local area network (LAN) profile to identify a network address translation (NAT)-router type of a NAT router associated with the second IP address, wherein the mobile device records the NAT-router type in the LAN profile before engaging in the media session, and wherein the mobile device identifies the NAT-router type before acquiring the second IP address during the media session;
using a set of network handover rules to select a handover procedure based at least in part on the identified NAT-router type, wherein the set of network handover rules specifies various handover procedures corresponding with various NAT-router types including the identified NAT-router type; and
determining that a handover of the media session from the first IP address to the second IP address is preferred, and responsively conducting the handover according to the selected handover procedure, wherein, as a result of conducting the handover, engaging in the media session comprises (a) transmitting a third media stream from the second IP address to the IP address associated with the corresponding node and (b) receiving a fourth media stream at the second IP address from the corresponding node.

20. The method of claim 18, wherein the identified NAT-router type is a NAT-router type selected from the group consisting of null, full cone, partial cone, port-restricted cone, and symmetric, wherein a null NAT-router type comprises using a public IP address, and wherein a port-restricted cone comprises an address-restricted cone.

21. The method of claim 18, wherein the media session is managed by a communications service, and wherein a user gains access to the communications service by accepting a user agreement.

22. The method of claim 18, wherein a media control channel provides feedback to the mobile device on the quality of media received by the corresponding node, and wherein the mobile device uses the same port number at the second IP address to send and receive data for the media control channel.

23. The method of claim 18, further comprising identifying a third IP address and a third port on an external interface of the NAT router associated with the second IP address, and wherein packets received at the third IP address and the third port are routed to the second IP address and the second port.

24. The method of claim 23, further comprising the mobile device transmitting a call-control signal to the corresponding node, wherein the call-control signal contains the third IP address and the third port, and wherein the corresponding node begins transmitting the fourth media stream after receiving the call-control signal.

25. The method of claim 24, wherein the call-control signal comprises at least one packet inserted within at least one of the first media stream and a media control channel.

26. The method of claim 24, wherein the mobile device begins transmitting the third media stream before transmitting the call control signal.

27. The method of claim 18, wherein the corresponding node transmits the fourth media stream to a source IP address and a source port for a packet received in the third media stream.

28. The method of claim 18, wherein the corresponding node routes packets through a second NAT router, and wherein the corresponding node receives the first media stream and the third media stream on the same IP address and the same port, and wherein packets transmitted to the IP address and port associated with the corresponding node route to the external interface of the second NAT router.

29. The method of claim 18, wherein the mobile device transmits the first media stream and receives the second media stream on the same IP address and the same port.

30. The method of claim 18, wherein the corresponding node begins transmitting the fourth media stream before the corresponding node stops transmitting the second media stream.

31. The method of claim 18, wherein the mobile device begins transmitting the third media stream before the mobile device stops transmitting the first media stream.

32. The method of claim 18, wherein the source IP address and the source port for packets received in the fourth media stream by the mobile device is the IP address and the port associated with the corresponding node.

33. The method of claim 18, wherein the mobile device monitors both (i) the first IP address and the first port for receiving the second media stream and (ii) the second IP address for receiving the fourth media stream.

34. The method of claim 18, wherein the mobile device determining that the handover of the media session from the first IP address to the second IP address is preferred comprises the mobile device measuring and comparing a quality of the network at the first IP address and a quality of the network at the second IP address.

35. The method of claim 18, wherein the NAT router coverts a packet between an IP version 4 (Ipv4) address and an IP version 6 (Ipv6) address.

36. A method for handover of an active media session, the method comprising in combination:
transmitting a first media stream from a mobile device from a first Internet Protocol (IP) address to an IP address associated with a corresponding node, wherein the mobile device receives a second media stream from the corresponding node;

acquiring a second IP address associated with the mobile device;

determining both (i) a first network address translation (NAT)-router type of a NAT router associated with the corresponding node and (ii) a second NAT-router type of a NAT router associated with an alternate network;

using a set of network handover rules to select a handover procedure based at least in part on both the first and second determined NAT-router types, wherein the set of network handover rules specifies various handover procedures corresponding with various sets of one or more NAT-router types including the at least one determined NAT-router type; and determining that a handover of the media session from the first IP address to the second IP address is preferred, and responsively conducting the handover according to the selected handover procedure, wherein conducting the handover comprises (a) transmitting a call-control signal from the mobile device to the corresponding node, wherein the mobile device begins receiving a fourth media stream transmitted by the corresponding node after transmitting the call-control signal and (b) transmitting a third media stream from the mobile device via the second IP address to a source port in the fourth media stream.

37. The method of claim 36, wherein at least one determined NAT-router type is a NAT-router type selected from the group consisting of null, full cone, partial cone, port-restricted cone, and symmetric, and wherein a null NAT-router type comprises using a public IP address, and wherein a port-restricted cone comprises an address-restricted cone.

38. The method of claim 36, further comprising using a local area network (LAN) profile to identify the second NAT-router type wherein the mobile device records the NAT-router type in the LAN profile before engaging in the media session.

39. The method of claim 36, wherein the mobile device transmits both the first and third media streams to the IP address and a port associated with the corresponding node.

40. The method of claim 36, further comprising identifying a third IP address and an external port on an external interface of the NAT router associated with the alternate network, wherein packets received at the third IP address and external port are routed to the second IP address.

41. The method of claim 40, wherein the call-control signal contains the third IP address and the external port.

42. The method of claim 36, wherein the mobile device uses one port to transmits the third media stream and receive the fourth media stream.

43. The method of claim 36, wherein at least one of the first NAT router and the second NAT router coverts a packet between an IP version 4 (Ipv4) address and an IP version 6 (Ipv6) address.

44. The method of claim 36, wherein determining that the handover of the media session from the first IP address to the second IP address is preferred comprises the mobile device measuring and comparing a quality of the network at the first IP address and a quality of the network at the second IP address.

45. The method of claim 36, wherein the corresponding node identifies a source IP address and a source port for packets in the third media stream as received at the corresponding node, and wherein the corresponding node transmits the fourth media stream to the identified source IP address and source port.

46. The method of claim 36, wherein the mobile device receives the fourth media stream at the second IP address and a port utilized to transmit the third media stream.

47. The method of claim 36, wherein the corresponding node begins transmitting the fourth media stream before the corresponding node stops transmitting the second media stream.

48. The method of claim 36, wherein the mobile device begins transmitting the third media stream before the mobile device stops transmitting the first media stream.

49. The system of claim 36, wherein the mobile device monitors both (i) the first IP address for receiving the second media stream and (ii) the second IP address and the associated port for receiving the fourth media stream.

50. The method of claim 36, wherein at least one of the mobile device and the corresponding node transmit a first media control packet using a media control port, wherein a second media control packet is received on the media control port.

51. The system of claim 50, wherein the media control packet is a non-media packet within a media stream.

52. The method of claim 36, wherein the corresponding node is a relay for communication with a terminating node.

53. The method of claim 36, wherein each of the media streams comprises a separate series of packets, wherein each such series of packets contains a separate set of digitized media, wherein each such set of digitized media comprises at least one of voice and video, and wherein each such series of packets is routed through a public Internet and contains a header including a packet source IP address, a packet source port number, a packet destination IP address, and a packet destination port number.

54. A method for handover of an active media session, the method comprising:

transmitting a first media stream from a mobile device via a first Internet Protocol (IP) address and a first port to an IP address and a port associated with a corresponding node, wherein the mobile device receives a second media stream from the corresponding node;

acquiring a second IP address associated with the mobile device, wherein the mobile device transmits a third media stream from the second IP address and a second port to the IP address and the port associated with the corresponding node, and wherein the third media stream starts before the first media stream ends;

transmitting the third media stream from the mobile device via the second IP address and a second port to the IP address and the port associated with the corresponding node;

identifying a third IP address and a third port on an external interface of a first network address translation (NAT) router after the first media stream starts, wherein packets received at the third IP address and the third port are routed to the second IP address and the second port;

transmitting a call-control signal from the mobile device to the corresponding node before the first media stream ends, wherein the call-control signal includes the third IP address and the third port; and receiving a fourth media stream at the mobile device on the second IP address and the second port, wherein the fourth media stream is transmitted by the corresponding node with a destination IP address and a destination port of the third IP address and the third port.

55. The method of claim 54, wherein the first NAT router is not a symmetric router, and wherein the IP address and the port associated with the corresponding node comprise an external interface on a non-symmetric NAT router.

56. The method of claim 54, wherein the IP address associated with the corresponding node is a publicly routable IP address on an external interface of a second NAT router, and wherein an IP address assigned to the corresponding node is a private IP address, wherein the second NAT router forwards packets from the IP address associated with the corresponding node to the IP address assigned to the corresponding node, and wherein the second NAT router is of a NAT-router type selected from the group consisting of null, full cone, partial cone, port-restricted cone, and symmetric.

57. The method of claim 54, wherein a software program operates on the mobile device for conducting the media session, wherein a communications service manages the software program, and wherein a user gains access to the communications service by accepting a user agreement.

58. The method of claim 54, further comprising the mobile device accessing a LAN profile for identifying a NAT-router type associated with the first NAT router, and wherein the first NAT router is of a NAT-router type selected from the group consisting of null, full cone, partial cone, port-restricted cone, and symmetric.

59. The method of claim 58, further comprising the mobile device using a set of network handover rules to select a handover procedure based at least in part on the identified NAT-router type associated with the first NAT router, wherein the set of network handover rules specifies various handover procedures corresponding with various sets of one or more NAT-router types including the identified NAT-router type, the method further comprising the mobile device using the selected handover procedure to conduct a handover from the first IP address to the second IP address.

60. The method of claim 54, wherein the mobile device measures and compares a quality of the network at the first IP address and a quality of the network at the second IP address, and responsively determines that a handover of the media session to the second IP address is preferred.

61. The method of claim 54, wherein the mobile device projects at least one of a quality of the network at the first IP address and a quality of the network at the second IP address, and responsively determines that a handover of the media session to the second IP address is preferred.

62. The method of claim 54, wherein the corresponding node begins transmitting the fourth media stream before the corresponding node stops transmitting the second media stream.

63. The method of claim 54, wherein the mobile device begins transmitting the third media stream before the mobile device stops transmitting the first media stream.

64. The method of claim 54, wherein at least one of the mobile device and the corresponding node transmit a first media control packet using a media control port, wherein a second media control packet is received at the media control port.

65. The method of claim 54, wherein the call-control signal comprises at least one packet inserted within at least one of the first media stream and a media control channel.

66. The method of claim 54, wherein the mobile device comprises at least one of a mobile phone handset, a laptop computer, a personal digital assistant (PDA) and a device that communicates with radio-frequency spectrum, and wherein the mobile device includes at least one of a session initiation protocol user agent, an extensible messaging and presence protocol user agent, a peer-to-peer client, a VoIP client, an IP Multimedia Subsystem client and a program that is downloaded and installed on the mobile device.

67. The method of claim 54, wherein each of the first and second media streams comprises a series of packets containing media formatted according to a codec, and wherein the series of packets contain IP headers.

68. The method of claim 66, wherein the IP headers are compressed, and wherein User Datagram Protocol (UDP) checksums on the series of media packets are disabled.

69. The method of claim 54, wherein the corresponding node uses the same port to (i) receive the first and third media streams and (ii) transmit the fourth media stream.

70. The method of claim 54, wherein first NAT router coverts a packet between an IP version 4 (Ipv4) address and an IP version 6 (Ipv6) address.

71. The method of claim 54, wherein the corresponding node is a relay for communication with a terminating node.

72. The method of claim 54, wherein the corresponding node starts transmitting the fourth media stream before the corresponding node starts receiving the third media stream.

73. A method for handover of an active media session, the method comprising in combination:
   transmitting a first media stream from a mobile device via a first Internet Protocol (IP) address and a first port to an IP address and port associated with a corresponding node, wherein the mobile device receives a second media stream from the corresponding node;
   acquiring a second IP address associated with the mobile device, wherein the mobile device transmits a third media stream from the second IP address and a second port to the IP address and the port associated with the corresponding node;
   identifying a third IP address and a third port on an external interface of a first network address translation (NAT) router after the first media stream starts, wherein packets received at the third IP address and the third port are routed to the second IP address and a second port;
   transmitting a call-control signal from the mobile device to the corresponding node before the first media stream ends, wherein the call-control signal contains the third IP address and the third port;
   receiving a fourth media stream at the mobile device on the second IP address and the second port before the third media stream starts;
   identifying a fourth IP address and a fourth port, wherein the fourth IP address and the fourth port are the source IP address and the source port for media packets in the fourth media stream as received at the mobile device; and
   transmitting the third media stream from the mobile device via the second IP address and the second port to the fourth IP address and the fourth port.

74. The method of claim 73, wherein the IP address associated with the corresponding node is a publicly routable IP address on an external interface of a second NAT router, wherein an IP address assigned to the corresponding node is a private IP address, wherein the second NAT router forwards packets from the IP address associated with the corresponding node to the IP address assigned to the corresponding node, and wherein the second NAT router is of a symmetric NAT-router type.

75. The method of claim 73, wherein at least one of the first NAT router and the second NAT router coverts a packet between an IP version 4 (Ipv4) address and an IP version 6 (Ipv6) address.

76. The method of claim 73, further comprising the mobile device using a set of network handover rules to select a handover procedure based at least in part on the identified NAT-router type associated with the first NAT router, wherein the set of network handover rules specifies various handover procedures corresponding with various sets of one or more NAT-router types including the identified NAT-router type, the method further comprising the mobile device using the selected handover procedure to conduct a handover from the first IP address to the second IP address.

77. The method of claim 73, wherein the mobile device measures and compares a quality of the network at the first IP address and a quality of the network at the second IP address, and responsively determines that a handover of the media session to the second IP address is preferred.

78. The method of claim 73, wherein the mobile device projects at least one of a quality of the network at the first IP address and a quality of the network at the second IP address, and responsively determines that a handover of the media session to the second IP address is preferred.

79. The method of claim 73, wherein the corresponding node begins transmitting the fourth media stream before the corresponding node stops transmitting the second media stream.

80. The method of claim 73, further comprising the mobile device accessing a LAN profile for identifying a NAT-router type associated with the first NAT router, wherein the mobile device determines the NAT-router type before the first media stream starts, and wherein the NAT-router type is not symmetric.

81. The method of claim 73, wherein at least one of the mobile device and the corresponding node transmits a first media control packet using a media control port, wherein a second media control packet is received at the media control port.

82. The method of claim 73, wherein the call-control signal comprises at least one packet inserted within the set containing the first media stream and a media control channel.

83. The method of claim 73, wherein the mobile device monitors both (i) the first IP address and the first port for receiving the second media stream and (ii) the second IP address and the second port for receiving the fourth media stream.

84. The method of claim 73, wherein each of the first and second media streams comprise a series of packets containing media formatted according to a codec, and wherein the series of packets contain IP headers.

85. The method of claim 84, wherein the IP headers are compressed, and wherein User Datagram Protocol (UDP) checksums on the series of media packets are disabled.

86. The method of claim 73, wherein the corresponding node receives the first and third media streams on the same IP address and port.

87. The method of claim 73, wherein the first NAT router routes packets in the fourth media stream from the third IP address and the third port to the second IP address and the second port.

* * * * *